US011026163B1

(12) United States Patent
McKeefery et al.

(10) Patent No.: US 11,026,163 B1
(45) Date of Patent: Jun. 1, 2021

(54) SYSTEM, METHOD AND APPARATUS TO MAINTAIN POLICY ENFORCEMENT ON A NETWORK DEVICE

(71) Applicant: Nocell Technologies, LLC, Aliso Viejo, CA (US)

(72) Inventors: Donald McKeefery, Irvine, CA (US); Frederick Thiel, Dana Point, CA (US); Himanshu Patel, Rancho Santa Margarita, CA (US)

(73) Assignee: Nocell Technologies, LLC, Aliso Viejo, CA (US)

( * ) Notice: Subject to any disclaimer, the term of this patent is extended or adjusted under 35 U.S.C. 154(b) by 0 days.

(21) Appl. No.: 16/799,768

(22) Filed: Feb. 24, 2020

Related U.S. Application Data

(60) Division of application No. 16/398,127, filed on Apr. 29, 2019, which is a continuation-in-part of (Continued)

(51) Int. Cl.
*H04W 4/00* (2018.01)
*H04M 1/725* (2021.01)
(Continued)

(52) U.S. Cl.
CPC .......... *H04W 48/14* (2013.01); *H04W 4/027* (2013.01); *H04W 4/48* (2018.02); *H04W 24/08* (2013.01); *H04W 24/10* (2013.01); *H04W 48/16* (2013.01)

(58) Field of Classification Search
CPC ..... H04W 48/14; H04W 24/08; H04W 48/16; H04W 4/48; H04W 4/027; H04W 24/10
(Continued)

(56) References Cited

U.S. PATENT DOCUMENTS 5,074,152 A 12/1991 Ellner et al.
5,233,873 A 8/1993 Mozgowiec et al.
(Continued)

OTHER PUBLICATIONS

PCTUS2018036334 filed Jun. 6, 2018 International Search Report and Written Opinion dated Jan. 8, 2019.
(Continued)

*Primary Examiner* — Mark G. Pannell
(74) *Attorney, Agent, or Firm* — Rutan & Tucker, LLP

(57) ABSTRACT

A computerized method performed by logic of a wireless transceiver coupled to an interior of an automobile. The computerized method includes operations of responsive to an application processing on a first network device detecting a speed below a predetermined threshold, receiving a first instruction initiating the logic of the wireless transceiver, obtaining sensory data indicating an acceleration value from an accelerometer of the wireless transceiver, and transmitting the sensory data to the first network device. The computerized method includes situations in which the acceleration value indicates at least one of positive acceleration or negative acceleration. The computerized method includes situations in which the sensory data includes one or more interrupts generated by the accelerometer when the acceleration value exceeds a predetermined threshold. The computerized method includes situations in which the application processing on the first network device utilizes the series of binary bits to decrement or reset a delay timer.

20 Claims, 27 Drawing Sheets

Related U.S. Application Data application No. 15/939,147, filed on Mar. 28, 2018, which is a continuation-in-part of application No. 15/615,745, filed on Jun. 6, 2017, now abandoned.

(51) Int. Cl.
*H04W 48/14* (2009.01)
*H04W 4/02* (2018.01)
*H04W 24/08* (2009.01)
*H04W 24/10* (2009.01)
*H04W 48/16* (2009.01)
*H04W 4/48* (2018.01)

(58) Field of Classification Search
USPC ........................................... 455/422.1
See application file for complete search history.

(56) References Cited

U.S. PATENT DOCUMENTS

| | | | |
|---|---|---|---|
| 6,078,252 A | 6/2000 | Kulczycki et al. | |
| 6,122,486 A | 9/2000 | Tanaka et al. | |
| 6,147,417 A * | 11/2000 | Ueno | B60R 21/01 280/728.1 |
| 6,211,772 B1 | 4/2001 | Murakami et al. | |
| 7,181,229 B2 | 2/2007 | Singh et al. | |
| 8,442,558 B2 | 5/2013 | Mader et al. | |
| 8,686,864 B2 | 4/2014 | Hannon | |
| 8,706,872 B2 | 4/2014 | Moussavian et al. | |
| 8,718,536 B2 | 5/2014 | Hannon | |
| 8,750,904 B2 | 6/2014 | Mader et al. | |
| 8,761,821 B2 | 6/2014 | Tibbitts et al. | |
| 8,781,457 B2 | 7/2014 | Randazzo et al. | |
| 8,787,936 B2 | 7/2014 | Tibbitts et al. | |
| 8,868,081 B2 | 10/2014 | Heath et al. | |
| 8,942,692 B2 | 1/2015 | Randazzo et al. | |
| 8,966,064 B2 | 2/2015 | Moussavian et al. | |
| 9,043,462 B2 | 5/2015 | Badiee et al. | |
| 9,143,602 B2 | 9/2015 | Michaelis | |
| 9,204,258 B2 | 12/2015 | Chen et al. | |
| 9,226,104 B2 | 12/2015 | Schlesener et al. | |
| 9,280,145 B2 | 3/2016 | Hannon | |
| 9,294,603 B2 | 3/2016 | Fischer et al. | |
| 9,305,317 B2 | 4/2016 | Grokop et al. | |
| 9,324,121 B2 | 4/2016 | Osann, Jr. | |
| 9,360,323 B2 | 6/2016 | Grokop | |
| 9,369,196 B2 | 6/2016 | Hannon | |
| 9,379,805 B2 | 6/2016 | Hannon | |
| 9,386,447 B2 | 7/2016 | Tibbitts et al. | |
| 9,451,447 B2 | 9/2016 | Tibbitts et al. | |
| 9,451,448 B2 | 9/2016 | Lovich et al. | |
| 9,462,110 B1 | 10/2016 | Schlesener et al. | |
| 9,503,887 B1 | 11/2016 | Tuluca | |
| 9,532,169 B2 | 12/2016 | Daly | |
| 9,554,190 B2 | 1/2017 | Hodges et al. | |
| 9,584,652 B2 | 2/2017 | Fischer et al. | |
| 9,615,213 B2 | 4/2017 | Tibbitts et al. | |
| 9,660,923 B2 | 5/2017 | Badiee et al. | |
| 9,661,126 B2 | 5/2017 | Hodges et al. | |
| 9,661,127 B1 | 5/2017 | Singh | |
| 9,681,358 B2 | 6/2017 | Juhasz | |
| 9,681,361 B2 | 6/2017 | Tuluca | |
| 9,692,880 B2 | 6/2017 | Hannon | |
| 9,699,301 B1 | 7/2017 | Siritzky | |
| 9,740,883 B2 | 8/2017 | Anakata et al. | |
| 9,743,260 B2 | 8/2017 | Wilson et al. | |
| 9,749,458 B2 | 8/2017 | Hodges et al. | |
| 9,749,764 B2 | 8/2017 | Bradley | |
| 9,749,824 B2 | 8/2017 | Mayer et al. | |
| 9,754,425 B1 | 9/2017 | Iqbal et al. | |
| 9,756,175 B2 | 9/2017 | Fischer et al. | |
| 9,758,039 B2 | 9/2017 | Hannon | |
| 9,781,250 B2 | 10/2017 | Siritzky | |
| 9,787,817 B2 | 10/2017 | Wakita | |
| 9,813,897 B2 | 11/2017 | Manente | |
| 9,826,500 B1 | 11/2017 | Boss et al. | |
| 9,832,307 B1 | 11/2017 | Siritzky | |
| 9,836,335 B2 | 12/2017 | Yang et al. | |
| 9,840,230 B2 | 12/2017 | Miller et al. | |
| 9,845,070 B2 | 12/2017 | Petel et al. | |
| 9,847,948 B2 | 12/2017 | Badiee et al. | |
| 9,848,289 B2 | 12/2017 | Fischer et al. | |
| 9,848,308 B2 | 12/2017 | Demele et al. | |
| 9,854,393 B2 | 12/2017 | Moussavian et al. | |
| 9,854,405 B2 | 12/2017 | Yoo | |
| 9,854,433 B2 | 12/2017 | Hannon | |
| 9,866,348 B2 | 1/2018 | Chalmers et al. | |
| 9,867,118 B2 | 1/2018 | Silver | |
| 9,869,772 B2 | 1/2018 | Katsman | |
| 9,872,225 B2 | 1/2018 | Guba et al. | |
| 9,887,887 B2 | 2/2018 | Hunter et al. | |
| 9,888,392 B1 | 2/2018 | Snyder et al. | |
| 9,888,504 B2 | 2/2018 | Lee et al. | |
| 9,892,573 B1 | 2/2018 | Hsu-Hoffman et al. | |
| 9,894,609 B2 | 2/2018 | Salomone et al. | |
| 9,898,759 B2 | 2/2018 | Khoury | |
| 9,913,069 B2 | 3/2018 | Naqvi | |
| 9,913,070 B2 | 3/2018 | Naqvi | |
| 9,913,071 B2 | 3/2018 | Naqvi | |
| 10,075,764 B2 | 9/2018 | Moussavian et al. | |
| 10,075,819 B2 | 9/2018 | Santavicca et al. | |
| 10,079,931 B2 | 9/2018 | Nicholls et al. | |
| 10,122,846 B2 | 11/2018 | Hannon | |
| 10,205,819 B2 | 2/2019 | Hannon et al. | |
| 10,678,310 B2 * | 6/2020 | Hamann | G06F 1/18 |
| 2001/0055988 A1 | 12/2001 | Blake et al. | |
| 2002/0032510 A1 | 3/2002 | Turnbull et al. | |
| 2003/0045322 A1 | 3/2003 | Baer et al. | |
| 2005/0229713 A1 | 10/2005 | Niblock | |
| 2006/0047445 A1 | 3/2006 | Williams et al. | |
| 2007/0082614 A1 | 4/2007 | Mock | |
| 2007/0152844 A1 * | 7/2007 | Hartley | G08G 1/0104 340/905 |
| 2007/0191075 A1 | 8/2007 | Greene et al. | |
| 2007/0194904 A1 * | 8/2007 | Wey | B60Q 1/448 340/467 |
| 2007/0278896 A1 | 12/2007 | Sarkar | |
| 2008/0209034 A1 | 8/2008 | Shin et al. | |
| 2009/0192688 A1 * | 7/2009 | Padmanabhan | G08G 1/0104 701/70 |
| 2009/0318121 A1 | 12/2009 | Marumoto | |
| 2010/0087137 A1 | 4/2010 | Fischer et al. | |
| 2010/0131304 A1 | 5/2010 | Collopy et al. | |
| 2010/0214094 A1 * | 8/2010 | Givens | G01R 29/085 340/539.17 |
| 2010/0227601 A1 | 9/2010 | Walton et al. | |
| 2011/0021234 A1 | 1/2011 | Tibbitts et al. | |
| 2011/0029239 A1 * | 2/2011 | Okude | G01C 21/367 701/431 |
| 2011/0037589 A1 * | 2/2011 | Liu | G08B 21/0446 340/539.12 |
| 2011/0092159 A1 | 4/2011 | Park et al. | |
| 2011/0133952 A1 | 6/2011 | McNamara et al. | |
| 2011/0137773 A1 | 6/2011 | Davis, III et al. | |
| 2011/0281519 A1 | 11/2011 | Reuss et al. | |
| 2011/0294520 A1 | 12/2011 | Zhou et al. | |
| 2011/0309826 A1 | 12/2011 | Braun et al. | |
| 2012/0021717 A1 * | 1/2012 | Schmidt | H04M 1/72577 455/404.2 |
| 2012/0161971 A1 | 6/2012 | Nasir et al. | |
| 2012/0202466 A1 * | 8/2012 | Zangvil | H04W 4/12 455/412.1 |
| 2013/0006674 A1 | 1/2013 | Bowne et al. | |
| 2013/0124073 A1 * | 5/2013 | Ren | G08G 1/0112 701/118 |
| 2013/0143527 A1 | 6/2013 | Randazzo et al. | |
| 2014/0080100 A1 | 3/2014 | Phelan et al. | |
| 2014/0112194 A1 | 4/2014 | Novlan et al. | |
| 2014/0113558 A1 | 4/2014 | Varoglu et al. | |
| 2014/0277888 A1 * | 9/2014 | Dastoor | B60L 58/12 701/22 |
| 2014/0335902 A1 | 11/2014 | Guba et al. | |
| 2015/0056974 A1 | 2/2015 | Kim et al. | |

(56) References Cited

U.S. PATENT DOCUMENTS

| | | |
|---|---|---|
| 2015/0149042 A1 | 5/2015 | Cooper et al. |
| 2015/0188919 A1 | 7/2015 | Belton, Jr. et al. |
| 2015/0264558 A1 | 9/2015 | Wigton et al. |
| 2015/0356795 A1 | 12/2015 | Warren |
| 2015/0366504 A1 | 12/2015 | Connor |
| 2016/0021238 A1 | 1/2016 | Abramson et al. |
| 2016/0044502 A1 | 2/2016 | Jung et al. |
| 2016/0142877 A1 | 5/2016 | Gujral et al. |
| 2016/0159200 A1 | 6/2016 | Kim |
| 2016/0159218 A1 | 6/2016 | Kang |
| 2016/0183069 A1* | 6/2016 | Wilson ............... H04W 4/14 455/466 |
| 2016/0198306 A1 | 7/2016 | Miles et al. |
| 2016/0242143 A1 | 8/2016 | Lotter et al. |
| 2016/0266235 A1 | 9/2016 | Hannon et al. |
| 2016/0282312 A1 | 9/2016 | Cable et al. |
| 2016/0332635 A1 | 11/2016 | Holub |
| 2016/0337814 A1 | 11/2016 | Van Wiemeersch |
| 2016/0337815 A1 | 11/2016 | Cuddihy et al. |
| 2016/0373572 A1 | 12/2016 | Tuluca |
| 2017/0020402 A1 | 1/2017 | Rogers et al. |
| 2017/0041737 A1 | 2/2017 | Fischer |
| 2017/0171741 A1 | 6/2017 | Hannon |
| 2017/0201931 A1* | 7/2017 | Swanzey ............. H04L 63/0869 |
| 2017/0339270 A1 | 11/2017 | Ashili |
| 2018/0053416 A1 | 2/2018 | Sanji et al. |
| 2018/0108189 A1 | 4/2018 | Park et al. |
| 2018/0242113 A1 | 8/2018 | MacNeille et al. |
| 2018/0252796 A1 | 9/2018 | Qu et al. |
| 2018/0316788 A1* | 11/2018 | Elliott ................ H04W 4/02 |
| 2018/0352074 A1 | 12/2018 | Swartz et al. |
| 2018/0352372 A1 | 12/2018 | Swartz et al. |
| 2018/0370360 A1 | 12/2018 | Hannon |
| 2018/0374111 A1* | 12/2018 | Corry ................ G06Q 50/30 |
| 2019/0002237 A1 | 1/2019 | Scoville et al. |
| 2019/0025402 A1 | 1/2019 | Qu et al. |
| 2019/0300333 A1 | 10/2019 | Simcik et al. |
| 2020/0172054 A1* | 6/2020 | Schlittenbauer ... G01C 21/3611 |

OTHER PUBLICATIONS

U.S. Appl. No. 15/615,745, filed Jun. 6, 2017 Final Office Action dated Jan. 18, 2019.

U.S. Appl. No. 15/615,745, filed Jun. 6, 2017 Final Office Action dated May 18, 2018.

U.S. Appl. No. 15/615,745, filed Jun. 6, 2017 Non-Final Office Action dated Dec. 13, 2017.

U.S. Appl. No. 15/615,745, filed Jun. 6, 2017 Non-Final Office Action dated Sep. 11, 2018.

U.S. Appl. No. 15/939,147, filed Mar. 28, 2018 Final Office Action dated Mar. 19, 2019.

U.S. Appl. No. 15/939,147, filed Mar. 28, 2018 Final Office Action dated Nov. 25, 2019.

U.S. Appl. No. 15/939,147, filed Mar. 28, 2018 Non-Final Office Action dated Aug. 1, 2019.

U.S. Appl. No. 15/939,147, filed Mar. 28, 2018 Non-Final Office Action dated Mar. 17, 2020.

U.S. Appl. No. 15/939,147, filed Mar. 28, 2018 Non-Final Office Action dated Oct. 18, 2018.

U.S. Appl. No. 16/398,120, filed Apr. 29, 2019 Non-Final Office Action dated Mar. 11, 2020.

U.S. Appl. No. 16/398,127, filed Apr. 29, 2019 Non-Final Office Action dated Nov. 5, 2019.

U.S. Appl. No. 16/398,127, filed Apr. 29, 2019 Notice of Allowance dated Mar. 30, 2020.

U.S. Appl. No. 16/799,766, filed Feb. 24, 2010 Non-Final Office Action dated Apr. 20, 2020.

* cited by examiner

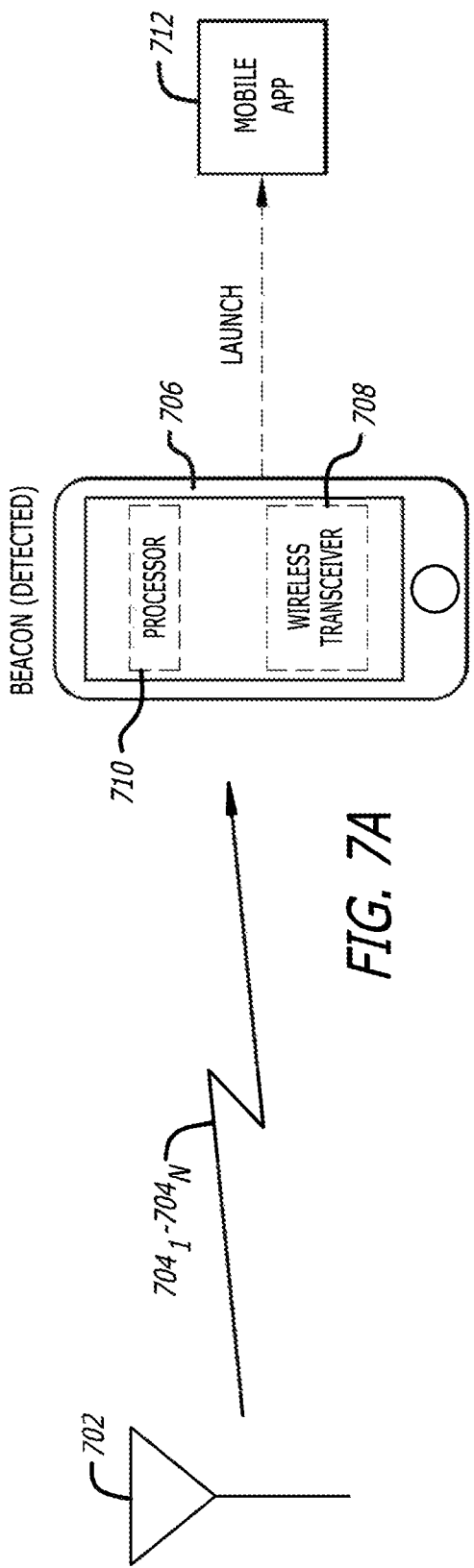
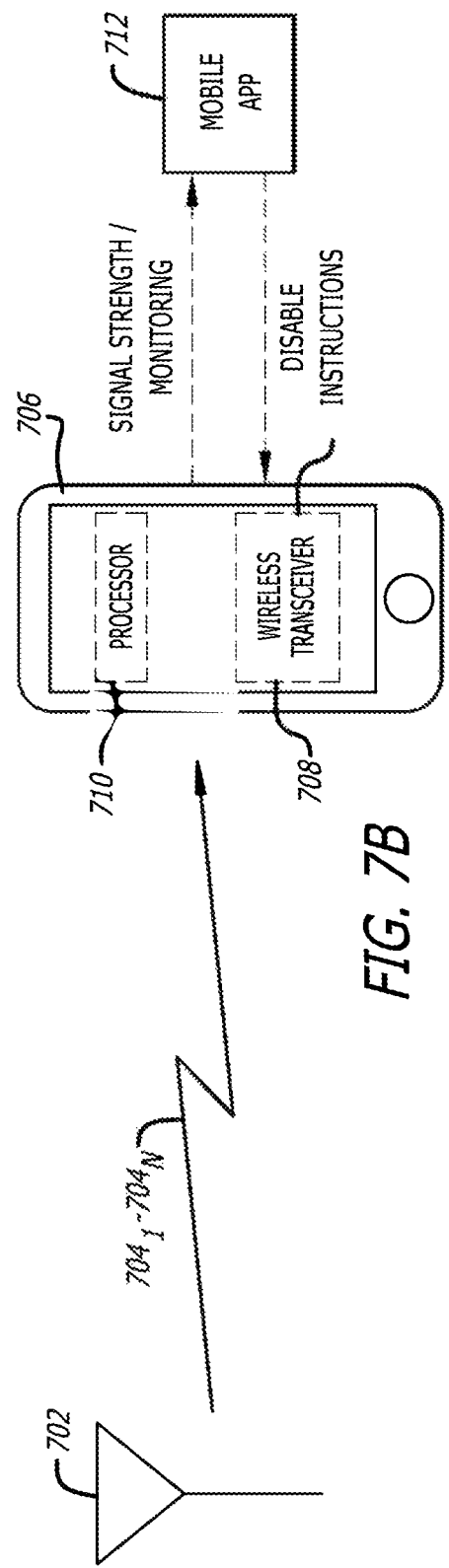

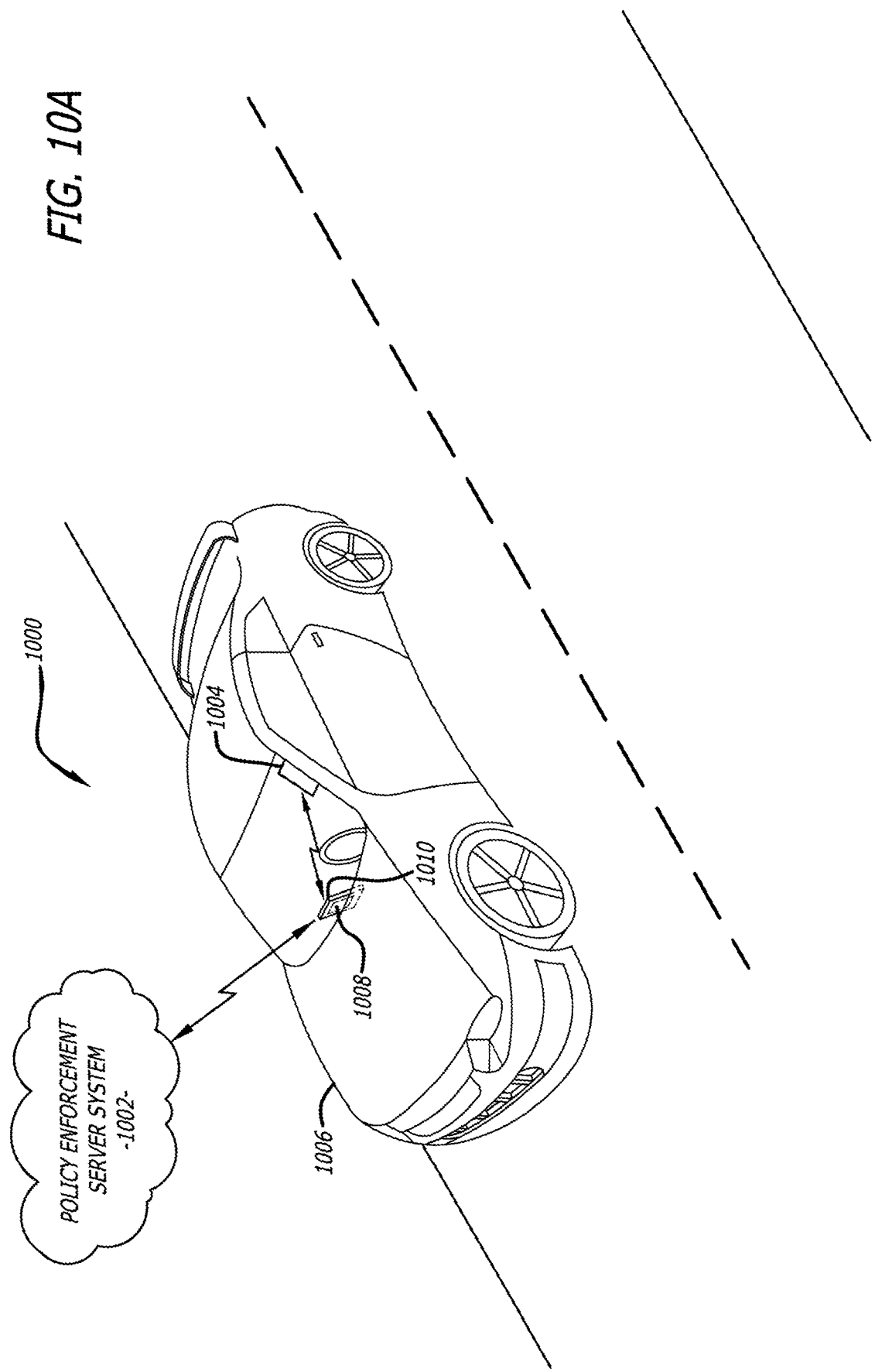

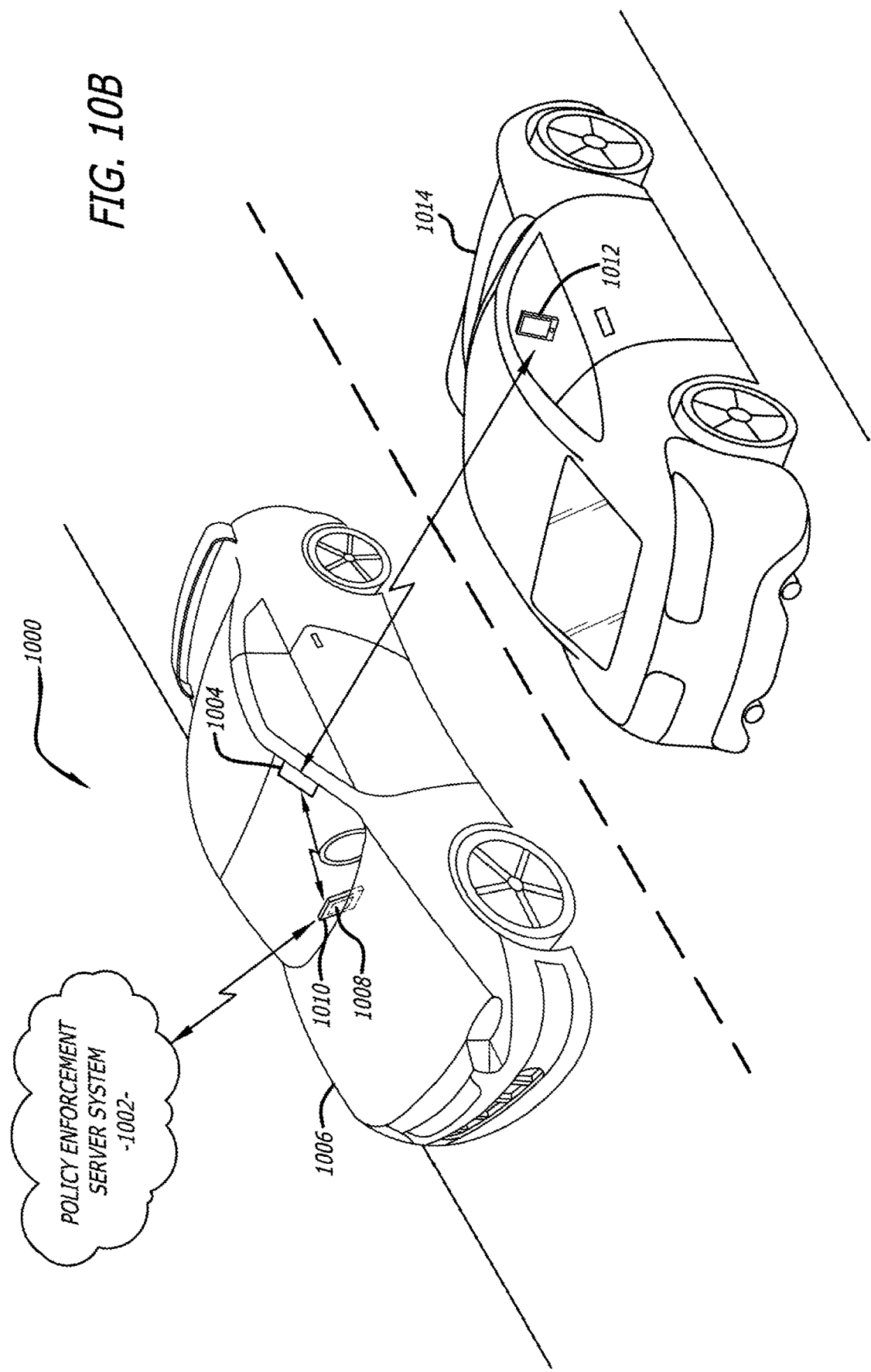

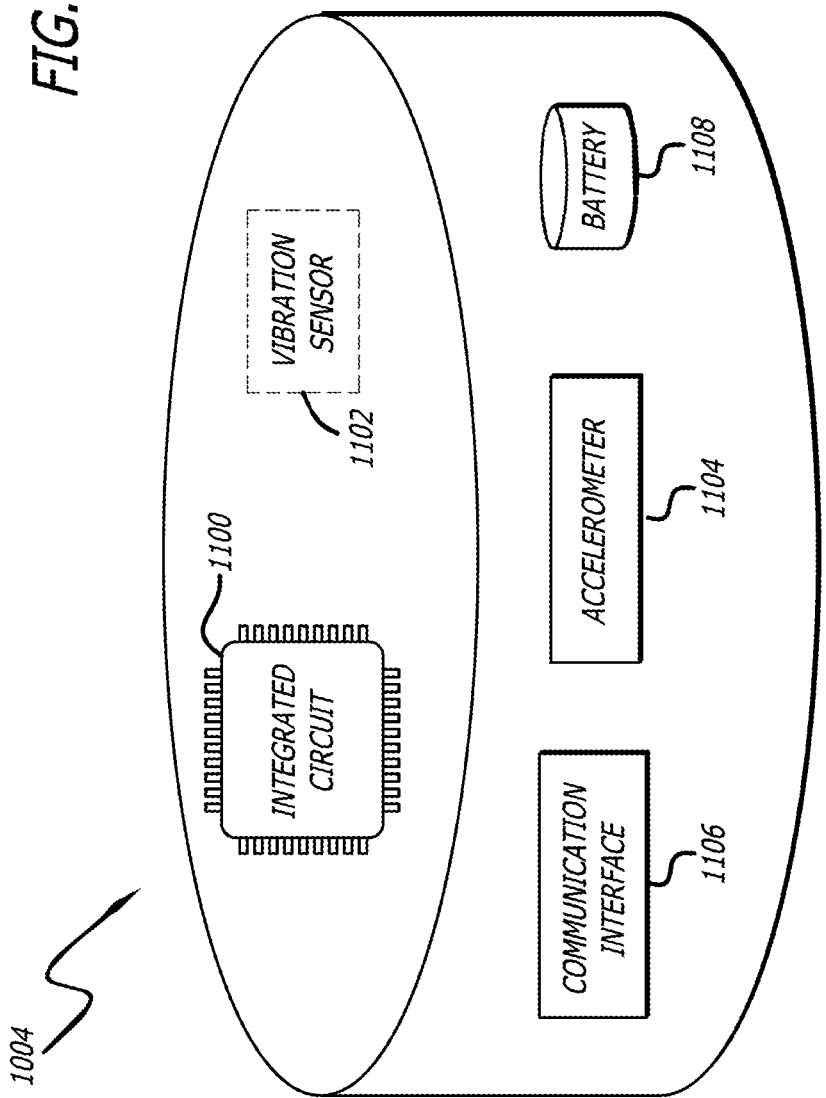

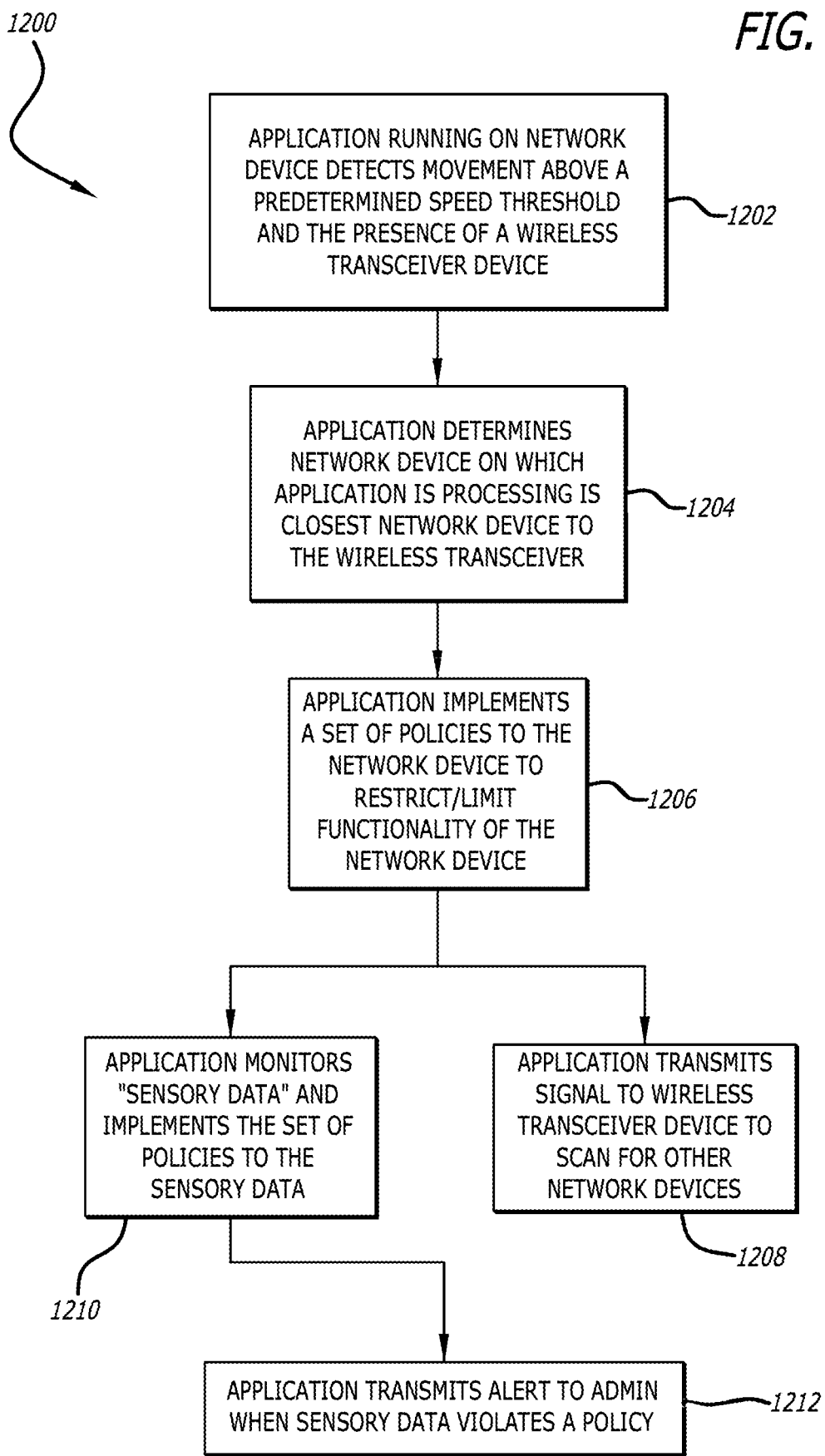

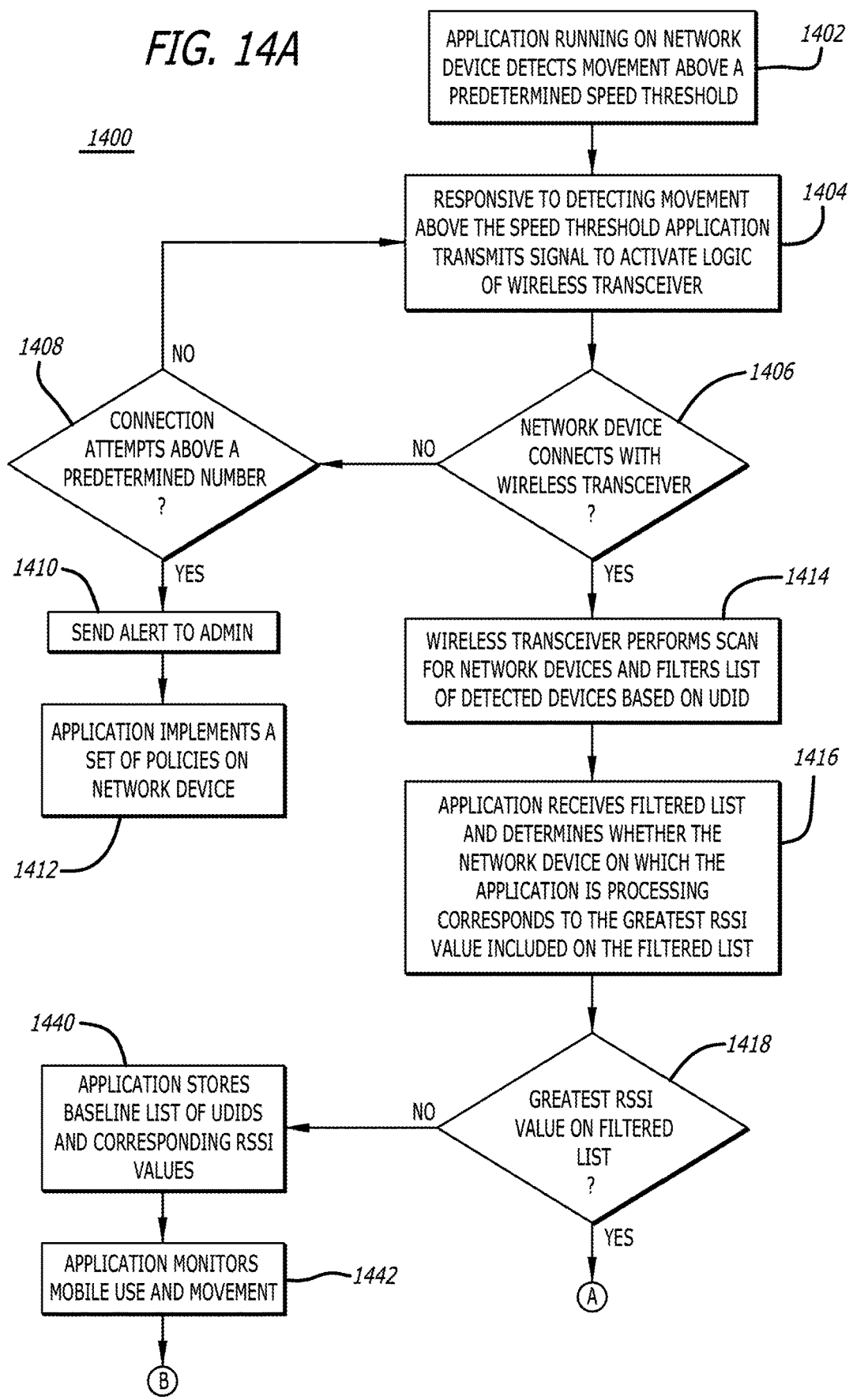

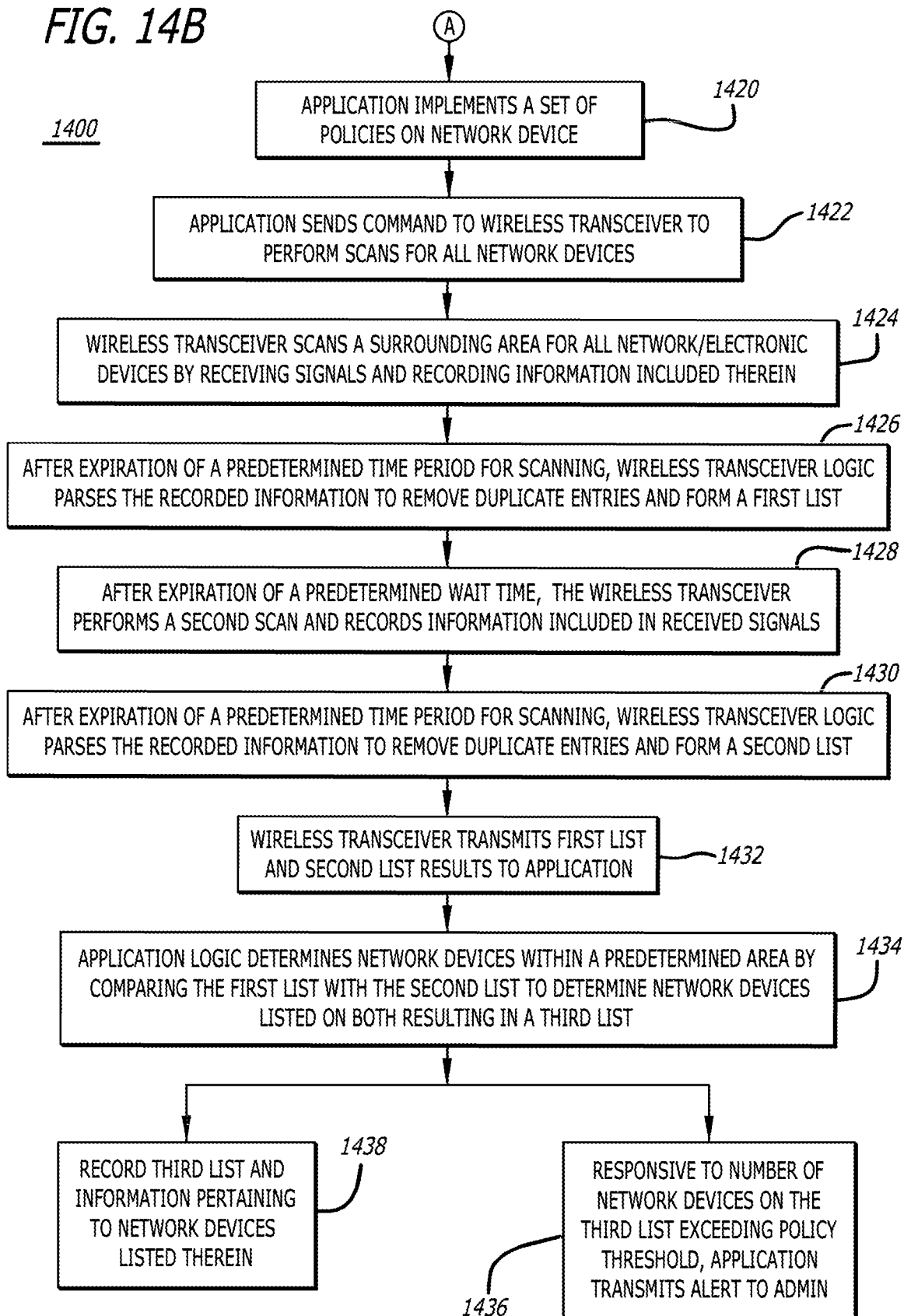

SYSTEM, METHOD AND APPARATUS TO MAINTAIN POLICY ENFORCEMENT ON A NETWORK DEVICE

CROSS-REFERENCE TO RELATED APPLICATIONS

The present application is a divisional of U.S. patent application Ser. No. 16/398,127, entitled "SYSTEM, METHOD AND APPARATUS FOR FACILITATING THE RESTRICTION OF THE USE OF ONE OR MORE NETWORK DEVICES THROUGH AUTOMATED POLICY ENFORCEMENT" filed on Apr. 29, 2019, which is a continuation-in-part of the U.S. patent application Ser. No. 15/939,147, entitled "SYSTEM, METHOD AND APPARATUS FOR GENERATING A ZONE RESTRICTING USE OF A MOBILE DEVICE" filed on Mar. 28, 2018, which is a continuation-in-part of the U.S. patent application Ser. No. 15/615,745, entitled "SYSTEM, METHOD AND APPARATUS FOR GENERATING A ZONE RESTRICTING USE OF A MOBILE DEVICE" filed on Jun. 6, 2017, both of which are hereby incorporated by reference in its entirety.

FIELD

Embodiments of the disclosure relate to the field of restricting use of network devices. More specifically, one embodiment of the disclosure relates to a system that implements a set of policies configured to restrict or limit the use of a network device. Further, some embodiments of the disclosure relate to restricting or limiting the use of a mobile device by a driver of an automobile.

GENERAL BACKGROUND

Distractions while driving, especially those from electronic devices, are at an all-time high. As mobile devices, e.g., cell phones, have become ubiquitous, it is common place for a driver to get into an automobile, start driving and become distracted with his/her cell phone. For instance, drivers often receive and respond to text messages or emails, browse the internet, or browse social media platforms while driving.

Driving while distracted as a result of the presence of electronic devices within reach is a dangerous, and at times, deadly, situation. Although some states have outlawed the act of using a cell phone while driving, not all drivers regularly adhere to these laws. Additionally, drivers may be distracted merely by notification alerts received by a cell phone. For example, a cell phone placed in a cup holder of the center console may alert the driver to a new text message or email via an audible and/or visual notification. The notification may cause the driver to take his/her eyes off of the road momentarily, which has the potential to result in an accident.

Many parents or employers wish to prevent their children/employees from being distracted by the child's or employee's cell phone while driving but also want their children or employees to have a cell phone in case of emergency. However, the use of some functionality of a cell phone may be warranted while driving. For example, a functionality of a cell phone that provides turn-by-turn directions may be used by some drivers and does not cause unnecessary distractions. Further, some drivers may be able to connect their cell phones to the automobile's audio system and play music while driving without causing unnecessary distractions. Additionally, once a child or employee completes his/her drive, there is no need to prevent the child or employee from using his/her cell phone.

Thus, a system, method and apparatus are needed to restrict or limit the use of some or all functionality of certain network devices, such as mobile devices for example, within a predefined area of an interior cabin of an automobile when the automobile is in use.

BRIEF DESCRIPTION OF THE DRAWINGS

Embodiments of the invention are illustrated by way of example and not by way of limitation in the figures of the accompanying drawings, in which like references indicate similar elements and in which:

FIG. 7A is an illustration of a beacon being transmitted to a network device and the launching of a software application of the NCZ system installed on the network device.

FIG. 7B is an illustration of a beacon being transmitted to the network device of FIG. 7A and the processing of the beacon by the software application of FIG. 7A.

FIG. 10A is an exemplary illustration of a deployment of a policy enforcement system in connection with a first vehicle.

FIG. 10B is a second exemplary illustration of the policy enforcement system of FIG. 10A interacting with a network device of a second vehicle.

FIG. 11 is an exemplary block diagram of a wireless transceiver of the policy enforcement system of FIG. 10A.

FIG. 12 is a flowchart illustrating an exemplary process of applying and monitoring a set of policies by the policy enforcement system of FIG. 10A.

FIGS. 14A-14C illustrate a flowchart of an exemplary process of applying and monitoring a set of policies incorporating a first and second comparison process by the policy enforcement system of FIG. 10A.

DETAILED DESCRIPTION

Figure 1A:
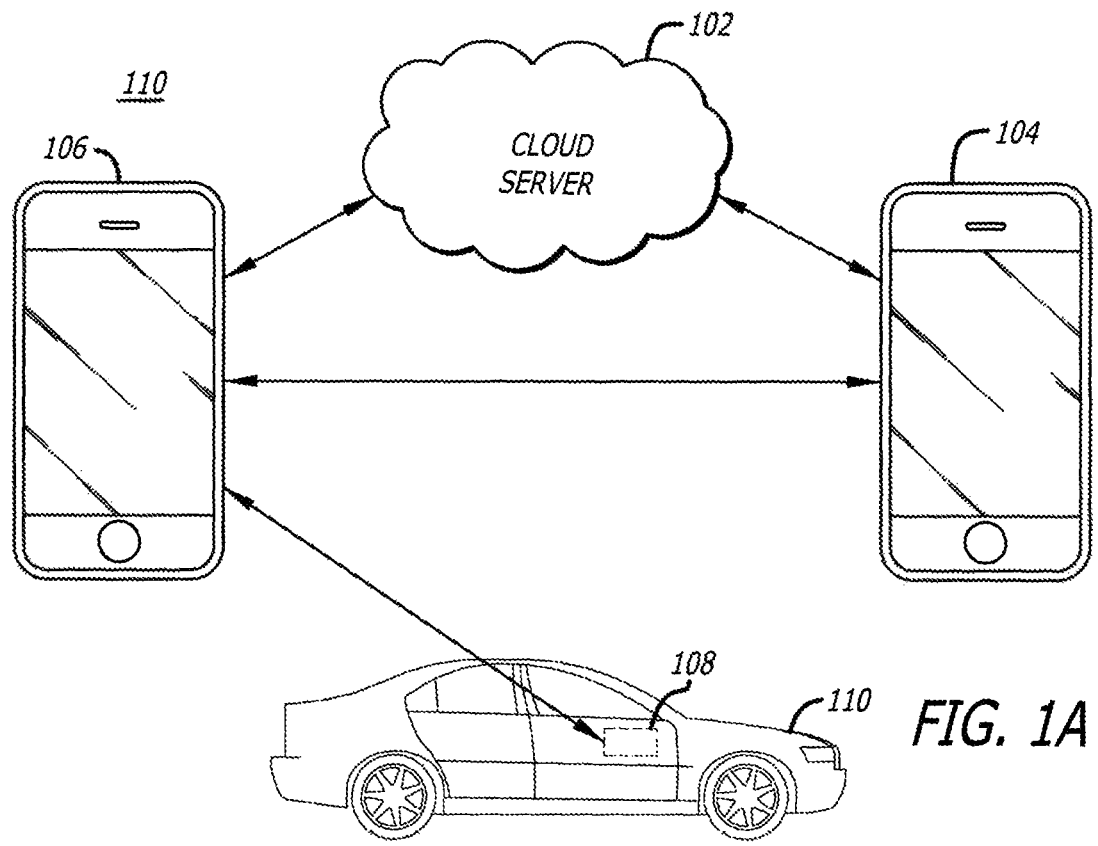
FIG. 1A is an exemplary illustration of NOCELL™ Zone (NCZ) system.

Embodiments of a system, apparatus and method for disabling predefined functionalities of a network device within a predefined range of a transceiver are described. A NOCELL™ Zone (NCZ) system, which includes the transceiver, is capable of configuring, with a software application installed on a network device, a restricted area, or "restricted zone," based on a predetermined threshold of a received signal strength of a beacon transmitted by the transceiver. The software application then restricts or disables one or more predetermined functionalities of the network device when the network device is within the restricted area. Additionally, an instance of the software application installed on the network device may be capable of monitoring movements of and/or operations conducted by the network device and providing notifications in response to one or more predetermined triggering events.

More particularly, in one embodiment, the NCZ system may include a cloud server configured to execute logic stored thereon to transmit data between one or more of a monitoring network device and a monitored network device. Specifically, the monitored network device may receive user input selecting or providing a list of functionalities of the monitored network device. A software application of the NCZ system installed on the monitored network device receives the list of functionalities from the monitoring networking device, e.g., optionally via the cloud server, and disables the list of functionalities when the monitored network device is within a predefined range of the transceiver. The term "transceiver" refers to an electronic device capable of transmitting wireless signals, such as BLUETOOTH® beacons (e.g., BLUETOOTH® Low Energy (BLE)). Herein, the terms "transceiver" and "wireless transceiver" are used interchangeably.

In one example, the monitoring network device may be a parent's mobile device, the monitored network device may be a child's mobile device and the wireless transceiver may be located within an automobile, e.g., coupled to the steering column or windshield, or integrated into the center console. In such an example, the parent may restrict the use of certain functionalities of the child's mobile device while the child is driving by defining a list of functionalities to be restricted or disabled and establishing a restricted zone in reference to the location of the wireless transceiver based on a signal strength of the beacon generated by the wireless transceiver as received by the child's mobile device. When a transceiver of the child's mobile device detects a beacon having a signal strength greater than or equal to a first threshold, a software application installed on the child's mobile device determines the child's mobile device is within the restricted zone (e.g., a beacon weakens as it propagates from its source) and restricts or disables the list of functionalities. For example, the list of functionalities to be restricted or disabled may include texting applications, email applications, maps applications, social media applications, etc. Continuing the example, when the signal strength of the beacon is below the first threshold or no beacon is detected, the software application determines the child's mobile device is not within the restricted zone and does not restrict or disable functionalities of the mobile device.

Although the example above discusses the NCZ system as used with an automobile and a parent-child relationship, the disclosure should not be so limited. The NCZ system may be used in any area in which the wireless transceiver is placed. For example, the NCZ system may be used in the home, workplace, office building, school or university, coffee shop, restaurant, on public transportation (e.g., a bus, train, airplane, etc.), sporting stadium, etc. Additionally, the NCZ system may be used with any relationship involving a monitoring network device and a monitored network device. For example, the NCZ system may be used with an employer-employee relationship, a parent-parent relationship, a guardian-child relationship, etc. However, for ease and convenience, a parent-child relationship using the NCZ system within an automobile will be discussed herein.

In one embodiment, a parent may access the NCZ system (e.g., via an internet browser or downloading a corresponding software application), creating an account, inviting a child to register and configuring the child's account by selecting certain functionalities the parent wishes to disable or restrict while the child is driving an automobile. The child may then download the software application to the child's mobile device. The parent may then configure the software application on the child's mobile device by establishing a restricted area in relation to the location of the wireless transceiver installed within an automobile and is defined by the strength of the beacon. The restricted area is established by using a wireless transceiver within the child's mobile device to detect the strength of a beacon generated by the wireless transceiver of NCZ system. Subsequently, the software application establishes a virtual restricted zone in relation to the location of the wireless transceiver of the NCZ system, which includes at least the area surrounding the driver's seat. As a result of the establishment of the restricted area, a child's mobile device will have limited functionality when the mobile device is within reach of the child while the child is driving; thus, decreasing the number of distractions presented to the child while driving. As mentioned above, the parent may configure the software application on the child's mobile device to silence all notifications, prevent texting, emailing, or generally the generation, transmission and/or receipt of messages, prevent the use of social media (e.g., Facebook®, Instagram®, Snapchat®, etc.), etc.

Accordingly, using the NCZ system decreases the distractions presented to a driver while driving, or sitting in the driver's seat with the car on, in a manner customizable by a parent, guardian, employer, etc. As a result, the NCZ system may improve the safety of a child's driving. Further, the NCZ system may be applied to any mobile device, such as a parent's mobile device, in order to decrease the distractions presented to any driver of the automobile. Additionally, the software application, e.g., installed on a plurality of mobile devices, may be configured differently according to the desires of a parent, guardian, employer, etc. For example, a parent may configure the software application installed on a first child's mobile device to disable all functionality of the mobile device (e.g., the first child may be just learning to drive) and configure the software application installed on a second child's mobile device to disable a portion of the functionality less than all of the functionality of the mobile device (e.g., the second child has more experience driving).

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

As mentioned above, the terms "transceiver" and "wireless transceiver" may be used interchangeably. Additionally, the term wireless transceiver refers to an electronic device configured to transmit and/or receive a wireless signal. The wireless transceiver may transmit data using any wireless technology, examples of which may include, but are not limited or restricted to, Wi-Fi, BLUETOOTH®, BLUETOOTH® Low Energy (BLE), radio waves (e.g., radio-frequency identification), one or more beacons, etc. In one embodiment, a wireless transceiver may refer to a communication interface of the center console of an automobile. In a second embodiment, a wireless transceiver may refer to a standalone electronic device that provides a wireless communication interface.

The term "computerized" generally represents that any corresponding operations are conducted by hardware in combination with software and/or firmware.

The term "network device" may be construed as a physical, electronic device or a virtual electronic device that is based on the execution of one or more software modules. The network device may be communicatively coupled to a public network such as the Internet or a private network such as a wireless data telecommunication network, wide area network, a type of local area network (LAN), or a combination of networks. Examples of the network device may include, but are not limited or restricted to, a physical electronic device (e.g., a personal computer such as a desktop, laptop, tablet or netbook; a mobile phone; a standalone appliance; a sensor; etc.). A network device may feature a plurality of electronic components, including one or more hardware processors (generally referred to as "processor"), at least one non-transitory storage medium, and an (network and/or I/O) interface. These components may be encased in a housing, which may be made entirely or partially of a rigid material (e.g., hard plastic, metal, glass, composites, or any combination thereof) that protects these components from certain environmental conditions.

The term "message" generally refers to any type of signaling such as wireless signaling including a beacon signal. Alternatively, the message may be information in a prescribed format and transmitted in accordance with a suitable delivery protocol. Hence, each message may be in the form of one or more packets, frames, or any other wireless signaling having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

Nocell™ Zone System

Referring to FIG. 1A, an exemplary illustration of NOCELL™ Zone (NCZ) system is shown. The NCZ system 100 includes a cloud server 102, a first (monitoring) network device 104 (e.g., a parent or employer's mobile device), a second (monitored) network device 106 (e.g., a child or employee's mobile device) as well as a wireless transceiver 108 installed in an automobile 110. As shown, the cloud server 102 is communicatively coupled to the first network device 104 and the second network device 106. Additionally, the second network device 106 may be communicatively coupled to the first network device 104 and configured to receive and/or detect signals transmitted by the wireless transceiver 108. Additionally, the network devices 104-106 each include a processor (e.g., circuitry) that is configured to execute logic stored within a storage medium of each of the network devices 104-106. One example of the processor includes an Intel® (x86) central processing unit (CPU) with an instruction set architecture. Alternatively, each processor may include another type of CPU, a digital signal processor (DSP), an Application Specific Integrated Circuit (ASIC), a field-programmable gate array (FPGA), or any other hardware component with data processing capability.

Figure 1C:
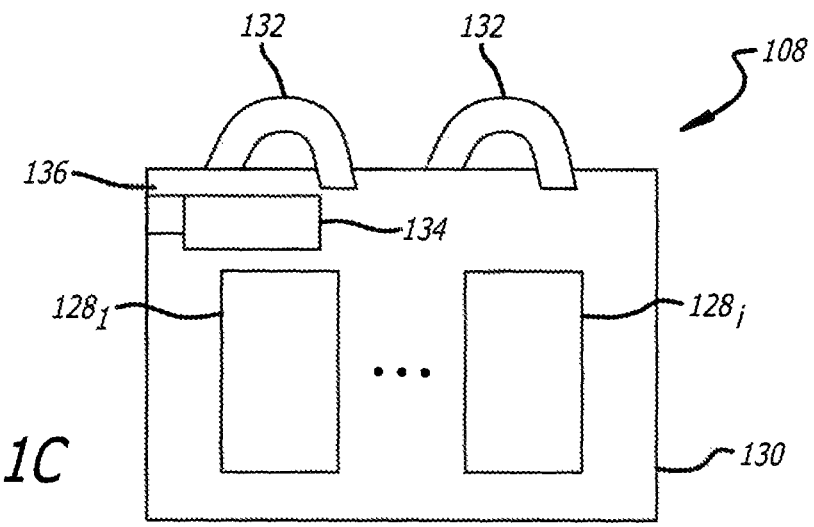
FIG. 1C is an exemplary block diagram of a wireless transceiver.
Figure 1B:
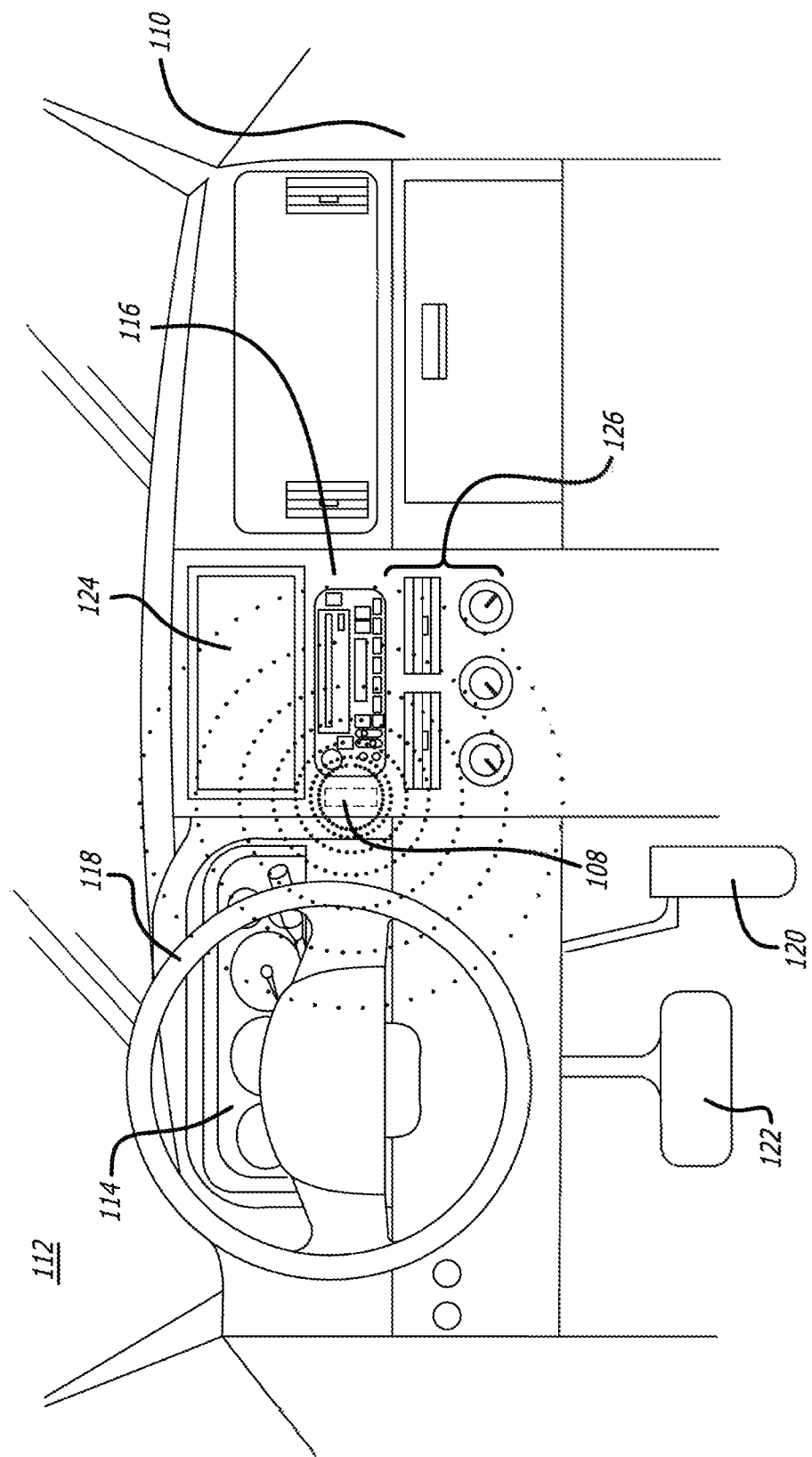
FIG. 1B is an exemplary illustration of an interior cabin of an automobile including a BLUETOOTH® Low Energy (BLE) transceiver and the wireless transceiver of FIG. 1A.

Referring to FIG. 1B, an exemplary illustration of an interior cabin of an automobile including the wireless transceiver of FIG. 1A is shown. Herein, the interior cabin 112 of the automobile 110 includes a dashboard 114, a center console 116, a steering wheel 118, a gas pedal 120, a brake pedal 122 and the wireless transceiver 108. In the embodiment illustrated in FIG. 1B, the center console 116 is shown to include a display screen 124 and a plurality of controls 126, e.g., entertainment system controls, cabin climate controls, automobile safety feature controls, etc.

In one embodiment, the wireless transceiver 108 is installed behind a front surface of the center console 116 as part of the entertainment system controls to transmit and receive wireless data. In another embodiment, the wireless transceiver 108 may be a standalone electronic device that is placed within the automobile 110 (e.g., to enable use of the NCZ system with older automobiles that may not have BLUETOOTH® connectivity), as seen in FIGS. 2 and 6A-6C. The wireless transceiver 108 may be configured to facilitate communication between a network device and the center console via, inter alia, Wi-Fi, BLUETOOTH®, BLUETOOTH® Low Energy, one or more other beacon types, etc. However, for the purpose of clarity, the disclosure hereinafter will discuss the wireless transceiver 108 transmitting BLUETOOTH® beacons (hereinafter referred to as "beacons"). As discussed below, the receipt of a beacon from the wireless transceiver 108 by the network device 106 may prompt the network device 106 to launch a software application of the NCZ system installed on the network device 106 and begin a determination of the received signal strength of beacon. As used herein, the received signal strength may take the form of the value of a Received Signal Strength Indicator (RSSI) as determined by the transceiver of the wireless transceiver 108 of the network device 106. In other embodiments, the received signal strength may be an absolute measure of signal strength as measured in decibels (dBms).

When the signal strength of the beacon is determined to be greater than or equal to a predetermined threshold, the software application is configured to disable one or more functionalities of the network device 106 according to predetermined configurations so long as the network device 106 remains within a predefined distance from the wireless transceiver 108 (i.e., the beacon signal strength remains greater than or equal to the predetermined threshold).

It should also be noted that the wireless transceiver 108 may be integrated into other components of the automobile 110. In some embodiments, the wireless transceiver 108 may be located within the steering wheel 118, a dashboard 114, a column attaching the steering wheel 118 to the dashboard 114 area (e.g., "steering column"), etc.

Referring to FIG. 1C, an exemplary block diagram of a wireless transceiver is shown. The wireless transceiver 108 is shown to include one or wireless transmitting devices $128_1$-$128_i$ ($i \geq 1$) at least partially contained within a housing 130. For example, each of the wireless transmitting devices $128_1$-$128_i$ may be an integrated circuit, such as a system on a chip (SoC) configured for transmission of BLUETOOTH® beacons. In some embodiments, each of the wireless transmitting devices $128_1$-$128_i$ may be a SoC configured for transmission of BLUETOOTH® Low Energy beacons. The wireless transceiver 108 also includes an optional attachment mechanism 132. In one embodiment, the attachment mechanism 132 may be an adhesive applied to a top surface of the housing 130. In another embodiment, the attachment mechanism 132 may be a securing mechanism, such as straps or hooks for example. In a second embodiment, the attachment mechanism 132 may be an extension of the housing 130 and integrally formed therefrom. The wireless transceiver 108 may be removably coupled or permanently affixed to a portion of the automobile 110, e.g., the steering column. Additionally, in some embodiments, the wireless transceiver may include a battery 134 and a charging port 136. The battery 134 may provide power to the wireless transmitting devices $128_1$-$128_i$ and be charged by way of the charging port 136. Examples of types of charging connectors for which the charging port 136 may be configured include, but are not limited or restricted to, Universal Serial Bus (USB), Lightning, and/or Thunderbolt. Additionally, the wireless transceiver 108 may be configured for wireless charging through, for example, inductive charging. Alternatively, the wireless transceiver 108 may couple to a permanent power source of the automobile 110. For example, the wireless transceiver 108 may be directly or indirectly coupled to the battery of the automobile, e.g., via a reclosable fastener wherein each component of the fastener includes a mating side and a side including an adhesive, (not shown). One example of the reclosable fastener is any model of the 3M™ Dual Lock™ reclosable fastener product line.

Figure 2:
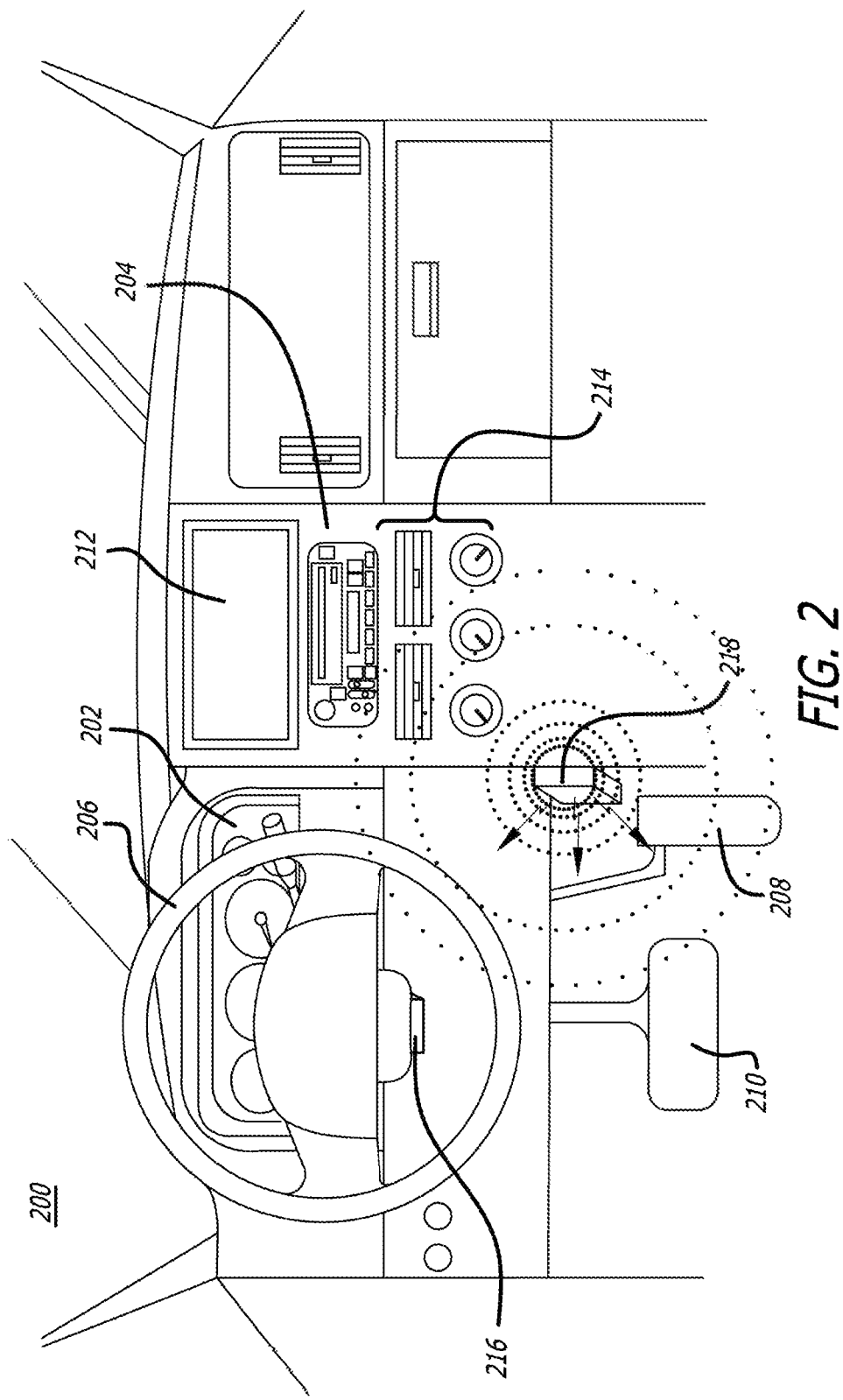
FIG. 2 is an exemplary illustration of an interior cabin of a second automobile including a wireless transceiver installed therein.

Referring to FIG. 2, an exemplary illustration of an interior cabin of a second automobile including a wireless transceiver installed therein is shown. Herein, the interior cabin of the second automobile 200 includes a dashboard 202, a center console 204, a steering wheel 206, a gas pedal 208, a brake pedal 210 and the wireless transceiver 218, similar to the illustration shown in FIG. 1B. In the embodiment illustrated in FIG. 2, the center console 204 is shown to include a display screen 212 and a plurality of controls 214, e.g., entertainment system controls, cabin climate controls, automobile safety feature controls, etc. In contrast to FIG. 1B, the standalone wireless transceiver 218 is provided. Specifically, the wireless transceiver 218 may be removably affixed to a component within the interior cabin. Similar to the wireless transceiver 108 of FIG. 1B, the wireless transceiver 218 transmits wireless signals, e.g., one or more beacons, that are received by the network device 106.

The wireless transceiver 218 may be coupled to the center console 116, as shown, as well as to the steering column and the steering wheel 118 itself, so long as such a coupling does not impede a driver's ability to safely operate the automobile 110. Further, the wireless transceiver 218 may be coupled to other portions of the automobile, including, for example, the dashboard 114, the driver's seat, etc. Additionally, as mentioned above, the NCZ system, specifically utilizing a wireless transceiver such as the wireless transceiver 218, may be used in locations outside of an automobile, i.e., home, workplace, office building, coffee shop, restaurant, etc.

Registration and Configuration Methodology

Figure 3:
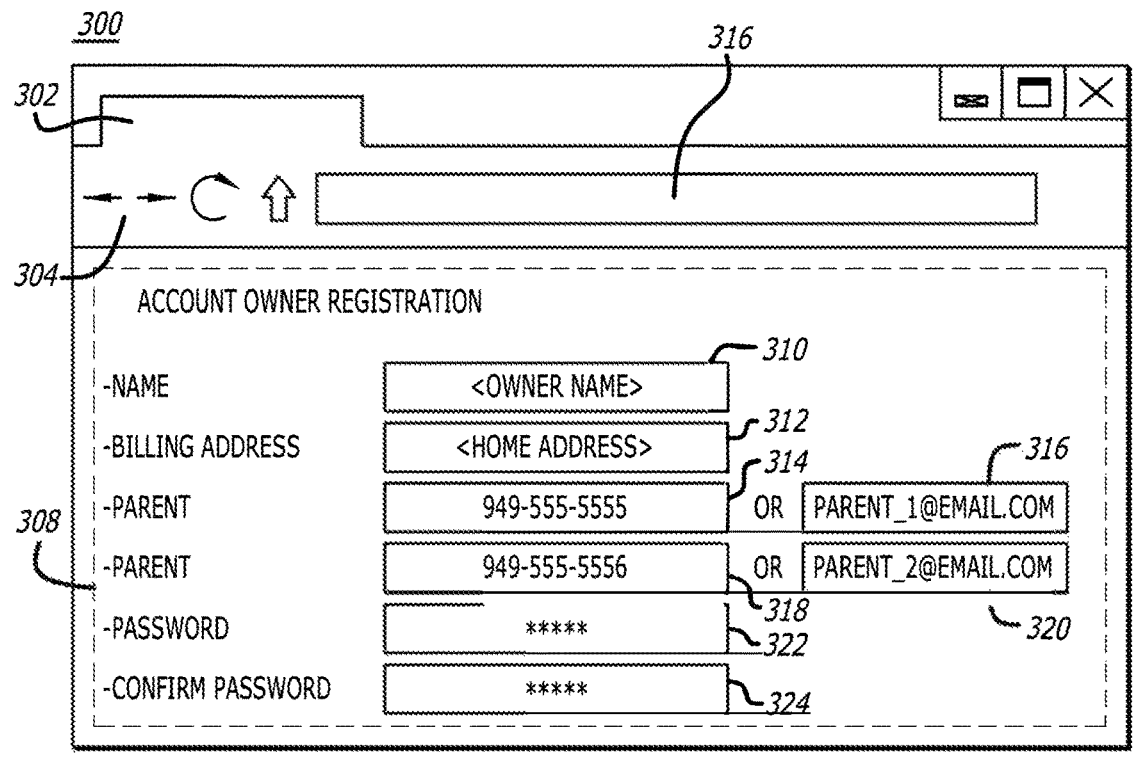
FIG. 3 is an exemplary display screen illustrating an internet browser presenting an account owner registration webpage.

Referring to FIG. 3, an exemplary display screen illustrating an internet browser presenting an account owner registration webpage is shown. The display screen 300 illustrates an internet browser 302 having a navigation toolbar 304, a location bar 306 and a content area 308, which includes an owner name text box 310, an owner billing address text box 312, first parental contact information text boxes 314-316, second parental contact information text boxes 318-320, a password text box 322 and a password confirmation text box 324. The display screen 300 is used by an account owner, e.g., a parent or car owner, to register with the NCZ system. Particularly, the owner name text box 310 may correspond to any parent, guardian, employer, etc., that will have the ability (e.g., permission) to set and/or modify the configuration settings for a user's account (e.g., restrict capabilities of a user's network device) as well as invite others to join (e.g., anyone that may drive an automobile to which a wireless transceiver is integrated or coupled).

The account owner registers by completing text boxes 310-312, at least one of either set of parental contact information text boxes 314-316 or 318-320, and the password and password confirmation text boxes 322-324. It should be noted that the account owner may be a parent corresponding to either set of parental contact information text boxes 314-316 or 318-320. Although in one embodiment, the account owner does not have to be a parent corresponding to either set of parental contact information text boxes 314-316 or 318-320. Additionally, although two sets of parental contact information text boxes are shown, more or fewer sets of parental contact information text boxes may be included. Additionally, an account owner may register a particular wireless transceiver via a device registration text box, not shown, which may act to attach a particular product warranty to the wireless transceiver, etc.

Figures 4A, 4B:
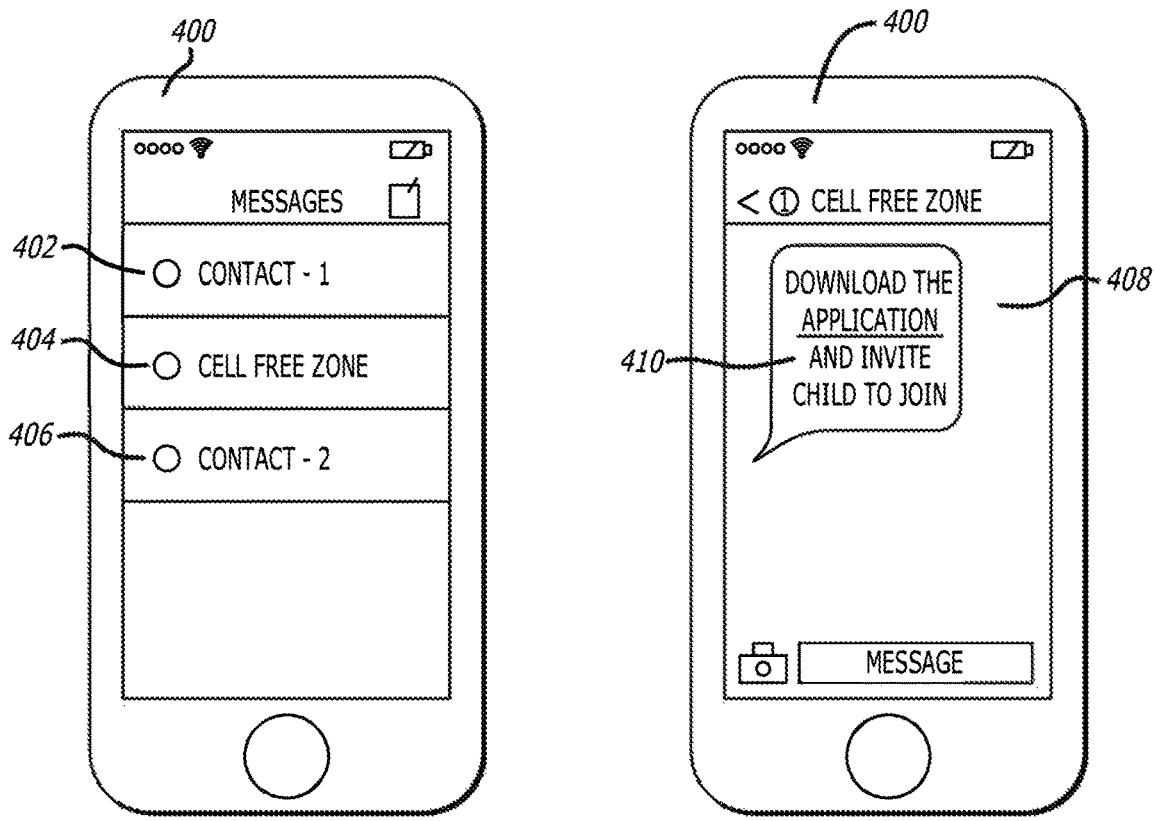
FIG. 4A is an exemplary illustration of a network device displaying a "Messages" screen presenting the user of the mobile device with a plurality of text message alerts.
FIG. 4B is an exemplary illustration of a network device displaying a text message.

Referring to FIGS. 4A-4F, a plurality of display screens displayed on a network device illustrating a process followed by a parent to register with the NCZ system is shown. Referring to FIG. 4A, a network device 400, e.g., a mobile device, is shown displaying a "Messages" screen presenting the user of the mobile device with a plurality of text message alerts. The text message alerts include a first text message alert 402 from Contact-1, a second text message alert 404 from NOCELL™ Zone and a third text message alert 406 from Contact-2. Selecting, e.g., via user input, to read the text message pertaining to the second text message alert 404 may result, directly or indirectly, in the display illustrated in FIG. 4B. Although FIGS. 4A-4F illustrate the invention utilizing text messaging as a communication method to communicate with a parent, the invention should not be so limited. Instead, any form of electronic communication may be used such as, for example, email, messaging via social media platforms (e.g., Facebook®, Instagram®, Snapchat®, etc.) and or messaging via any dedicated messaging application for network devices (e.g., WhatsApp®).

Referring to FIG. 4B, the network device 400 of FIG. 4A is shown displaying text messages from NOCELL™ Zone. A text message screen 408 illustrates a thread of text messages between the NOCELL™ Zone and the parent operating to the network device 400. The thread includes a message 410 that includes a link to download software application on the network device 400. It is noted that as many applications share content among a plurality of network devices (e.g., network devices configured with a common login, for example within the Apple® ecosystem, or with a single application using a single login across multiple devices); therefore, the message 410 may be used to install the software application on multiple devices. Selecting the link provided in the text message 410 may result, directly or indirectly, in the display of the illustration set forth in FIG. 4C.

Figure 4C:
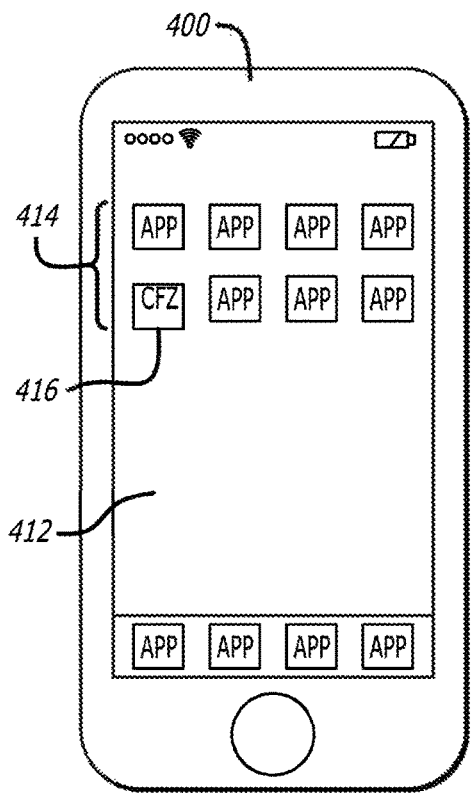
FIG. 4C is an exemplary illustration of a network device displaying a home screen including an icon corresponding to the software application.

Referring to FIG. 4C, an exemplary illustration of a network device displaying a home screen including an icon corresponding to the software application is shown. A home screen 412 is displayed on the network device 400. The home screen 412 is shown to include a plurality of icons 414 representing a plurality of applications that have been installed on the network device 400. In an alternative embodiment, at least a part of one or more of the plurality of applications may reside on cloud storage such that selection of an icon of the plurality of icons 414 results in retrieval of data from cloud storage. The plurality of icons 414 includes an icon 416 corresponding to the software application, which may be downloaded and installed on the network device 400 and/or at least partially stored on cloud storage. Selecting the icon 416 corresponding to the software application may result, directly or indirectly, in the display of the illustration set forth in FIG. 4D.

Figure 4D:
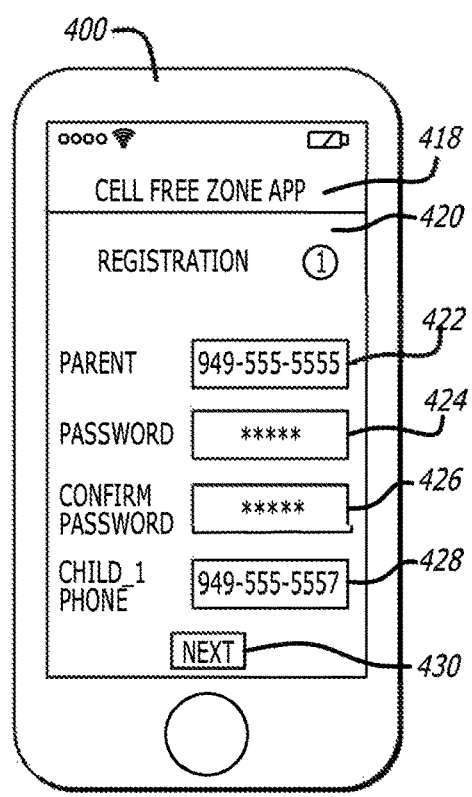
FIG. 4D is an exemplary illustration of a network device displaying a first display screen of the software application.

Referring to FIG. 4D, the network device 400 of FIG. 4A is shown displaying a first display screen of the software application. A content area 420 is displayed and corresponds to a registration screen for a parent. The content area 420 includes a plurality of text boxes for a parent to fill in in order to register with the NCZ system including a parent phone number text box 422, a password text box 424, a password confirmation text box 426, and a child_1 phone number text box 428. The parent's phone number is used in transmission of notifications pertaining to a child's driving, as will be discussed below and a password is established upon completion of the text boxes 424-426. The password will be required when an attempt to sign in to the parent's account is made, e.g., when modifications to the configuration settings of a child's account are desired. The phone number provided in text box 428 corresponds to a first child (or other driver) that will be utilizing the automobile in which a wireless transceiver is installed. Filling in the text boxes 422-428 and selecting the "Next" icon 430 may result, directly or indirectly, in the display of the illustration set forth in FIG. 4E.

Figure 4E:
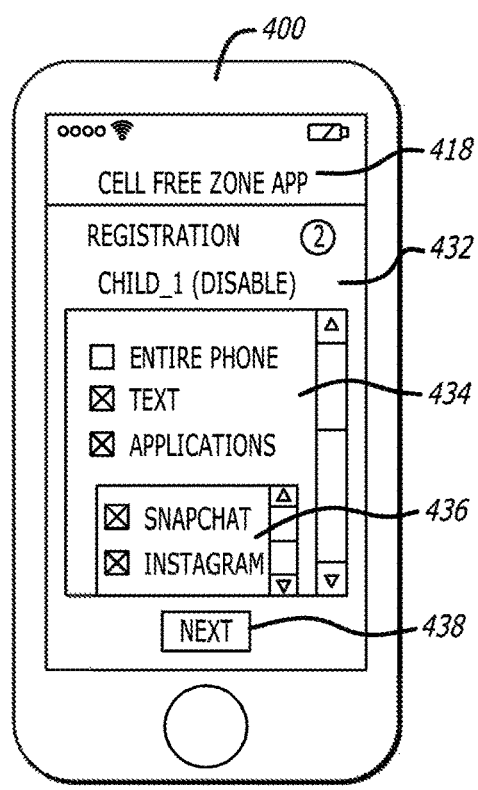
FIG. 4E is an exemplary illustration of a network device displaying a second display screen of the software application.

Referring to FIG. 4E, the network device 400 of FIG. 4A is shown displaying a second display screen of the software application. A content area 432 is displayed and corresponds to a second registration screen that is configured for a parent to select one or more functionalities that are to be disabled when the child's mobile device is within a predefined area within an automobile within which a wireless transceiver is installed. The content area 432 includes a scroll list 434 that lists functionalities of the child's mobile device that may be restricted or disabled. Examples of functionalities that may be restricted or disabled via the software application installed on the child's mobile device include, but are not limited or restricted to, disabling all functionalities (e.g., "entire phone"), disabling texting functionalities, disabling one or more applications, etc. In particular, the content area 432 may include a sub-scroll list 436 that lists individual applications installed on the child's device (or that may be installed on the child's device). In one embodiment, the NCZ system may be configured to receive a notification from the software application installed on the child's device and the notification may include a listing of applications installed on the child's mobile device such that the sub-scroll list 436 may be populated with the applications installed on the child's mobile device. Additionally, the NCZ system may receive notifications periodically, upon request, or upon a triggering event (e.g., a new application was installed) from the software application installed on the child's mobile device alerting the NCZ system of any additional applications that have been installed on the child's mobile device. A parent, e.g., operating the network device 400, may then be alerted to the new applications and decide if the new applications should be disabled when the child's mobile device is within the predefined range of the wireless transceiver, i.e., within the restricted zone. In a second embodiment, the sub-scroll list 436 may include a list of all possible applications that may be installed on the child's mobile device. In such an embodiment, the software application installed on the child's mobile device will disable any applicable applications selected by the parent according to the second display screen set forth in FIG. 4E. It should be noted that upon completion of the registration process by the parent operating the network device 400, the configuration settings are stored by the NCZ system (e.g., in a remote storage location and/or using cloud storage) and may also be transmitted to the child's mobile device (e.g., the mobile device corresponding to the number provided in the text box 428 of FIG. 4D. In some embodiments, the parent may configure a child's account to communicate with a predetermined wireless transceiver, e.g., via a communication chip and logic of the wireless transceiver. The communication chip may include a microcontroller and/or one or more radio units to provide wireless capability to the wireless transceiver. In one embodiment, the wireless capability includes at least BLUETOOTH® capability, but may include others mentioned above. In other embodiments, a child's account may be configured to recognize all wireless transceivers. Further, receiving input that selects the "Next" icon 438, may result, directly or indirectly, in the display of the illustration set forth in FIG. 4F.

Figure 4F:
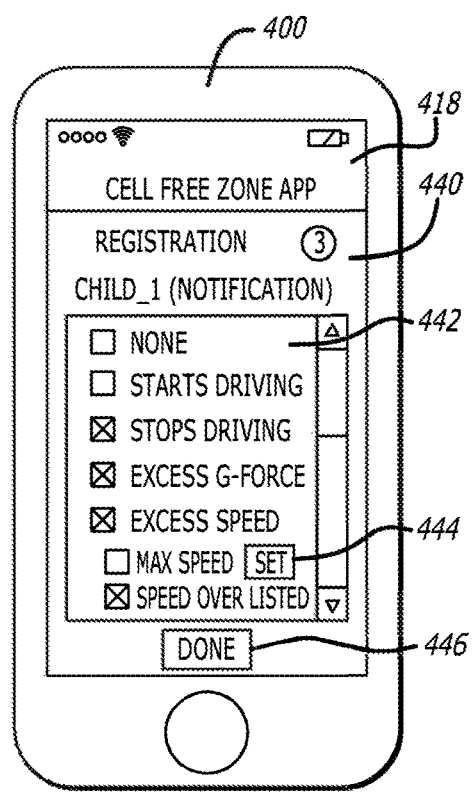
FIG. 4F is an exemplary illustration of a network device displaying a third display screen of the software application.

Referring to FIG. 4F, the network device 400 of FIG. 4A is shown displaying a third display screen of the software application. A content area 440 is displayed and corresponds to a third registration screen that is configured for a parent to select one or more events that trigger the transmission of a notification to the parent (e.g., to the network device 400, to one or more other network devices in addition to the network device 400, etc.). The content area 440 includes a scroll list 442 that lists events that are selectable to act as triggering events. Examples of event that may act as triggering events for the transmission of notifications to the parent include, but are not limited or restricted to, none (e.g., no notifications), start driving, stop driving, excess G-Force, excess speed (e.g., a predefined max speed via icon 444, a speed over the listed speed for that road, etc.), etc. The receipt of user input to the NCZ system causes the NCZ system to establish a set of triggering events, which act as rules that dictate when the software application installed on the child's mobile device is to report data to the NCZ system (e.g., data pertaining to the triggering event), transmit an alert to the parent, and/or provide an alert to the NCZ system to be further transmitted to the parent (e.g., and optionally stored on the NCZ system). Receiving input corresponding to a selection of the "Done" icon 446, may result, directly or indirectly, in the completion of the registration process set forth in FIGS. 4A-4F.

Figure 5A:
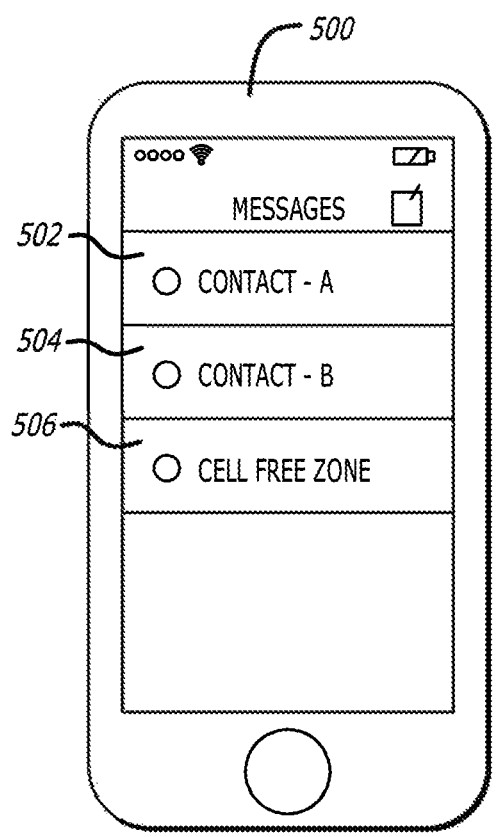
FIG. 5A is an exemplary illustration of a network device displaying a "Messages" screen presenting the user of the mobile device with a plurality of text message alerts.
Figure 5B:
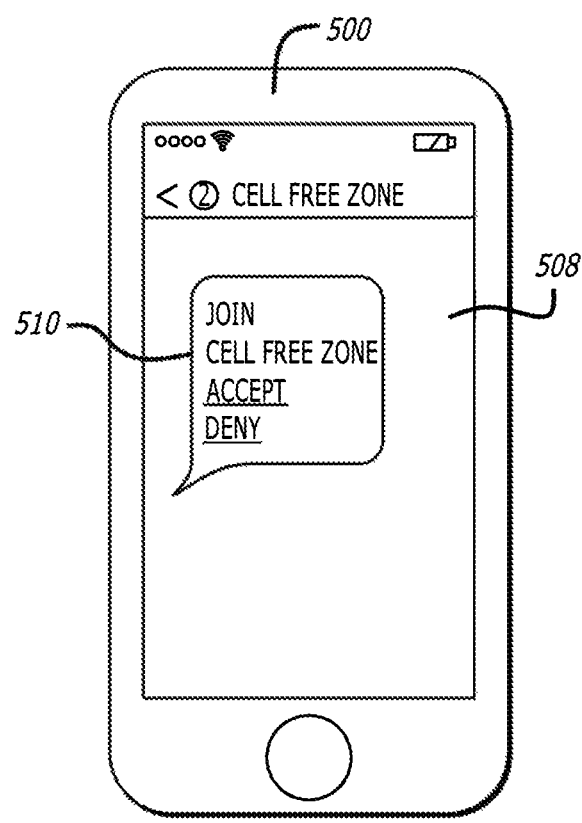
FIG. 5B is an exemplary illustration of a network device displaying a text message.

Referring to FIGS. 5A-5B, a plurality of display screens displayed on a network device illustrating a process followed by a child to download the software application is shown. Referring to FIG. 5A, a network device 500, e.g., a mobile device of a child, is shown displaying a "Messages" screen presenting the user of the mobile device with a plurality of text message alerts. The text message alerts include a first text message alert 502 from Contact-A, a second text message alert 504 from Contact-B and a third text message alert 506 from NOCELL™ Zone. Selecting, e.g., via user input, to read the text message pertaining to the third text message alert 504 may result, directly or indirectly, in the display illustrated in FIG. 5B. Although FIGS. 5A-5B illustrate the invention utilizing text messaging as a communication method to communicate with a child's network device, the invention should not be so limited. Instead, any form of electronic communication may be used as discussed above with respect to FIGS. 4A-4F.

Referring to FIG. 5B, the network device 500 of FIG. 5A is shown displaying a text message from NOCELL™ Zone. A text message screen 508 illustrates a thread of text messages between the NOCELL™ Zone and the child operating to the network device 500. The thread includes a message 510 that includes a link to download software application on the network device 500. For example, by receiving user input selecting the "Accept" link, the NCZ system may transmit a notification to the parent that invited the child (e.g., refer to FIGS. 4A-4F) and present the child with an icon configured to initiate the download of the software application on the network device 500 (e.g., via an application "store"). In one embodiment, receiving user input selecting the "Accept" link may cause the network device 500 to automatically begin a download of the software application. In one embodiment, receiving user input selecting the "Deny" link may cause the NCZ system to transmit a notification to the parent that invited the child operating the network device 500 that the invitation to join the NCZ system and download the software application was declined. As discussed above with respect to FIGS. 4A-4F, as many applications share content among a plurality of network devices, the message 510 may be used to install the software application on multiple devices.

Figure 6A:
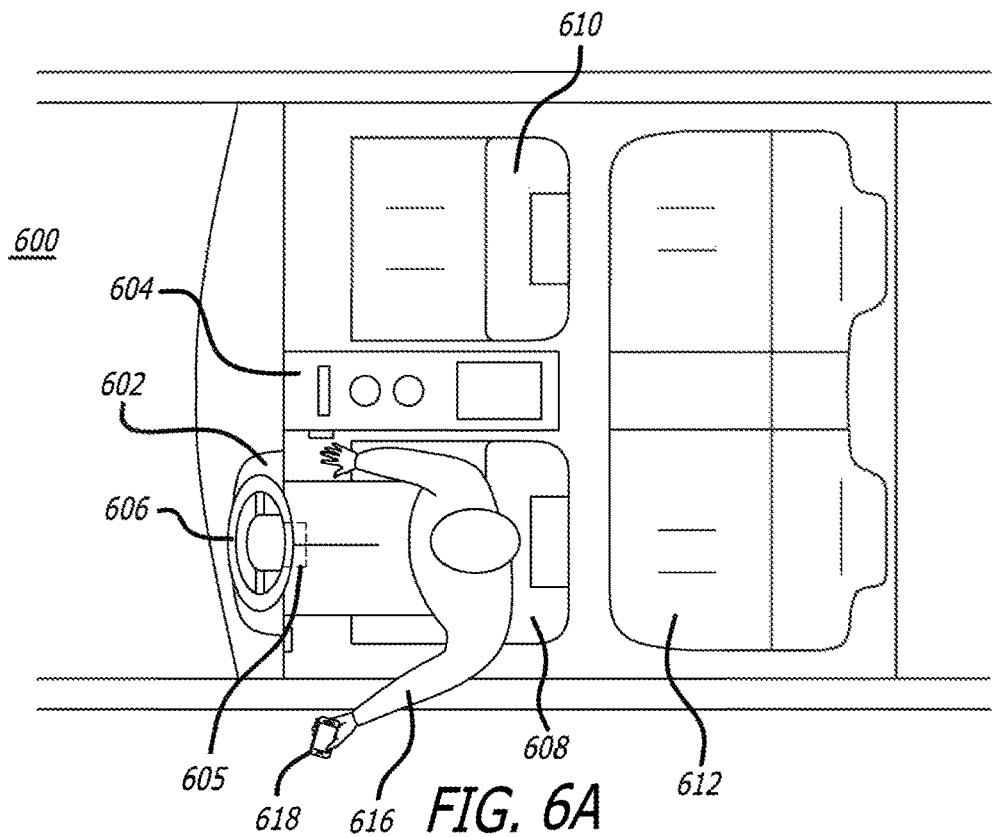
FIG. 6A is a first exemplary illustration of an interior cabin of an automobile including a wireless transceiver installed therein.
Figure 6B:
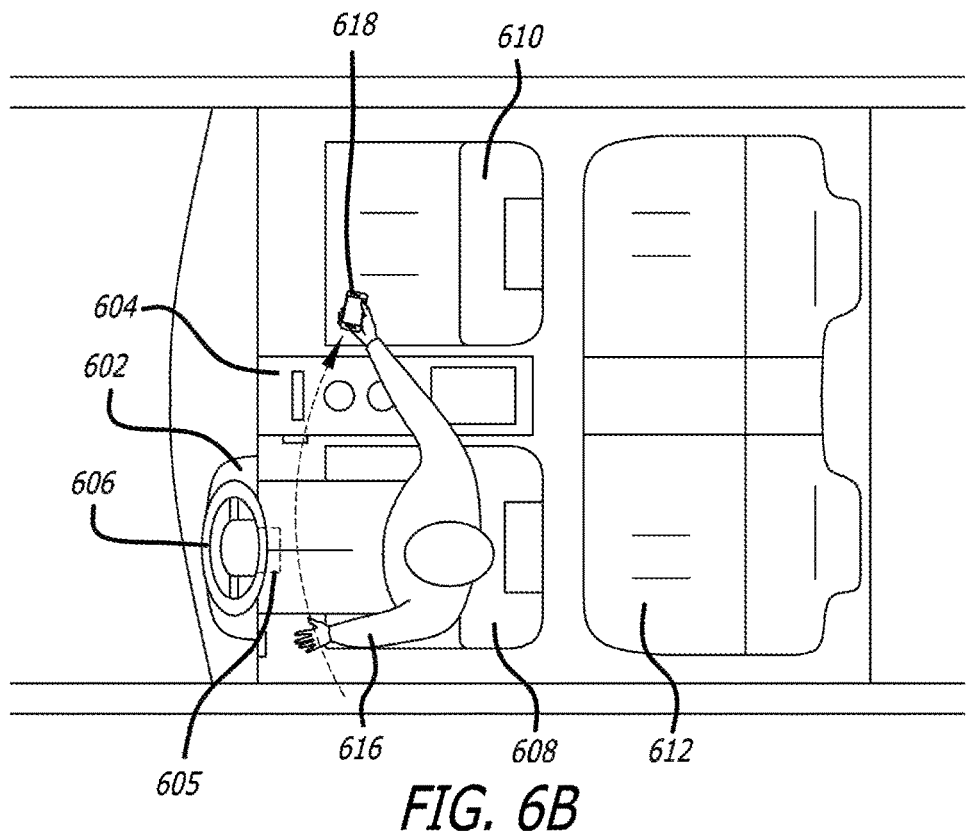
FIG. 6B is a second exemplary illustration of the interior cabin of the automobile of FIG. 6A including the wireless transceiver installed therein.

In one embodiment, a wireless transceiver may be affixed, either permanently or removably, to a component within an interior cabin of an automobile. Referring to FIGS. 6A-6B, a plurality of illustrations provide a visual demonstration of the process for configuring a network device, and the software application installed thereon, for use with a wireless transceiver installed within an interior cabin of an automobile is shown. For example, the wireless transceiver 605 may be affixed to the steering wheel column or may be integrated into a dashboard 602 or a steering wheel 606. Referring to FIG. 6A, a first exemplary illustration of an interior cabin of an automobile including a wireless transceiver 605 installed therein is shown. Herein, the interior cabin of the automobile 600 includes the dashboard 602, a center console 604, the wireless transceiver 605, the steering wheel 606, a driver's seat 608, a front passenger's seat 610 and a backseat 612. Additionally, a person 616 is shown sitting in the driver's seat 608 holding a network device 618. As discussed above, following download and installation of the software application on the network device 618, a configuration process is undertaken that configures the software application for use with the wireless transceiver 605.

The process of configuring the software application of the NCZ system that is installed on the network device 618 has the purpose of establishing an area, e.g., a "restricted area," at least partially covering the driver's seat 608 in which the software application will disable the functionalities predefined by a parent, guardian, employer, etc., as discussed above. In particular, the restricted area forms a virtual region having the wireless transceiver 605 as a center point. In one embodiment, the region may take the shape of a circle; however, other shapes have been contemplated. The restricted area is a zone in which a parent, guardian, employer, etc., has restricted the use of one or more predefined functionalities of the network device 618 by use of the software application installed thereon. Once the software application has been configured and the restricted area established, the functionalities predefined by a parent, guardian, employer, etc., will be disabled when the automobile is in use and the network device 618 is within the restricted area. Thus, the NCZ system, including the wireless transceiver 605 and the software application installed on the network device 618, restrict the use of the network device 618 from being used within a predefined range of the wireless transceiver 605. The NCZ system, as discussed above, limits the distractions to the driver that are provided by the network device 618, e.g., texting, emailing, browsing social media, changing music, etc.

Still referring to FIG. 6A, the configuration of the software application installed on the network device 618 may be a multi-step process that includes, inter alia, steps of (i) initiating a measuring phase, which causes the wireless transceiver of the network device 618 to measure the signal strength of a beacon(s) generated by the wireless transceiver 605, (ii) continuing to measure the signal strength of the beacon(s) as the network device 618 is moved from a first position to a second position (additional positions are also possible), (iii) determining a value indicating the weakest signal strength of the beacon(s) that was measured during the measuring phase, and (iv) storing the value indicating the weakest signal strength of the beacon(s) for use in creating the restricted area. As an optional initial step, receipt of the beacon(s) by the network device 618 may cause the network device 618 to launch the software application and/or identify the presence of the NCZ system. In some embodiments, the wireless transceiver of the network device 618 may be an integrated circuit, such as a SoC configured for receipt and transmission of BLUETOOTH® beacons.

When the configuration process is initiated, the software application may, either automatically or in response to user input, begin to determine the signal strength of a beacon(s) detected by the wireless transceiver of the network device 618. In one embodiment, the network device 618 may display a configuration screen, not shown, that receives user input to begin and end the measuring phase. Such an embodiment enables the person 616 configuring the software application installed on the network device 618 to set a beginning time and end time for the measuring phase. As shown in FIG. 6A, the network device 618 is held in a first position with respect to the wireless transceiver.

Referring now to FIG. 6B, a second exemplary illustration of the interior cabin of the automobile of FIG. 6A including the wireless transceiver installed therein is shown. As illustrated, the person 616 is shown to have moved the network device 618 from a first position (e.g., FIG. 6A) to a second position during the configuration process. During the movement of the network device 618 from the first position to the second position, the wireless transceiver of the network device 618 measures the signal strength of the beacon(s) generated by the wireless transceiver 605 while in the measuring phase. The configuration of the software application continues upon the completion of the measuring phase by determining, by the software application, the weakest measured signal strength of the beacon(s) during the measuring phase. The value indicating the weakest measured signal strength of the beacon(s) is stored by the software application and is used by the software application as the threshold indicating when the software application is to disable predefined functionalities of the network device 618. Specifically, the location of the weakest measured signal strength of the beacon(s) indicates the position of the network device 618 when the network device 618 is the farthest from the wireless transceiver 605 during the measuring phase; therefore, establishing an outer limit for the range within which the software application disables one or more functionalities of the network device 618 (e.g., a perimeter). As a result, the restricted area is established and defined by the value indicating the weakest measured signal strength of the beacon(s) during the measuring phase.

In one example, a parent may establish a restricted area in an automobile for a child's mobile device by sitting in the driver's seat with the mobile device, and turning the automobile on. Upon receiving input by the parent to initiate the configuration process and additionally to begin the measuring phase, the software application obtains readings from the mobile device's wireless transceiver 605. As the parent moves the mobile device across multiple positions (e.g., spanning the area reachable by a child sitting in the driver's seat), the software application continues to obtain readings from the wireless transceiver 605. The measuring phase is complete when the network device 618 receives user input corresponding to ending the measuring phase. Alternatively, the measuring phase may end upon expiration of a timer. As discussed above, the software application of the network device 618 then determines and stores a value indicating the weakest measured signal strength of the beacon(s), which is used to establish a perimeter of the restricted zone.

Figure 6C:
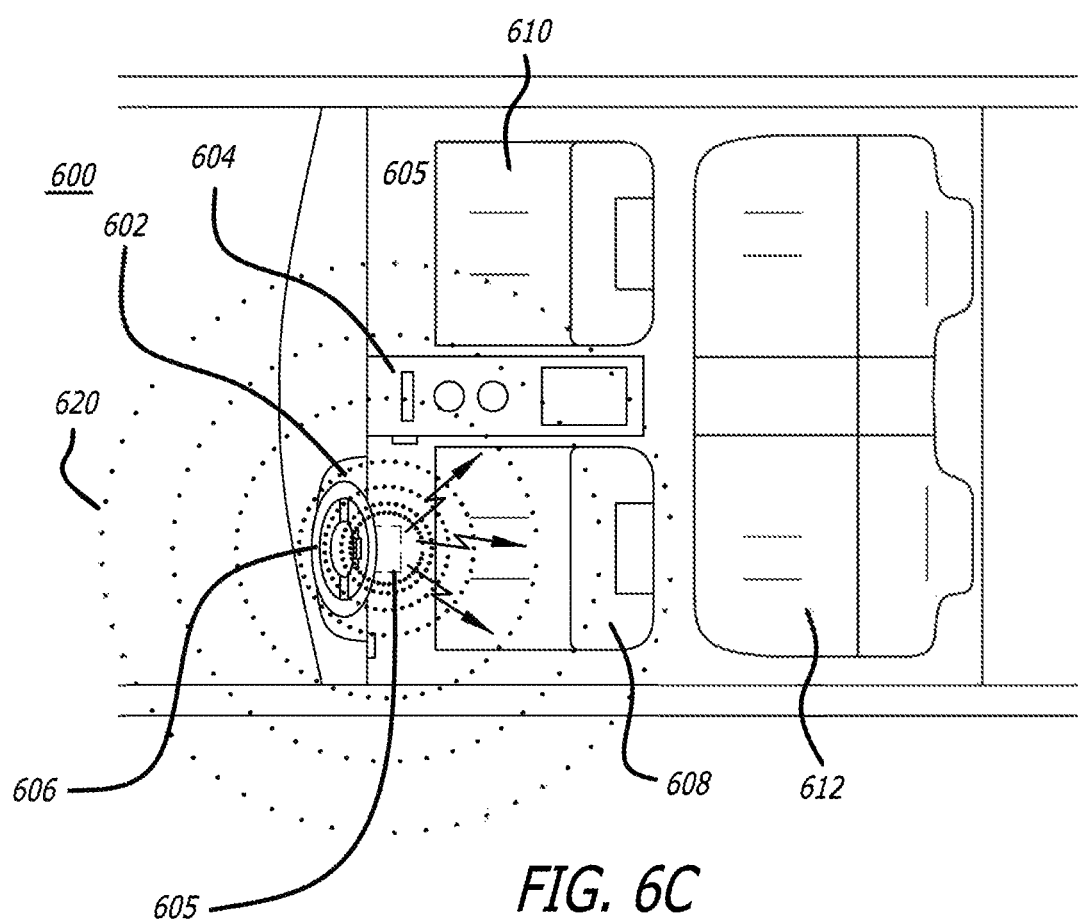
FIG. 6C is a third exemplary illustration of the interior cabin of the automobile of FIG. 6A including the wireless transceiver installed therein.

Referring now to FIG. 6C, a third exemplary illustration of the interior cabin of the automobile of FIG. 6A including the wireless transceiver installed therein is shown. FIG. 6C also illustrates an exemplary restricted area 620. As shown, the restricted area 620 is a circular area having the wireless transceiver 605 as the center point of the circle and the outer most dotted circular ring representing the perimeter of the restricted area 620. When the network device 618, not shown in FIG. 6C, is located within the restricted area 620 and the automobile 600 is turned on, the network device 618 will receive a wireless signal (e.g., beacon) from the wireless transceiver 605 and detect a signal strength of a beacon(s) that is above a first threshold. As stated above, detection of the signal strength of the beacon(s) above a first threshold indicates to the software application that the network device 618 is within the restricted area. Subsequently, the software application installed on the network device 618 will disable the functionalities predefined by a parent, guardian, employer, etc.

In the embodiment shown, the restricted area 620 is shown to cover the driver's seat 608, a portion of the center console 604, and a portion of the front passenger's seat 610. As a result, a driver is unable to use certain functionalities of the network device 618 and is thus less distracted than if the driver had access to all of the functionalities of the network device 618. It is noted that a passenger, e.g., sitting in either the front passenger's seat 610 or in the backseat 612, may utilize any and all functionalities of the network device 618 when the network device 618 is not within the restricted area 620. The restricted area 620 is illustrated as having a first size (e.g., a first radius); however, the disclosure should not be so limited as the size of the restricted area is configurable as discussed above. Specifically, a restricted area may be configured with a smaller or larger radius than shown in FIG. 6C. Additionally, a restricted area may be specific to each network device. For example, in one embodiment, a first network device may be configured with a first restricted area having a first size while a second network device may be configured with a second restricted area having a second size, the first size being different than the second size.

In an alternative embodiment, an alternative configuration of the software application installed on network device may be utilized. Instead of requiring a user, e.g., the person 616, to launch the software application on a network device and move the network device from a first position to a second position in order to establish a restricted zone, e.g., the restricted zone 620, the software application may include, or have access to via, for example, an internet connection, and predetermined thresholds that define a restricted zone, e.g., the restricted zone 620, as discussed above. For instance, in such an embodiment, the user, e.g., the person 616, may provide a vehicle's make and model via user input to the network device and the software application may retrieve a corresponding predetermined threshold for received signal strength of a beacon. In particular, the retrieved predetermined threshold corresponds to the particular vehicle's make and model as the interior cabins of different vehicles may vary, thereby selecting a restricted zone that covers at least the area surrounding the driver but does not preclude other passengers from utilizing network devices that may have the software application installed thereon.

Figure 6D:
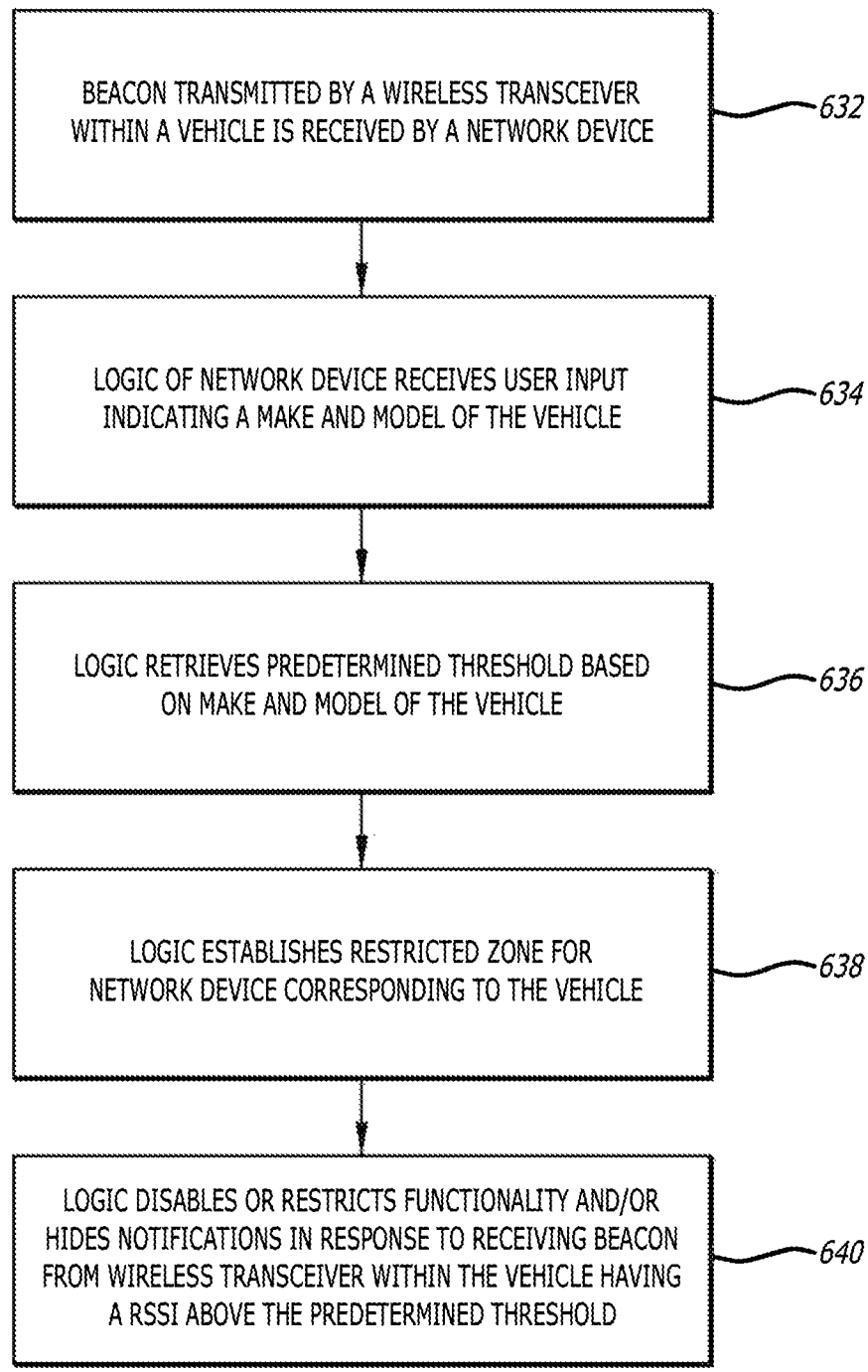
FIG. 6D is a flowchart illustrating an exemplary process for configuring a software application of a network device for use with the NCZ system of FIG. 1A.

Referring now to FIG. 6D, a flowchart illustrating a second configuration process of a software application installed on a network device is shown. Each block illustrated in FIG. 6D represents an operation performed in the method 630 of configuring a software application of the NCZ system of FIG. 1 installed on a network device. In one embodiment, the method 630 begins when a beacon that is transmitted by a wireless transceiver within a vehicle is received by a network device (block 632). For example, a user of a network device may begin configuration of a software application of the network device by moving within a close proximity to the vehicle such that the network device receives a beacon transmitted by the vehicle.

In some embodiments, logic of the network device also receives user input indicating a make and model of the vehicle (block 634). The user, subsequent or prior to the network device receiving the beacon, may provide the network device with input indicating the make and model of the vehicle from which the received beacon was transmitted. In other embodiments, the wireless transceiver transmitting the beacon may be configured to include the make and model of the vehicle in the beacon. For example, when the vehicle is purchased with a wireless transceiver, e.g., integrated into the center console or steering column, the wireless transceiver may be configured to transmit beacons that indicate the make and model of the vehicle. In some instances, the beacon may utilize one or more bytes comprising a beacon to indicate the make and model of the vehicle, for example, by setting flags enabling the logic installed on the network device to determine the make and model.

Responsive to determining the make and model of the vehicle, the logic retrieves a predetermined threshold based on the make and model (block 636). The logic of the network device may include a plurality of predetermined thresholds, wherein each predetermined threshold corresponds to one or more vehicles (e.g., make and model). Alternatively, the logic may have access to one or more databases that store predetermined thresholds, e.g., via a network connection. In one embodiment, a predetermined threshold corresponds to a received signal strength of a beacon. In particular, when a network device receives a beacon having a signal strength greater than or equal to the predetermined threshold, the logic of the network device determines the network device is within a restricted zone for the vehicle and disables or hides one or more functionalities or notifications as discussed above. However, when a network device receives a beacon having a signal strength less than the predetermined threshold, the logic of the network device determines the network device is not within a restricted zone and does not disable or hide functionality or notifications.

Thus, based on the retrieved predetermined threshold, the logic of the network device establishes a virtual restricted zone for the network device corresponding to the specific vehicle (e.g., according to the make and model) (block 638). Therefore, the logic of the network device is configured to establish a restricted zone such that the size of the restricted zone is specific to the make and model of the vehicle. For example, the interior cabin of a Fiat 500 is a different size than the interior cabin of a Cadillac Escalade; therefore, the logic of the network device establishes a restricted zone for the vehicle based on the vehicle's make and model based selecting a predetermined threshold that corresponds to the size of the interior cabin of the vehicle.

When the logic of the network device receives a beacon from the vehicle and the beacon has a received signal strength greater than or equal to the predetermined threshold, the logic disables or restricts one or more functionalities and/or hides notifications, as discussed above (block 640).

Additionally, the beacon transmitted from the wireless transceiver may include an identifier that uniquely identifies the wireless transceiver, and consequently, the vehicle. The logic may create and store a profile for a specific vehicle that includes the predetermined threshold and the identifier that uniquely identifies the transceiver of the specific vehicle. Further, the logic may create and store a plurality of profiles (e.g., one profile for each unique identifier) so that when a beacon is received by the network device, the logic may determine the predetermined threshold based on the unique identifier included in the beacon based on a stored profile. Thus, the logic of a network device may be configured for use in a plurality of automobiles, possibly having different sized interior cabins. This may result in the user of different predetermined thresholds based on the particular vehicle. When a beacon is received that includes a unique identifier not recognized by the logic (e.g., within a profile stored by or accessible to the logic), the logic may begin the method 630 as set forth in operation 632.

In some embodiments, when a user manually configures the logic to create a restricted zone for a vehicle, i.e., as discussed above with respect to FIGS. 6A-6C, the manually configured restricted zone may override the profile or replace the predetermined threshold based on an automated determination from information within the beacon. More specifically, when a user manually configures the logic for a specific vehicle, the profile created by the logic includes the unique identifier of the specific vehicle and the predetermined threshold corresponding to the manually created restricted zone (e.g., the signal strength determined based on movement of the network device from a first position to a second position as discussed above).

General Use Case

FIGS. 7A-7B provide illustrations of communication pathways between the NCZ system and a network device. Referring to FIG. 7A, an illustration of one or more wireless signals being transmitted to a network device is shown. The wireless transceiver 702 may be an electronic device configured to transmit and/or receive wireless signals, e.g., beacons, $704_1$-$704_N$ (N≥1). As illustrated in FIG. 7A, the wireless transceiver 702 transmits signals $704_1$-$704_N$ and a wireless transceiver 708 of the network device 706 is configured to detect the beacons $704_1$-$704_N$. Responsive to detecting the beacons $704_1$-$704_N$, the processor 710 of the network device 706 may launch the mobile application 712, which may be stored on the network device 706 in a storage medium located therein.

Referring to FIG. 7B, an illustration of the beacon generated by the wireless transceiver 702 and detected by the network device 706 of FIG. 7A is shown. The wireless transceiver 702 may include one or more wireless transmitting devices, such as the wireless transmitting devices $128_1$-$128_i$ as illustrated in FIG. 1C, that generate beacons. As illustrated in FIG. 7B, the wireless transceiver 702 generates the beacons $704_1$-$704_N$ and a wireless transceiver 708 of the network device 706 is configured to detect the beacons $704_1$-$704_N$ as well as the strength thereof. As discussed above, the strength signal of the beacons $704_1$-$704_N$ may be based on a RSSI or an absolute measure of the signal strength as measured in dBms. Responsive to detecting the strength of the beacons $704_1$-$704_N$ being greater than or equal to a first threshold (e.g., a value indicating a weakest strength detected during a measuring phase as discussed above), the mobile application 712 provides instructions to one or more applications to close, hide notifications and/or restrict or disable functionality. Additionally, the mobile application 712 may itself cause the disabling of predefined functionalities of the network device 706. Upon detection of a strength of a beacon that is less than the first threshold, the mobile application 712 permits full functionality of the network device 706 (e.g., provides enabling instructions to one or more applications, revokes the disabling instructions, etc.).

Software Application Monitoring Methodology

Figure 8:
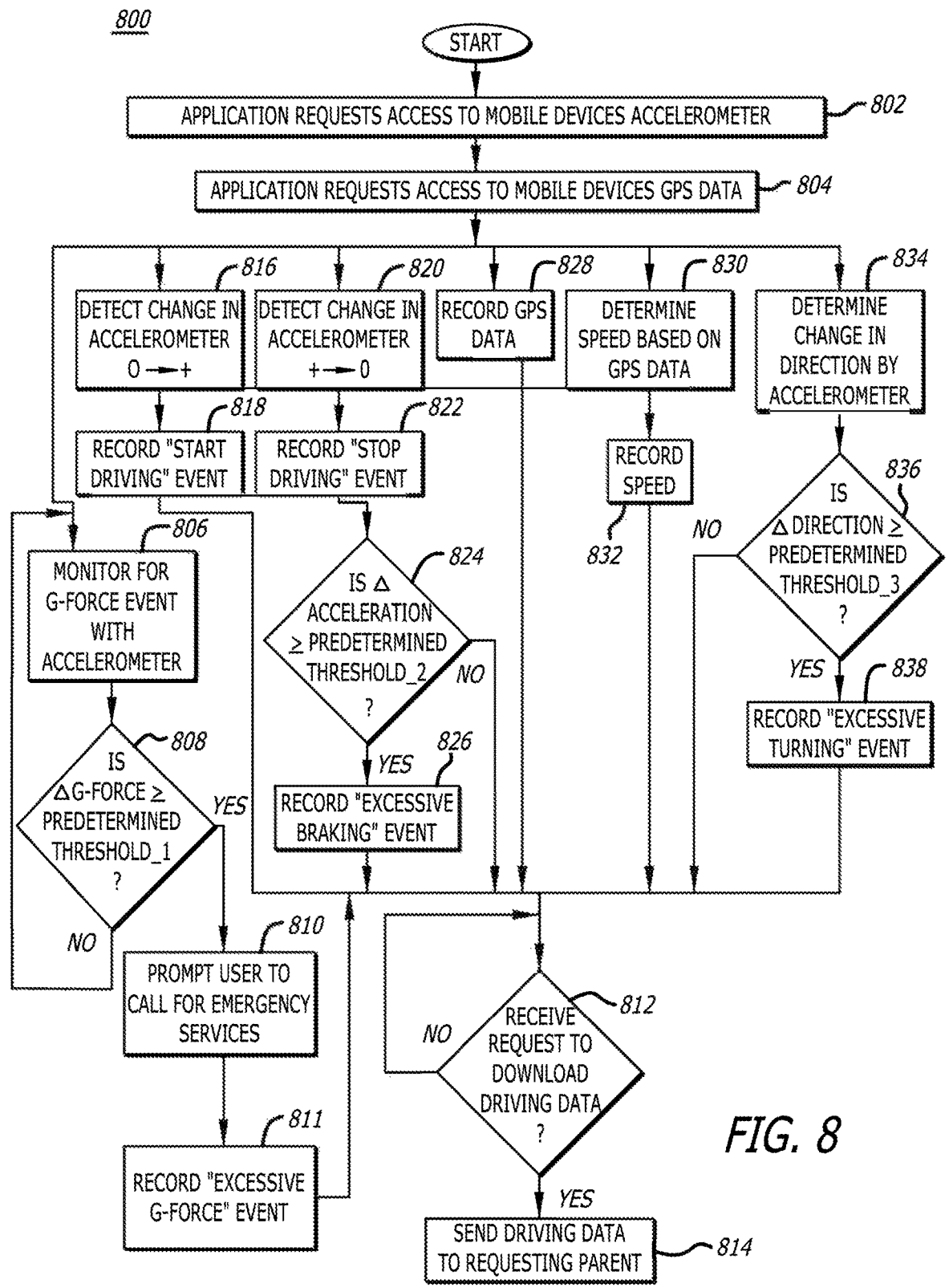
FIG. 8 is a flowchart illustrating an exemplary process for monitoring driving data and providing notifications corresponding thereto.

Referring to FIG. 8, a flowchart illustrating an exemplary process for monitoring driving data and providing notifications corresponding thereto is shown. Each block illustrated in FIG. 8 represents an operation performed in the method 800 of monitoring driving data and providing notifications corresponding thereto by a NCZ system. The method 800 is undertaken following a determination by a software application of a network device that the network device is within a restricted area, as discussed above. The process starts and at block 802, the software application installed on the network device, e.g., a mobile device, requests to access the accelerometer of the mobile device. As discussed with respect to the method 800, the mobile device, having a wireless transceiver installed therein, is located within an automobile and receives one or more beacons from a second wireless transceiver located within the automobile but external to the mobile device, as discussed above. At block 804, the software application requests access to global positioning system (GPS) data of the mobile device. Following the receipt of access to the accelerometer and the GPS data, a plurality of operations may occur concurrently (at least partially overlapping in time). As illustrated in FIG. 8, two or more of blocks 806, 812, 816, 828, 830 and 834 may occur concurrently.

At block 806, the software application monitors for a G-force event with the accelerometer. As used herein, the term "G-force event" may refer to a change in the velocity greater than or equal to a predetermined threshold within a predetermined time period. In one embodiment, a G-force event may correspond to the occurrence of an accident (e.g., a sudden stop wherein the change in velocity is greater than a predetermined threshold).

At block 808, the software application determines whether a change in the G-force is greater than or equal to a predetermined threshold_1. When the change in the G-force is not greater than or equal to the predetermined threshold_1, e.g., no G-force event (no at block 808), the method 800 returns to monitoring for a G-force event. When the change in the G-force is greater than or equal to the predetermined threshold_1, e.g., a G-force event (yes at block 808), the network device may display a pop-up asking if a call to emergency services needs to be made (e.g., an accident occurred) (block 810). Subsequently, or concurrently, to the display of the pop-up, the software application records the occurrence of an excessive G-force event (block 811). At block 812, the software application and/or logic of the cloud server determines whether a request to download driving data has been received (block 812). When no request has been received (no at block 812), the software application continues to monitor for receipt of a request for driving data. When a request has been received (yes at block 812), the software application transmits the driving data to the cloud server and/or directly to the parent device requesting the driving data (block 814).

At block 816, the software application detects a change in the accelerometer (from a zero (0) value to a positive measurement) representing a "start driving" event. At block 818, the software application records a start driving event along with applicable metadata (e.g., time, date, GPS location, etc.). The process 800 may then proceed to block 812 and determine whether a request for driving data was received, although such an operation may occur concurrently with blocks 816 and 818.

At block 820, the software application detects a change in the accelerometer (from a positive measurement to a zero (0) value) representing a "stop driving" event. At block 822, the software application records a stop driving event along with applicable metadata (e.g., time, date, GPS location, etc.). The software application then determines whether the change in acceleration is greater than or equal to a predetermined threshold_2 (block 824). When the change in acceleration is greater than or equal to a predetermined threshold_2 (yes at block 824), the software application records an "excessive braking" event (block 826). It should be noted that two or more events may correspond to the same portion of driving data. For example, a sudden stop may result in the recordation of a G-force event and a stop driving event. The process 800 may then proceed to block 812 and determine whether a request for driving data was received, although such an operation may occur concurrently with blocks 820, 822, 824 and 826.

At block 828, the software application records the GPS data (e.g., time, date, speed, etc.). The process 800 may then proceed to block 812 and determine whether a request for driving data was received, although such an operation may occur concurrently with block 828. At block 830, the software application determines a speed of the automobile based on the GPS data. At block 832, the software application records the automobile speed along with applicable metadata (e.g., time, date, GPS location, etc.). The process 800 may then proceed to block 812 and determine whether a request for driving data was received, although such an operation may occur concurrently with blocks 830 and 832.

At block 834, the software application determines a change in a direction of the automobile has occurred based on a change of measurements by the accelerometer. At block 836, the software application determines whether the change in direction is greater than or equal to a predetermined threshold_3 (block 836). When the change in direction is greater than or equal to a predetermined threshold_3 (yes at block 836), the software application records an "excessive turning" event (block 838). The process 800 may then proceed to block 812 and determine whether a request for driving data was received, although such an operation may occur concurrently with blocks 834, 836 and 838.

Provision of Notifications Methodology

Figure 9:
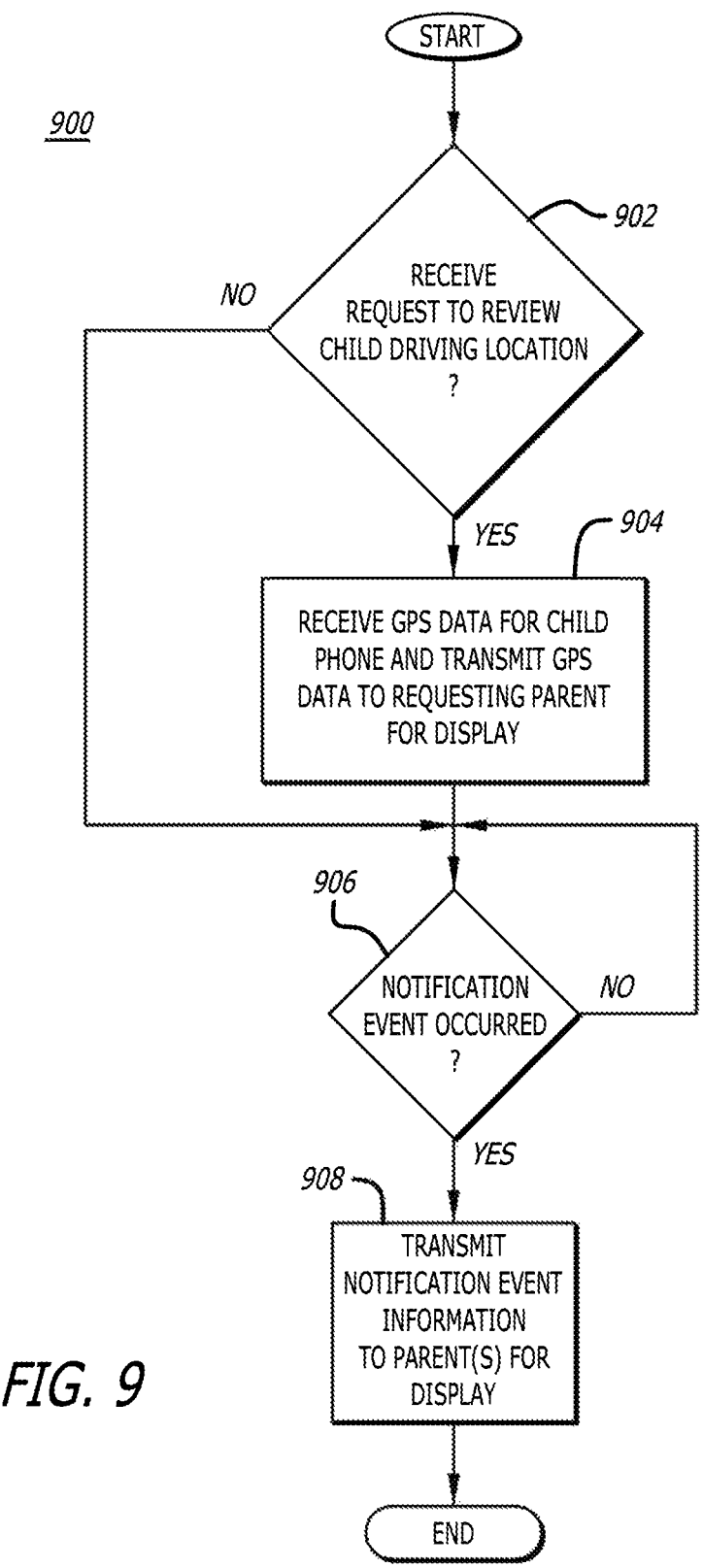
FIG. 9 is a flowchart illustrating an exemplary process for providing notifications corresponding to a child's driving.

Referring now to FIG. 9, a flowchart illustrating an exemplary process for providing notifications corresponding to a child's driving is shown. Each block illustrated in FIG. 9 represents an operation performed in the method 900 of providing notifications corresponding to a child's driving by a NCZ system. Herein, the process starts and at block 902 the NCZ system determines whether a request to review a child's driving location has been received. When a request to review a child's driving location has been received (yes at block 902), the NCZ system requests and receive GPS data from the child's network device and transmits the child's GPS data to the network device of the requesting parent for display (block 904). When a request to review a child's driving location has not been received (no at block 902), the method 900 proceeds to block 906.

At block 906, the NCZ system determines if one or more notification events have occurred, e.g., as discussed in FIG. 8. In one embodiment, a notification event may be a triggering event that has been predefined for a particular child by a parent. As discussed above with respect to FIGS. 4A-4F, a parent, guardian, employer, etc., may select one or more events, the occurrence of which result in the generation of a notification to the parent, guardian, employer, etc. Examples of events that may be notification events include, but are not limited or restricted to, a start driving event, a stop driving event, an excessive G-force event, an excess speed event, a max speed event, a speed over listed speed event, a start driving outside of a predefined time range event, etc.

When one or more notification events have not occurred (no at block 906), the process 900 continues to monitor for the occurrence of a notification event. When one or more notification events have occurred (yes at block 906), the NCZ system transmits notification event information to the parent that configured the child's account settings and/or one or more other parents, guardians, employers, etc. (block 908).

In additional embodiments, data may be collected by a software application installed on a monitored network device when the monitored network device is within a restricted area and store the collected data. Subsequently, the stored data may be transmitted periodically, aperiodically or in response to certain triggering events to the cloud server, a monitoring network device and/or other entity (e.g., a federal or state governmental agency such as a Department of Motor Vehicles (DMV) or an insurance company). In one embodiment, the collected data may be provided to the cloud server, a monitoring network device and/or other entity in the form of daily, weekly, monthly, etc. reports detailing the collected data. For example, a monitoring network device (e.g., a parent's mobile device) may receive weekly reports detailing the driving data of a child based on the data collected by the monitored network device (e.g., the child's mobile device) while the child's mobile device is in the restricted area of an automobile. In a second example, a monitoring device may be an insurance company and the monitored device may be a driver's mobile device. In such an example, the insurance company may receive weekly, monthly, yearly, etc. reports detailing the data collected by the driver's mobile device with in a restricted area. The insurance company may utilize the report to determine insurance premiums. In yet another example, a monitoring device may be an employer's network device and a monitored device may be an employee's mobile device. In such an example, the employer may receive daily, weekly, monthly, etc. reports detailing the data collected by the employee's mobile device while in a restricted area of a company-issued automobile. In an example in which the DMV receives a driver's collected data, the DMV may automate renewal of a license, revocation of a license and/or require the driver to take a driving course or driving exam based on the collected data. Furthermore, the generation of alerts, as discussed above, may also apply to any possible relationship (e.g., parent-child, employer-employee, entity-driver, etc.)

Although the disclosure focuses on the embodiment in which the NCZ system is implemented using an automobile, the disclosure should not be so limited. Instead, the NCZ system may be utilized in any space, for example, an area within an office building, an area within a library, on public transportation systems (e.g., train, taxi or plane), an area in a home, an area in an elementary school, high school, university, etc., or the like.

General Architecture—Policy Enforcement System

Referring to FIG. 10A, an exemplary illustration of a deployment of a policy enforcement system in connection with a first vehicle is shown. The policy enforcement system 1000 includes a policy enforcement server system 1002, a network device sensor 1004 (also referred to herein as a "wireless transceiver") 1004 and an application 1008. As illustrated, the policy enforcement system 1000 is deployed in connection with the vehicle 1006 wherein the wireless transceiver 1004 and a network device 1010 having the application 1008 installed thereon are located within the vehicle 1006. In one embodiment as illustrated, the policy enforcement server system 1002 is in communication with the application 1008 through the network device 1010. However, in other embodiments, each of the components of the policy enforcement system 1000 are in communication and operate collectively to enforce one or more sets of policies.

In particular, at a high-level, the wireless transceiver 1004, the application 1008 and the network device 1010 perform operations to determine whether the vehicle 1006 is moving and whether a set of policies is to be implemented with respect to the network device 1010 based on any detected movement of the vehicle 1006. In various embodiments, the application 1008 may obtain sensory data from components of the network device 1010 in order to determine movement, e.g., from an accelerometer and/or from a GPS unit. Alternatively, or in addition to, the wireless transceiver 1004 may capture movement data via an accelerometer and/or vibration data via a vibration sensor. As will be discussed below, the movement/vibration data may be provided to the application 1008 and be utilized by the application 1008 in determining whether implementation of the set of policies is to be continued. As used herein, sensory data refers to any data associated with data obtained through one or more sensors (e.g., accelerometer, GPS unit, gyroscope, vibration sensor, etc.).

Referring now to FIG. 10B, a second exemplary illustration of the policy enforcement system of FIG. 10A interacting with a network device of a second vehicle is shown. FIG. 10B provides a similar illustration as FIG. 10A in which the policy enforcement system 1000 is deployed in connection with the vehicle 1006. However, FIG. 10B further illustrates that the policy enforcement system 1000 may interact with network devices located in other vehicles (e.g., the network device 1012 located within the vehicle 1014). As discussed above, each network device may transmit a signal at regular time intervals including certain information, such as a Universally Unique Identifier (UUID), that enables logic included within the wireless transceiver ("wireless transceiver logic") to identify each network device. In some embodiments, the wireless transceiver logic may be programmed into an integrated circuit, as seen in FIG. 11. As will be discussed below with respect to FIGS. 13-14B, the wireless transceiver may form one or more lists identifying detected network devices in order to assess the content of the list(s) against a set of policies and/or driver/vehicle guidelines (discussed below), and, when applicable, transmit an alert to an administrator. Although not illustrated, an instance of the application 1008 may be installed on the network device 1012.

Figure 10C:
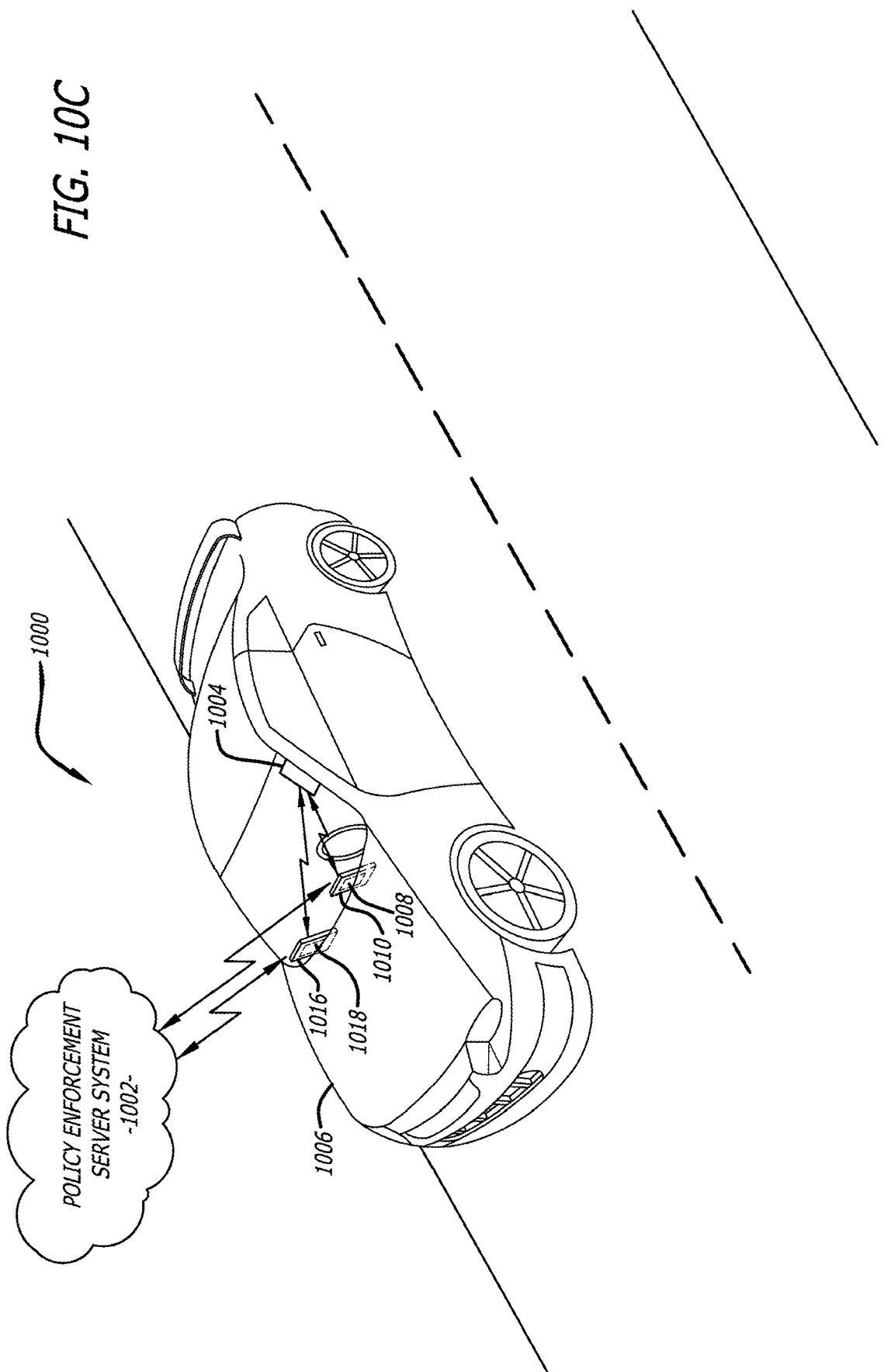
FIG. 10C is a third exemplary illustration of the policy enforcement system of FIG. 10A wherein two network devices are located within the first vehicle.

Referring to FIG. 10C, a third exemplary illustration of the policy enforcement system of FIG. 10A wherein two network devices are located within the first vehicle is shown. FIG. 10C provides a similar illustration as FIG. 10A in which the policy enforcement system 1000 is deployed in connection with the vehicle 1006. However, FIG. 10C further illustrates that the policy enforcement system 1000 may interact with multiple network devices located in a single vehicle (e.g., the network devices 1010, 1018 located within the vehicle 1006). In various embodiments, a first set of policies may be applied by each application to their corresponding network devices, different sets of policies may be applied to each network device, or a first set of policies may be applied to only one of the multiple devices. As will be discussed in detail below, each instance of the NCZ application (e.g., application 1008 and 1016) will attempt to connect to and communicate with wireless transceiver 1004. Based on information received from the wireless transceiver 1004, each instance of the NCZ application will determine whether its corresponding network device is closest to the wireless transceiver 1004, and when its corresponding network device is closest to the wireless transceiver 1004, the application will apply a set of policies to restrict and/or limit the functionality of its network device. In other embodiments, each instance of the NCZ application will determine whether its corresponding network device is within a predetermined distance to the wireless transceiver 1004 (e.g., based on the corresponding RSSI value), and when its corresponding network device is within the predetermined distance to the wireless transceiver 1004, the application will apply a set of policies to restrict and/or limit the functionality of its network device.

In some embodiments, a set of policies may only be applied to the network device determined to be closest in proximity to the wireless transceiver 1004, i.e., with the expectation that such network device is being handled by the driver (i.e., as is seen in FIGS. 10A-10C, the wireless transceiver 1004 is coupled to the interior of the vehicle on the side of the windshield opposite a front passenger seat).

In alternative embodiments, a first set of policies may be applied to all network devices determined with be located within the vehicle 1006 in order to remove all distractions. Predetermined rules or configuration settings may be used to determine which of the above applies. For example, a first rule set (e.g., driver/vehicle guidelines) may be used by the policy enforcement system 1000 when deployed in connection with a truck or van within a commercial fleet (e.g., apply a set of policies to all network devices having an instance of NCZ application installed thereon). As an additional example, a second rule set may be used by the policy enforcement system 1000 when deployed in connection with an individual's personal vehicle (e.g., apply a set of policies only to the network device determined to be located closest to the wireless transceiver, i.e., the network device of the driver).

Referring to FIG. 11, an exemplary block diagram of a wireless transceiver of the policy enforcement system of FIG. 10A is shown. The wireless transceiver 1004 (as referenced above, also referred to as a "network device sensor") is shown as having the shape of an ellipse. The wireless transceiver 1004 may have a height, e.g., constant in some embodiments but may vary in others, in order to accommodate components housed within. It should be understood that the wireless transceiver 1004 may take many different shapes and the disclosure is not intended to be limited to the wireless transceiver 1004 having the shape of an ellipse. Examples of other shapes include, but are not limited or restricted to, a triangle, a rectangle, a rhombus or a trapezoid. Further, the wireless transceiver 1004 may be, for example, predominantly spherical and include a flat edge configured for attachment to a surface, such as an interior panel of a vehicle. In some embodiments, the wireless transceiver 1004 may include a housing, which is made entirely or partially of a hardened material (e.g., hardened plastic, metal, glass, composite or any combination thereof) that protects circuitry and other components within the housing, namely an integrated circuit 1100, an optional vibration sensor 1102, an accelerometer 1104, a communications interface 1106 and a battery 1108. The communication interface 1106, under control by a communication interface logic (not shown), enables communications with external network devices, such as network devices and/or a cloud server.

According to one embodiment of the disclosure, the communication interface 1106 may be implemented with one or more radio units for supporting wireless communications with other electronic devices. Additionally, or in the alternative, the communication interface 1106 may be implemented as a physical interface including one or more ports for wired connectors. The communication interface logic may perform operations to cause the receipt and transmission of electronic data via the communication interface 1106.

The integrated circuit 1100 may be configured to perform operations including receiving and parsing signals from network devices (e.g., to identify each network device and determine the RSSI of each signal) and performing scans for network devices to determine network devices detected during multiple scans. The integrated circuit 1100 may also perform operations including comparing the detected network devices against guideline threshold and transmitting an alert to the policy enforcement server system 1002 of FIGS. 10A-10C. The integrated circuit may also perform operations that cause the communication interface 1106 to transmit sensory data to the application 1008 and/or the policy enforcement server system 1002 (in embodiments in which the policy enforcement server system 1002 is in communication with wireless transceiver 1004). Additional operations performed by the integrated circuit 1100 are discussed throughout, wherein the integrated circuit 1100 may be referred to as "wireless transceiver logic" in some embodiments.

In embodiments in which the wireless transceiver 1004 includes the vibration sensor 1102, the vibration sensor 1102 is configured to perform operations including detecting and recording vibration. As will be discussed below, the vibration sensor 1102 may detect vibration of a vehicle and the wireless transceiver 1004 may transmit a signal to a network device, e.g., the network device 1010, to be parsed and analyzed by the application 1008. The application 1008 may then utilize the vibration data in determining whether to implement, or withdraw implementation of, a set of policies with respect to the network device. The accelerometer 1104 performs operations including detecting and recording acceleration (e.g., movement). As will be discussed below, the accelerometer 1104 may detect acceleration of a vehicle and the wireless transceiver 1004 may transmit a signal to a network device, e.g., the network device 1010, to be parsed and analyzed by the application 1008. The application 1008 may then utilize the acceleration data ("movement data") in determining whether to implement, or withdraw implementation of, a set of policies with respect to the network device.

In embodiments in which the vibration sensor 1102 is not included in the wireless transceiver 1004, the wireless transceiver 1004 may obtain sensory data from the accelerometer 1104 and perform operations, via logic, that simulate the functionality of a vibration sensor. This functionality is simulated via one of several available operating modes of the accelerometer 1104 by utilizing a method that recognizes both positive and negative acceleration, and generates an interrupt when the value is greater than a predetermined threshold. The value of acceleration represents movement in any of the X, Y, or Z directions, and/or any combination thereof. Each interrupt lasts for a calculated length of time using the formula: 1/ODR, with Output Data Rate (ODR) representing a predetermined frequency, the value of which is configured and stored in control registers.

In some embodiments, the movement/vibration data may be a byte within a signal transmitted from the wireless transceiver to the network device at specified time intervals (e.g., every 10, 15 or 30 seconds). In some embodiments, the byte comprises a series of bits, with each bit indicating a movement/vibration status for each time interval. As one illustrative example, the signal may include the following series of bits as shown and described in the following Table 1.

TABLE 1

| Interval | Bit series | Status of last interval |
| --- | --- | --- |
| $time_0$ | 0000 0001 | movement/vibration detected |
| $time_1$ | 0000 0011 | movement/vibration detected |
| $time_2$ | 0000 0111 | movement/vibration detected |
| $time_3$ | 0000 1110 | no detection |
| $time_4$ | 0001 1101 | movement/vibration detected |
| $time_5$ | 0011 1011 | movement/vibration detected |
| $time_6$ | 0111 0111 | movement/vibration detected |
| $time_7$ | 1110 1111 | movement/vibration detected |

Each interval may comprise 10 seconds and the delay time for withdrawing implementation of the set of policies may be 80 seconds. Therefore, once the application detects movement and implements the set of policies, the application will monitor the bit series received in the signal from the wireless transceiver and continue implementation of the policy until either (1) the bit series reads "0000 0000" (i.e., no movement for 80 seconds), or (2) the application no longer detects the presence of the wireless transceiver. In one embodiment, the status of "no detection" at $time_3$ may be a result of the vehicle stopping at a traffic sign.

As discussed herein, withdrawal of the implementation of the set of policies refers to the application of the policy enforcement system returning the network device to its unrestricted or unlimited operating state (e.g., full access to all applications is provided, or at least the same access is provided that was available prior to implementation of the set of policies).

In some embodiments, the battery 1108 may be a single use battery such that upon depletion of its energy store, the wireless transceiver 1004 may be disposed of. In alternative embodiments, the battery 1108 may be one of the following rechargeable battery types, nickel cadmium (NiCd), Nickel-Metal Hydride (NiMH), Lithium Ion (Li-ion), Lithium Ion Polymer (Li-ion polymer), etc.

General Methodologies—Policy Enforcement System

Referring to FIG. 12, a flowchart illustrating an exemplary process of applying and monitoring a set of policies by the policy enforcement system of FIG. 10A is shown. Each block illustrated in FIG. 12 represents an operation performed in the method 1200 of applying a set of policies to a network device and monitoring the network device according to at least a subset of the set of policies. In some embodiments, a set of policies may include multiple subsets (i.e., less than the whole). In some such embodiments, the multiple subsets may include a first subset that is directed to restricting the functionality of the network device and a second subset that is directed to monitoring instructions and applicable thresholds. For example, implementation of the first subset of policies may result in removal of icons from the display screen of a mobile device (see FIGS. 18A-18B) in order to restrict functionality of the mobile device. Additionally, implementation of the second subset of policies may cause logic associated with the policy enforcement system (i.e., an application installed on a network device) to monitor certain aspects (e.g., motion via a gyroscope and/or accelerometer).

Referring to the diagram of FIG. 12, in one embodiment, it is assumed that prior to the beginning of the method 1200, the application of the policy enforcement system has been installed on a network device (e.g., a mobile device) and a network device sensor (e.g., a wireless transceiver) has been installed or placed within a vehicle. Thus, the method 1200 commences when the application processing on the network device detects (i) movement above a predetermined speed threshold, and (ii) the presence of the wireless transceiver (block 1202). In some embodiments, the application obtains sensory data from an accelerometer of the network device in order to determine movement (i.e., acceleration) or from a vibration sensor. Alternatively, or in addition to, the application may obtain sensory data from a GPS unit of the network device in order to determine movement. The presence of the wireless transceiver may be detected based on a signal transmitted from the wireless transceiver in response to a beacon signal transmitted by the network device. The application and wireless transceiver logic then engage in communication in order to determine communication methods and protocol (e.g., a frequency on which to communicate as discussed below). In some embodiments the sensory data obtained from the network device sensor is coupled with the sensory data obtained from the network device to perform a "handshake" that confirms the presence of a wireless transceiver, which prompts the application to implement a set of policies to the network device to restrict and/or limit functionality of the network device. As used herein, the term "handshake" refers to the exchange of information between two devices in order to authenticate one or both of the devices.

In response to detecting (i) movement above a predetermined speed threshold, and (ii) the presence of the wireless transceiver, the application determines whether the network device on which the application is processing is the closest network device to the wireless transceiver (1204). FIG. 12 illustrates the flow of method 1200 when the application determines the network device on which the application is processing is the closest network device to the wireless transceiver. Additional details regarding the determination of closest network device to the wireless transceiver will be discussed below, for example, with respect to FIGS. 14A-14C.

Responsive to determining the network device on which the application is processing is the closest network device to the wireless transceiver, the application implements a set of policies, wherein at least a first subset of the policies may restrict or limit functionality of the network device (block 1206). As referenced above, the application may perform operations that result in limiting or restricting the functionality of the network device, which may include removing icons from a display screen of the network device as indicated by the first subset of policies. For example, as seen below in FIGS. 18A-18B, icons associated with certain applications running on the network device may be removed to prevent use of the application (e.g., mail, messaging, camera, etc.). Other methods of restricting use of the network device have also been contemplated with examples including, but not limited or restricted to, shading out the icons, shrinking the icons (e.g., altering icons appearance and preventing the opening of the application), disabling and/or delaying notifications, disabling and/or delaying receipt or transmission of data, etc. Other examples of restricting or limiting use of the network device are discussed above and equally applicable in this embodiment.

The method 1200 then continues with additional operations that may be performed in parallel or in a concurrent manner (i.e., at least partially overlapping in time); however, there is no such requirement. In further response to detecting (i) movement above a predetermined speed threshold, and (ii) the presence of the wireless transceiver, the application causes the transmission of a signal to the wireless transceiver instructing the wireless transceiver to scan for other network devices (block 1208). The scan for other network devices by the wireless transceiver may be done to determine the number of network devices within the vehicle (or within a particular physical region surrounding the wireless transceiver in other non-vehicle deployments). For instance, certain vehicle/driver guidelines may set forth an allowed number of network devices within a vehicle, potentially at certain times of the day, wherein an alert may be transmitted when the vehicle/driver guideline is violated. In other instances, one or more of the components of the policy enforcement system may trigger certain policies or alerts based on what network devices are detected, optionally depending on the time. For example when the policy enforcement system is deployed within a set of corporate vehicles, as each network device's Universally Unique Identifier (UUID) is received by the wireless transceiver, wireless transceiver logic may determine whether any network devices detected are associated with employees, and whether the presence of multiple employees (or otherwise other network devices) is permitted under the applicable vehicle/driver guidelines and/or set of policies to be implemented.

Additionally, in further response to detecting (i) movement above a predetermined speed threshold, and (ii) the presence of the wireless transceiver, the application implements a first subset of policies to the network device thereby restricting or limiting functionality of the network device, as discussed above (block 1210). Additionally, the application may monitor sensory data and apply a second subset of policies to the sensory data.

Following the implementation of the second subset of policies and responsive to determining that monitored sensory data violates one or more policies of the second subset of policies, the application causes performance of operations resulting in the transmission of an alert or signal to administrator (block 1212). For instance, the application may cause transmission of the alert or signal to the policy enforcement server system 1002 of FIG. 10A, which may in turn transmit an alert or signal to an administrator. Additionally, the alert or signal may be reviewed as part of a dashboard display, such as the dashboard display 1900 of FIG. 19.

Figure 13:
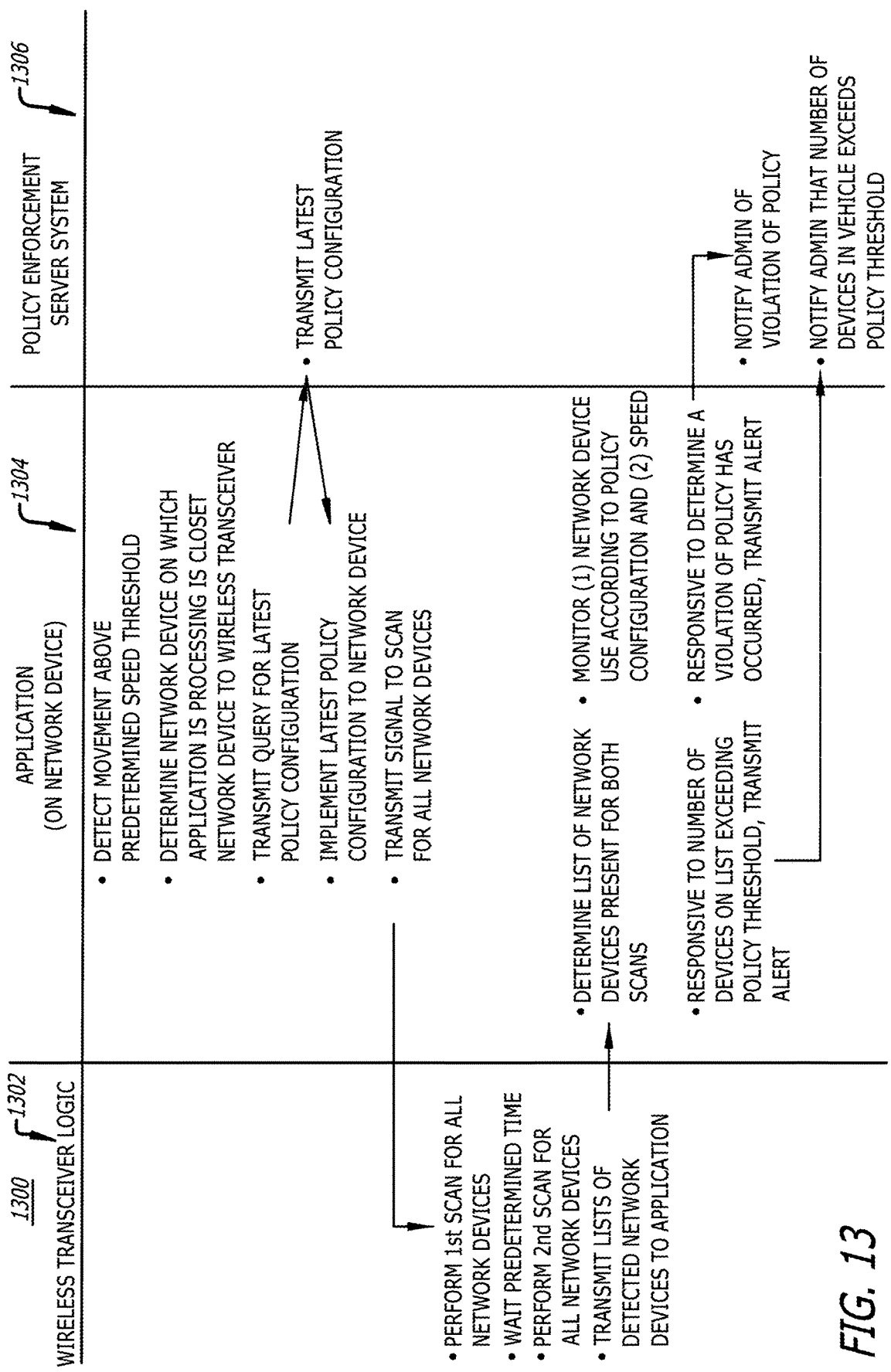
FIG. 13 is an operational flow diagram illustrating operations performed in the process of FIG. 12.

Referring now to FIG. 13, an operational flow diagram illustrating operations performed in the process of FIG. 12 is shown. Specifically, the operational flow diagram includes three columns, one representing each main component of the policy enforcement system: the wireless transceiver logic (column 1302); the application (column 1304); and the policy enforcement server system (column 1306). Each bullet point within a column represents an operation (or operations) performed by the component corresponding to the column. Further, each arrow indicates the transmission of data from a first component to a second component. In some embodiments, the assumptions discussed above with respect to FIG. 12 are equally applicable with respect to FIG. 13.

The operational flow diagram illustrates one embodiment of a process of applying and monitoring a set of policies by the policy enforcement system of FIG. 10A may begin when the application 1008 detects movement above a predetermined threshold. Responsive to the detection of movement above the predetermined threshold, the application 1008 determines whether the network device on which it is processing is the closest network device to the wireless transceiver 1004.

When the application 1008 determines whether the network device on which it is processing is the closest network device to the wireless transceiver 1004, the application 1008 may then transmit a query to the policy enforcement server system 1002 for the latest policy configuration (i.e., set of policies to implement). As an alternative, the application 1008 may retrieve and utilize the latest received policy configuration from a policy configuration data store, not shown, that is either stored locally on a network device on which the application 1008 is operating, i.e., the network device 1010, or is otherwise accessible to the application 1008.

Following receipt of the request from the application 1008, the policy enforcement server system 1002 transmits the latest policy configuration to the application 1008. In some embodiments, the policy enforcement server system 1002 parses the request to identify the network device 1010 (and optionally the corresponding user and vehicle, if such data is included in a data store accessible by the policy enforcement server system 1002. The policy enforcement server system 1002 may then generate a message including the latest policy configuration for transmission.

Following receipt of the message from the policy enforcement server system 1002, the application 1008, performs several operations which may be in any order. The following operations may also be performed in parallel and include (i) implementing the latest policy configurations with respect to the network device, and (ii) transmitting a signal to the wireless transceiver 1004 to be parsed by wireless transceiver logic operating thereon instructing the wireless transceiver logic to perform a scan for additional network devices. Additionally, following the implementation of the latest policy configuration, the application 1008 monitors use of the network device according to the latest policy configuration and monitors speed (e.g., of the vehicle 1006). Responsive to determining that a violation of the latest policy configuration has occurred, the application 1008 may transmit an alert to the policy enforcement server system 1002.

Referring to the wireless transceiver 1004's receipt of the instructions to scan for additional network devices, the wireless transceiver logic performs a first scan for all network devices (e.g., receives beacons as discussed below) and records identifiers of all detected network devices. The wireless transceiver logic then waits a predetermined time before performing a second scan and recording identifiers of all detected network devices. Following completion of the first and second scans, the records of detected network devices (i.e., a first list and a second list), are transmitted to the application 1008, which compares the first list and the second list to determine network devices detected during each scan (i.e., present on both lists). Responsive to the number of network devices detected during both scans exceeding a policy threshold, the application 1008 causes transmission of an alert to the policy enforcement server system 1002. It should be noted that the determination as to whether a detected number of network devices by the wireless transceiver logic may be based on driver/vehicle guidelines. It should be noted that in some embodiments, the comparison of the lists may be performed by the wireless transceiver logic. Additionally, the first list may be transmitted to the application 1008 following the completion of the first scan, there is no requirement that transmission of the first list be performed after completion of the second scan.

Referring again to column 1306 and operations of the policy enforcement server system 1002, upon receiving either an alert indicating a policy violation from the application 1008 and/or an alert indicating the number of detected network devices during both scans of the wireless transceiver logic, the policy enforcement server system 1002 may notify an administrator. Notice to the administrator may be through a message such as a short message service (SMS) message, a multimedia message service (MMS) email, etc. Alternatively, or in addition, notice to the administrator may be provided via a dashboard, such as the dashboard 1900 of FIG. 19.

Figure 14C:
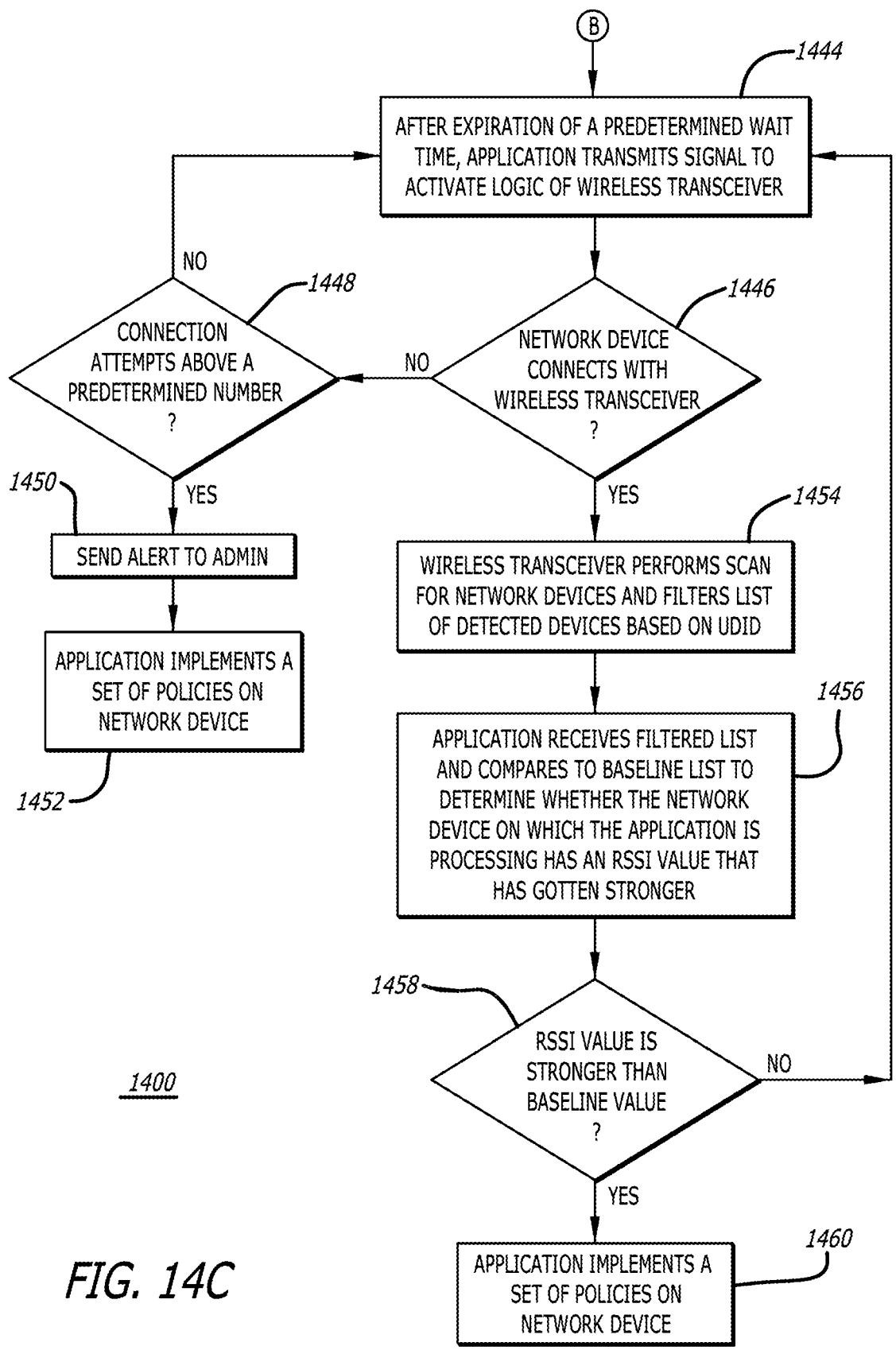

Referring to FIGS. 14A-14C, a flowchart that illustrates an exemplary process of applying and monitoring a set of policies incorporating a first and second comparison process by the policy enforcement system of FIG. 10A is shown. Each block illustrated in FIGS. 14A-14C represents an operation performed in the method 1400 of applying a set of policies to a network device, while incorporating a first and second comparison process, and monitoring the network device according to at least a subset of the set of policies. In some embodiments, the assumptions discussed above with respect to FIG. 12 are equally applicable with respect to FIGS. 14A-14C. Referring now to FIG. 14A, the method 1400 commences when the application running on the network device detects (i) movement above a predetermined speed threshold, and (ii) the presence of the wireless transceiver, as discussed above (block 1402). Response to detecting movement above the speed threshold, the application transmits a signal to activate logic of a wireless transceiver, such as the wireless 1004 of FIG. 10A (block 1404). Following the activation of the logic of the wireless transceiver, the application attempts connect with the wireless transceiver (block 1406). The connection may refer to the application (i) causing the transmission of an advertising packet that includes (1) a first unique device identifier (UDID) ("UDID1") being a manufacturer identifier that corresponds to the policy enforcement system 1000 (e.g., an identifier of an instance of the NCZ application stored on the network device), and (2) a second UDID ("UDID2") being an identifier unique to the network device, and (ii) receipt of a reply from the wireless transceiver acknowledging receipt of the advertising packet. When the network device does not connect with the wireless transceiver (e.g., no receipt of an acknowledgement after waiting a predetermined time interval following transmitting the advertising packet), the application determines whether the number of attempts to connect have exceeded a predetermined threshold (block 1408). When the connection attempts have not exceeded the predetermined threshold, the method 1400 returns to block 1404. When the connection attempts have exceeded the predetermined threshold, the application causes an alert to be transmitted to an administrator (block 1410) and the application implements a set of policies on the network device to limit and/or restrict the functionality of the network device (block 1412).

When the network device does connect with the wireless transceiver (e.g., receipt of an acknowledgement after waiting a predetermined time interval following transmitting the advertising packet), the method 1400 continues with the wireless transceiver performing a scan for network devices and filters a list of detected devices based on UDID1 (block 1414). The operations of block 1414 are directed to determining other network devices proximately located to the wireless transceiver that have an instance of the NCZ application processing thereon.

Following the scan performed by the wireless transceiver and the filtering of a list of detected network devices, the application receives the filtered list and determines whether the network device on which the application is processing corresponds to the greatest RSSI value included on the filtered list (block 1416). When the network device on which the application is processing corresponds to the greatest RSSI value included on the filtered list (yes at block 1418), the application implements a set of policies on the network device to limit and/or restrict the functionality of the network device (block 1420).

Further, the method 1400 continues with the application transmitting a command to the wireless transceiver to perform scans for all network devices (block 1422). The wireless transceiver performs a scan for all network devices by receiving signals (e.g., via the BLUETOOTH® protocol or BLE signals) and records information included in the signals in a first list (block 1424). Note, the scan performed in the operations of block 1424 differs from the scan associated with block 1414 in that the scan associated with block 1424 is scanning for all network devices, not merely for network devices processing an instance of the NCZ application.

Referring now to FIG. 14B, following expiration of a predetermined time period for scanning, logic of the wireless transceiver parses the recorded information to remove duplicate entries from the first list (block 1426). For example, a first network device may transmit a signal every 100 microseconds and the scanning time may be 15 seconds. In such an example, the wireless transceiver need not maintain a list including every entry from the first network device and instead only keep a single entry. Following completion of the first scan and expiration of a predetermined wait time, the wireless transceiver performs a second scan by receiving signals and records information included in the signals in a second list (block 1428). Following expiration of a predetermined time period for scanning, the logic of the wireless transceiver parses the recorded information to remove duplicate entries from the second list (block 1430). The wireless transceiver then transmits the first and second lists to the application (block 1432). Following receipt of the first and second lists, the application determines network devices that are located proximate to the wireless transceiver (e.g., within a predetermined distance, such as within an interior of a vehicle in which the wireless transceiver is placed) by comparing the first list with the second list to determine network devices on both lists resulting in a third list (block 1434). In some instances, the comparison may be referred to as an "A-B compare," where the first list (A) is compared with the second list (B); however, the ordering does not make a difference in this implementation.

Response to the number of network devices included on the third list exceeding a policy threshold, the application may transmit an alert to an admin (e.g., via the policy enforcement server system 1002) (block 1436). Additionally, the application may cause the transmission of the third list to the policy enforcement server system 1002 for recordation and storage (block 1438).

Referring back to FIG. 14A, when the network device on which the application is processing does not correspond to the greatest RSSI value included on the filtered list (no at block 1418), the application stores a baseline list of UDID2s and corresponding RSSI values (block 1440). Following storage of the baseline list of UDID2s and corresponding RSSI values, the application monitors use of the network device as well as movement (block 1442). Referring now to FIG. 14C, after expiration of a predetermined wait time (equal to or different than the wait time associated with block 1428), the application transmits a signal to activate logic of the wireless transceiver (block 1444). Following the activation of the logic of the wireless transceiver, the application attempts to connect with the wireless transceiver (block 1406). Detail of the connection is provided above with respect to block 1406. When the network device does not connect with the wireless transceiver (e.g., no receipt of an acknowledgement after waiting a predetermined time interval following transmitting the advertising packet), the application determines whether the number of attempts to connect have exceeded a predetermined threshold (block 1448). When the connection attempts have not exceeded the predetermined threshold, the method 1400 returns to block 1444. When the connection attempts have exceeded the predetermined threshold, the application causes an alert to be transmitted to an administrator (block 1450) and the application implements a set of policies on the network device to limit and/or restrict the functionality of the network device (block 1452).

When the network device does connect with the wireless transceiver, the method 1400 continues with the wireless transceiver performing a scan for network devices and filters a list of detected devices based on UDID1 (block 1454). Following the scan performed by the wireless transceiver and the filtering of a list of detected network devices, the application receives the filtered list and determines whether the RSSI value corresponding to the network device on which the application is processing has increased in comparison to the baseline RSSI value discussed in block 1440 (block 1516). In some embodiments, the application may determine whether a predetermined threshold of change has occurred. For example, the increase in RSSI value may refer a percentage (e.g., ≥15% increase) or an absolute value (e.g., ≥10 dB increase). Specifically, the increase may be an indication that the network device has moved closer to the driver and is likely meant for the driver to see or use (i.e., warranting implementation of a set of policies to the network device). When the RSSI value corresponding to network device on which the application is processing has increased (yes at block 1458), the application implements a set of policies on the network device to limit and/or restrict the functionality of the network device (block 1420). When the RSSI value corresponding to network device on which the application is processing has not increased (no at block 1458), the method continues by returning to block 1444.

Figure 15:
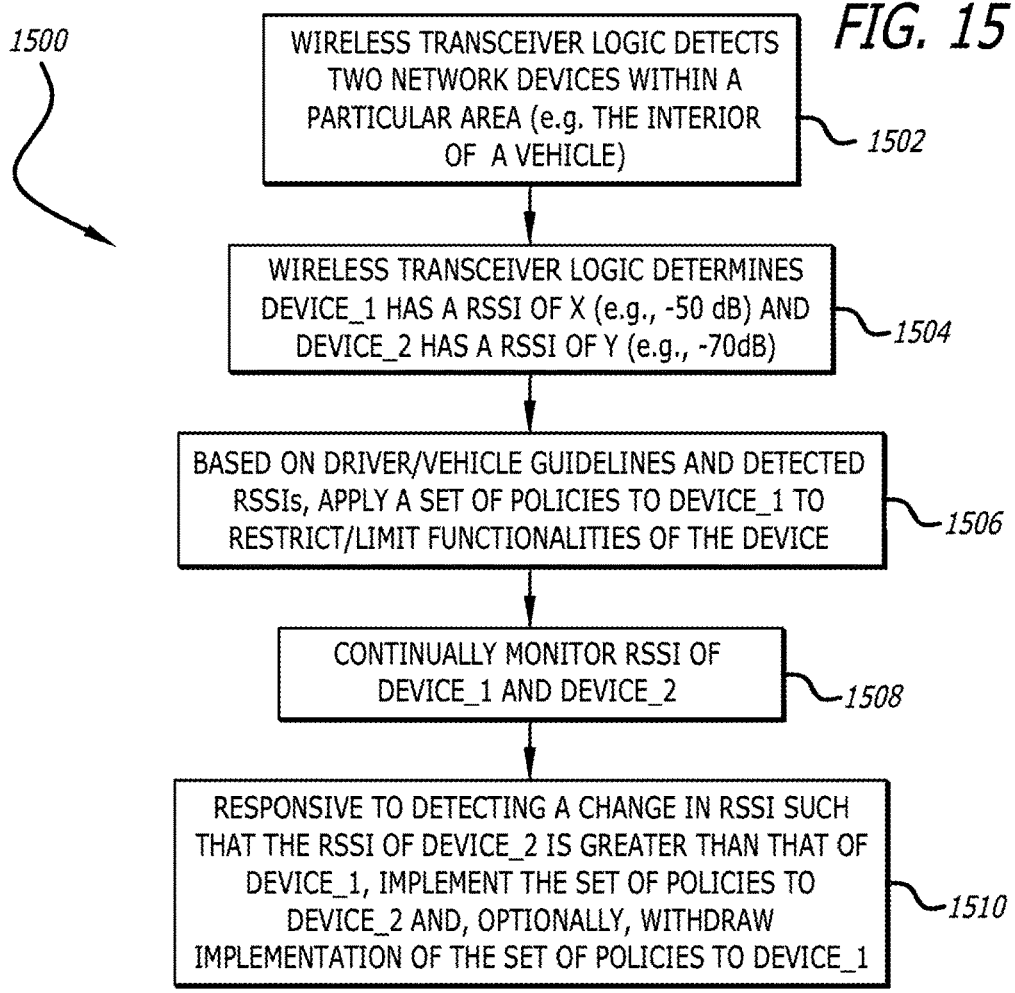
FIG. 15 is a flowchart illustrating an exemplary process of detecting a change in positioning of network devices within a vehicle by the policy enforcement system of FIG. 10A.

Referring now to FIG. 15, a flowchart illustrating an exemplary process of detecting a change in positioning of network devices within a vehicle by the policy enforcement system of FIG. 10A is shown. Each block illustrated in FIG. 15 represents an operation performed in the method 1500 of detecting a change in positioning of network devices within a vehicle. The method 1500 commences when wireless transceiver logic operating within a policy enforcement system detects two network devices within a particular area (block 1502). For example, as stated in FIG. 15, the particular area may be the interior of a vehicle; however, the disclosure is not intended to be so limited.

Following the detection of multiple network devices within the particular area, the wireless transceiver logic determines the received signal strength indicator (RSSI) of each network device (block 1504). For example, a first network device may have a determined RSSI of −50 dB while a second network device has a determined RSSI of −70 dB.

Based on driver or vehicle guidelines of the policy enforcement system and the detected RSSI of each network device, a set of policies is implemented to the network device having a stronger RSSI (i.e., the first network device) thereby restricting or limiting the functionality of the first network device (block 1506). In some embodiments, driver/vehicle guidelines represent predetermined rules that are analyzed prior to and during the deployment of a policy enforcement system. As its name indicates, driver/vehicle guidelines may be established, for example, by an administrator of a company (i.e., based on directions from a Board of Directors, executives, etc.) for each employee, each vehicle, particular days of the week, particular times of the day, etc., or any combination thereof, and may differ according to the driver and/or vehicle. Further, the driver/vehicle guidelines may be utilized by the application or the wireless transceiver logic as initialization rules in, for example, (i) determining a speed threshold, (ii) determining an initial "driver's network device," (iii) determining whether to apply a set of policies to various network devices detected in the vehicle, (iv) determining a wait time for withdrawing implementation of a set of policies upon detecting no movement, (v) determining the number of network devices permitted in the vehicle at any given time, (vi) determining exceptions to any guideline or policy (e.g., a policy may indicate that only the driver is permitted in the vehicle during typical work hours; however, a designated employee, such as a manager, is permitted in the vehicle as well), etc. The driver/vehicle guidelines may be stored on the network device and accessible by the application, received in a signal from the wireless transceiver or received in a signal from the policy enforcement server system.

The wireless transceiver logic monitors the RSSI for each detected network device (block 1508) and responsive to detecting a change in RSSI indicating a change in positioning of the network devices (i.e., the second network device has a stronger RSSI than the first network device or greater than that of a baseline RSSI for the second network device), the implementation of the set of policies is adjusted accordingly (block 1510).

Continuing the example presented in the discussion of FIG. 15, when the wireless transceiver logic determines that the RSSI of the second network device is stronger than that of the first network device, the wireless transceiver logic determines the second network device has moved closer to the wireless transceiver and is likely being handled by the driver (as the wireless transceiver is installed to the left of the driver, e.g., opposite the passenger). The intention of method 1500 is to determine when a passenger's network device is being handled by the driver and implement the set of policies on the passenger's network device in order to prevent the driver from operating any network device while driving. Furthermore, method 1500 may continue to monitor the RSSI of the detected network devices and adjust the implementation of the set of policies based on similar operations as discussed previously with FIG. 15.

Additionally, an alternative embodiment of method 1500 includes implementing a set of policies on any network device within a predetermined RSSI (e.g., any network device having a RSSI greater than or equal to −50 dB).

Figure 16:
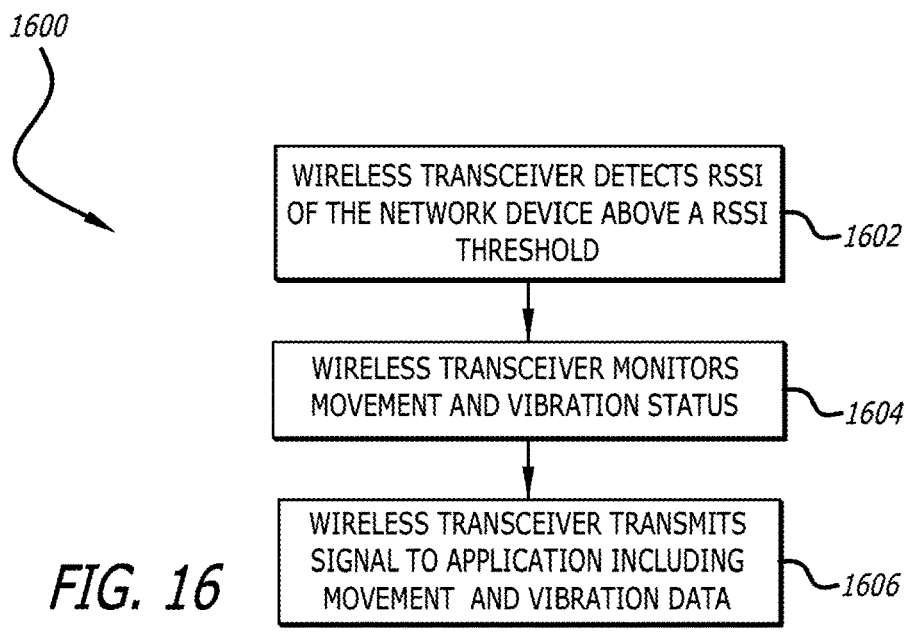
FIG. 16 is a flowchart illustrating an exemplary process of monitoring movement by a wireless transceiver of the policy enforcement system of FIG. 10A.

Referring to FIG. 16, a flowchart illustrating an exemplary process of monitoring movement by a wireless transceiver of the policy enforcement system of FIG. 10A is shown. Each block illustrated in FIG. 16 represents an operation performed in the method 1600 of monitoring movement by a wireless transceiver. In some embodiments, the assumptions discussed above with respect to FIG. 12 are equally applicable with respect to FIG. 16. The method 1600 commences when wireless transceiver logic operating within a policy enforcement system detects a RSSI of a network device that is greater than or equal to a predetermined threshold (block 1602). For example, as discussed throughout the disclosure, the wireless transceiver may be deployed within the interior of a vehicle in order to prevent a driver from handling a network device; however, the disclosure is not intended to be so limited.

In response to detection of the RSSI being greater than or equal to a predetermined threshold, the wireless transceiver logic monitors movement and vibration data (block 1604). For instance, as illustrated above in FIG. 11, a wireless transceiver 1004 may include a vibration sensor 1102 and an accelerometer 1104. These components may monitor corresponding sensory data (e.g., vibration and acceleration/deceleration, respectively).

Subsequently, the wireless transceiver logic performs operations that cause a signal to be transmitted to the network device (e.g., to be parsed and interpreted by an application processing thereon), wherein the signal includes movement and vibration data (block 1606). Detail regarding the signal transmitted to the network device is provided above with respect to, inter alia, Table 1. Additionally, the application may analyze and consider any applicable driver/vehicle guidelines along with the received signal in determining when to withdraw implementation of a set of policies with respect to the network device.

Figure 17A:
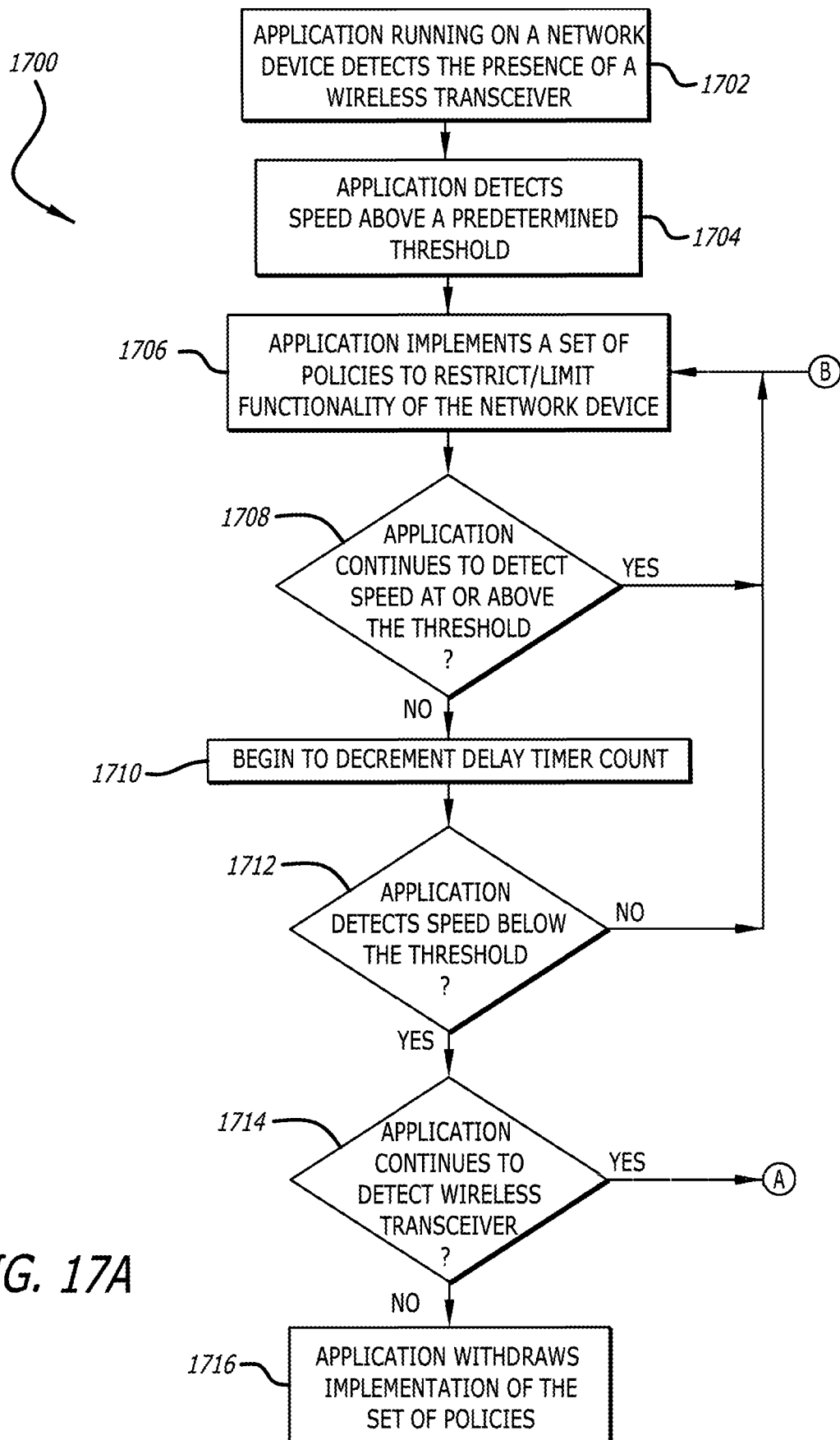
FIGS. 17A-17B illustrate a flowchart of a second exemplary process of monitoring movement by a wireless transceiver of the policy enforcement system of FIG. 10A.
Figure 17B:
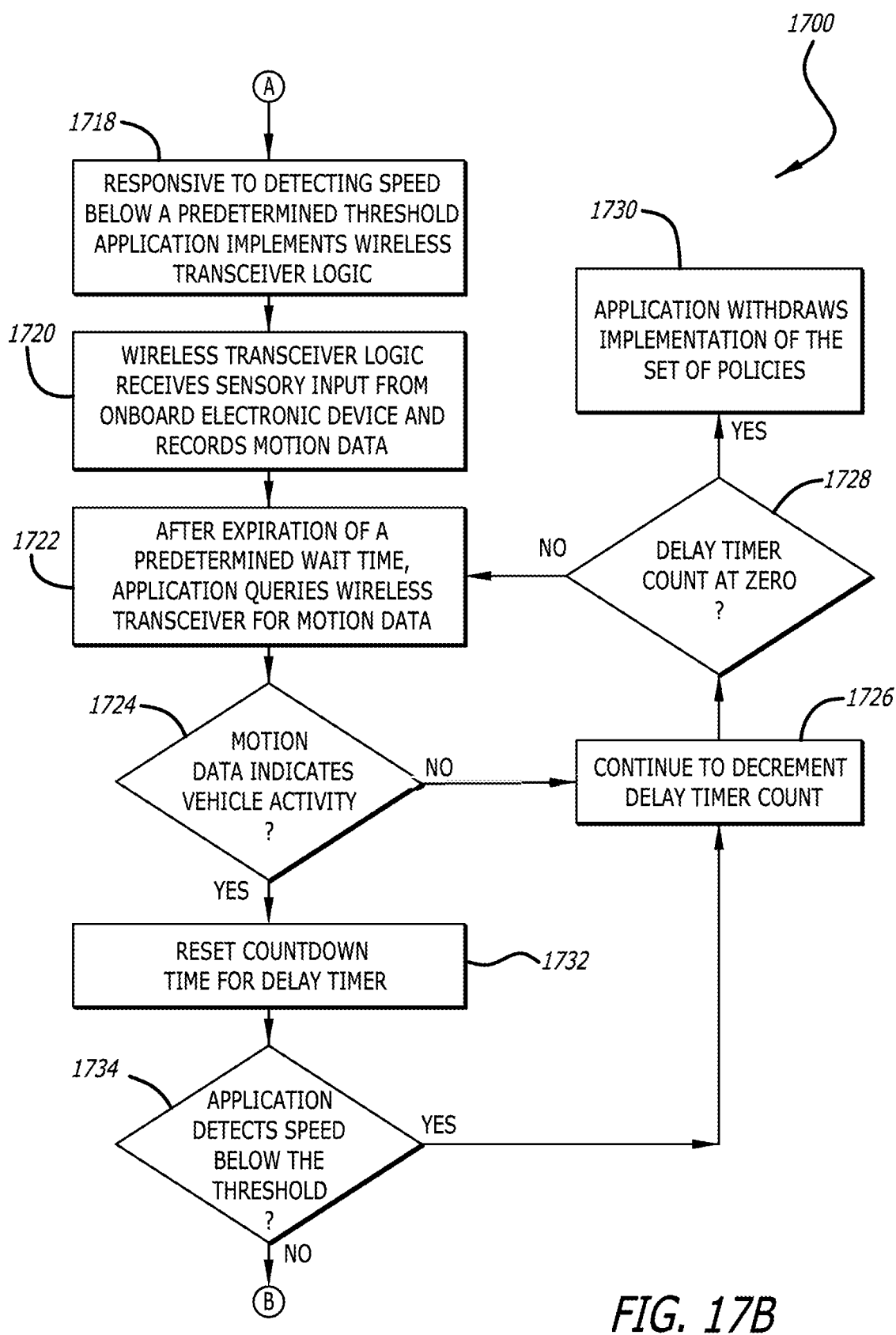

Referring to FIGS. 17A-17B, a flowchart of a second exemplary process of monitoring movement by a network device sensor of the policy enforcement system of FIG. 10A is shown. Each block illustrated in FIGS. 17A-17B represents an operation performed in the method 1700 of monitoring movement by a wireless transceiver. In some embodiments, the assumptions discussed above with respect to FIG. 12 are equally applicable with respect to FIGS. 17A-17B. Initial operations of the method 1700 include the application processing on the network device detecting (i) the presence of the wireless transceiver (block 1702), and (ii) movement above a predetermined speed threshold, as discussed above (block 1704).

In response to detecting (i) the presence of the wireless transceiver, and (ii) movement above a predetermined speed threshold, the application implements a set of policies, wherein at least a first subset of the policies may restrict or limit functionality of the network device (block 1706). Detail regarding restricting or limiting the functionality of a network device is discussed above, at least with respect to FIG. 12. It should be noted that additional operations may be performed that are not explicitly illustrated in FIGS. 17A-17B (e.g., the determination of network device closest to the wireless transceiver as included in FIG. 12). Following the implementation of the set of policies, a determination is made by the application processing on the network device as to whether continued movement above the speed threshold is detected (block 1708). When continued movement is detected, the method returns to block 1706, i.e., the application continues the implementation of the set of policies.

However, when continued movement is not detected, the application begins to decrement a delay timer counter (block 1710) and attempts to detect speed below the threshold (block 1712). When the speed detected is not below the threshold (no at block 1712), the method returns to block 1706, i.e., the application continues the implementation of the set of policies. However, when the speed detected is below the threshold (yes at block 1712), the application determines whether there is continued detection of the wireless transceiver (block 1714). When the wireless transceiver is not detected, the application withdraws implementation of the set of policies (block 1716).

Referring now to FIG. 17B, when the wireless transceiver is detected and a speed below the threshold is detected, wireless transceiver logic is activated (block 1718). The method 1700 at block 1718 may refer to the beginning of operations performed that account for slowdowns or stoppages in traffic (e.g., traffic signals, traffic signs, traffic jams, etc.). As one example of activating the wireless transceiver logic discussed above, the application may transmit, to the wireless transceiver, a command to activate the wireless transceiver logic.

The activated wireless transceiver logic receives, or otherwise obtains, sensory input from electronic components and records the data ("motion data") (block 1720). In some embodiments as shown in FIG. 11, the electronic components may be included within the wireless transceiver (e.g., an accelerometer, an optional vibration sensor, etc.). Following the expiration of a predetermined wait time, the application queries the wireless transceiver for the motion data (block 1722). Upon receipt of the motion data, the application determines whether the motion data indicates vehicle activity, as described above with respect to Table 1 (block 1724).

When the motion data does not indicate vehicle activity (no at block 1724), the application continues to decrement the delay timer count (block 1726). When the delay timer count is at zero (yes at block 1728), the application withdraws the implementation of the set of policies (block 1730). When the delay timer count is greater than zero (no at block 1728), the method 1700 returns to block 1722.

However, when the motion data does indicate vehicle activity (yes at block 1724), the delay timer is reset (block 1732) and the application makes a determination as to whether speed is again detected below the threshold (block 1734). When speed is detected below the speed threshold, the method 1700 returns to block 1726. When speed is not detected below the speed threshold, the method 1700 returns to block 1706.

Figure 18A:
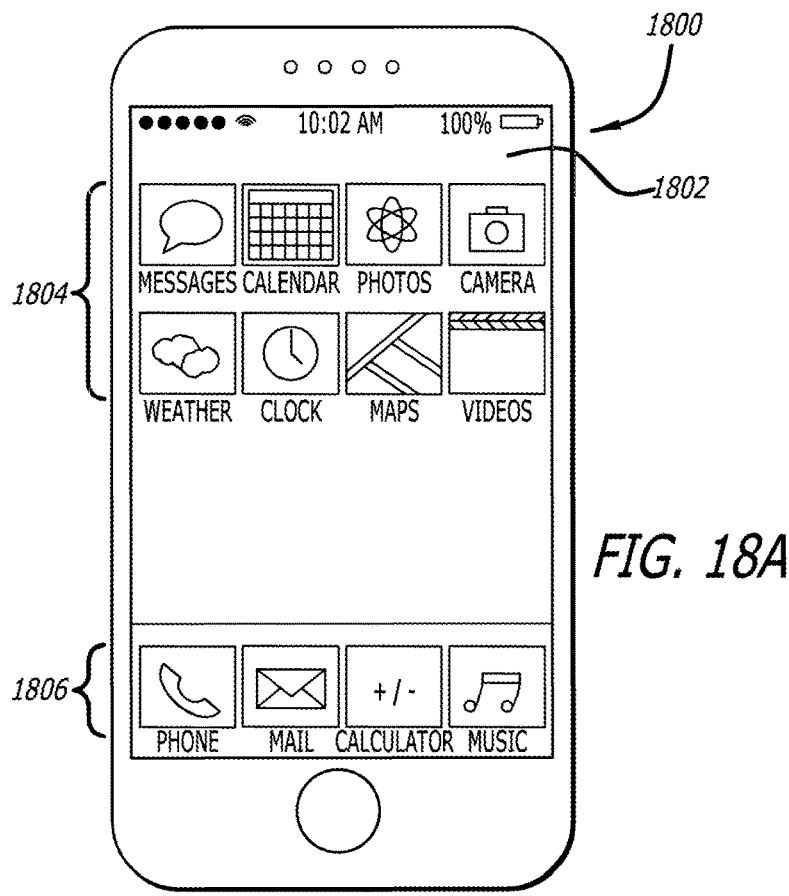
FIG. 18A is an illustration of a network device prior to the application of a set of policies by the policy enforcement system of FIG. 10A.

Referring to FIG. 18A, an illustration of a network device prior to the application of a set of policies by the policy enforcement system of FIG. 10A is shown. FIG. 18A illustrates a network device 1800, e.g., a mobile device, in a first state wherein a display screen 1802 has rendered thereon a set of home screen icons 1804 and a set of toolbar icons 1806. The first state is one in which a set of policies directed at restricting or limiting functionality of the mobile device 1800 has not been implemented. For instance, the mobile device 1800 may be in the first state when not within a vehicle.

Figure 18B:
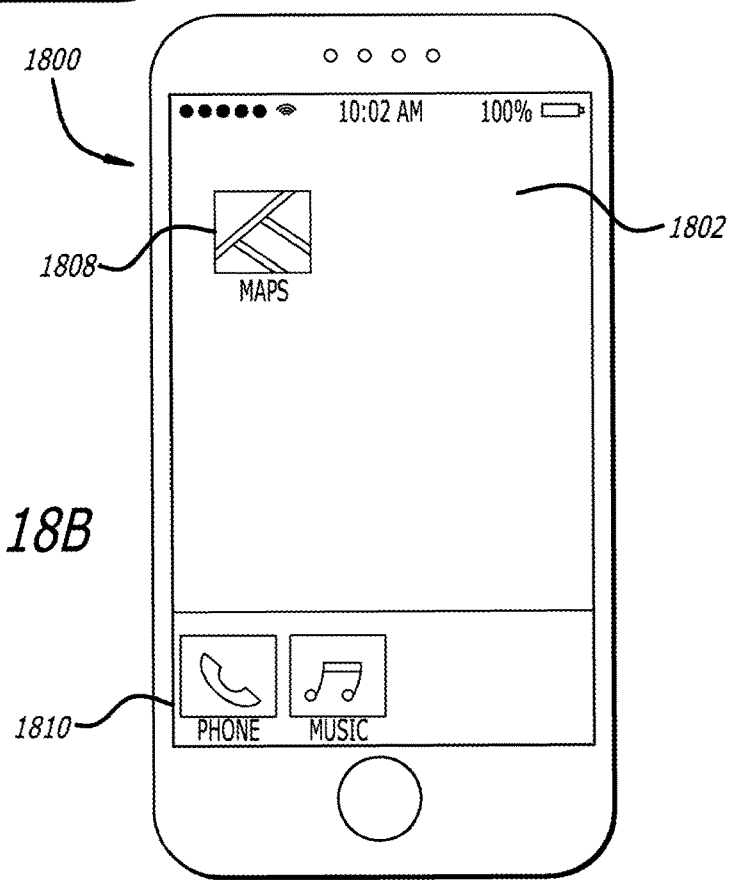
FIG. 18B is an illustration of the network device of FIG. 18A following the application of a set of policies by the policy enforcement system of FIG. 10A.

Referring to FIG. 18B, an illustration of the network device of FIG. 18A following the application of a set of policies by the policy enforcement system of FIG. 10A is shown. FIG. 18B illustrates the mobile device 1800 in a second state wherein the display screen 1802 has rendered thereon a modified set of home screen icons 1808 and a modified set of toolbar icons 1810. The second state is one in which a set of policies directed at restricting or limiting functionality of the mobile device 1800 has been implemented resulting in the removal of predetermined icons from the display screen 1802. As referenced above, the set of policies of be directed at restricting or limiting functionality of a mobile device, which may include, for example, restricting use of certain applications on the mobile device in order to reduce distractions (e.g., weather, clock, messages, calendar, photos, camera, videos, etc.). As discussed above, the set of policies may be implemented by an application that is a component of the policy enforcement system and installed on the mobile device 1800. Specifically, the set of policies may be implemented to remove icons from a mobile device's display screen when the mobile device is within a moving vehicle, and more specifically, is the mobile device determined by the policy enforcement system to be the driver's mobile device (or at least the closest mobile device to the driver). In some embodiments, the set of policies may be applied by the policy enforcement system of FIG. 10A to a plurality of networks devices, such as the network devices within a region incorporating the interior of a vehicle.

Alert Dashboard—Policy Enforcement System

Figure 19:
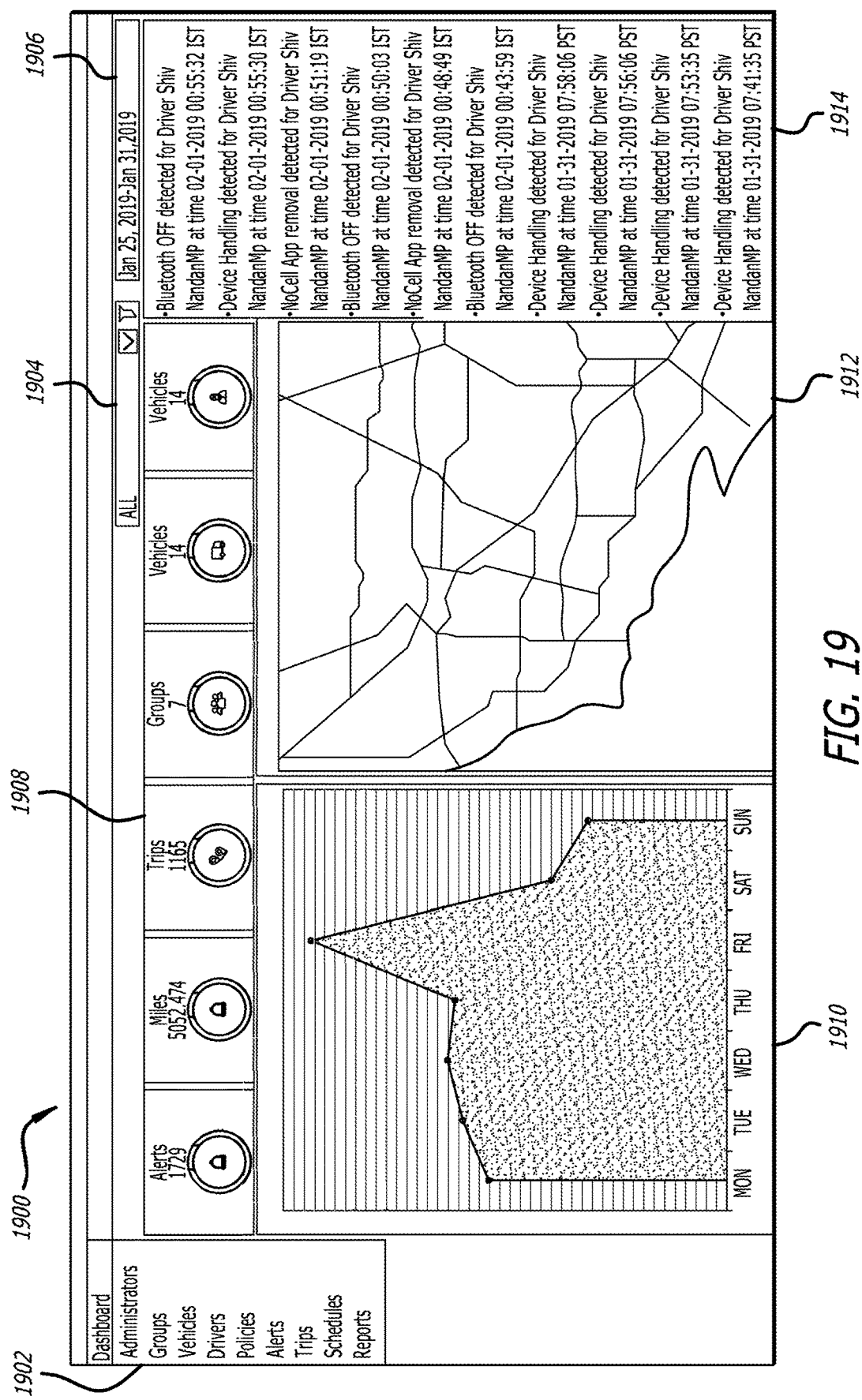
FIG. 19 is an illustration of an exemplary dashboard displaying information collected by the policy enforcement system of FIG. 10A.

Referring to FIG. 19, an illustration of an exemplary dashboard displaying information collected by the policy enforcement system of FIG. 10A is shown. The dashboard 1900 may be a graphical user interface (GUI) that is configured to be rendered on display screens of electronic devices. The current illustration may represent a "traditional" display, e.g., to be viewed on a desktop computer or laptop. However, attributes of one or more display panels or areas may be modified in order to be a more "mobile-friendly" display. For example, the space for displaying content is smaller on a mobile device (e.g., tablet, mobile phone) as compared to the space for display associated with a desktop computer or a laptop. Therefore, a "mobile-friendly" display may refer to the re-alignment and re-sizing of certain display panels or areas according to the specific display space available on the electronic device on which the dashboard is to be displayed.

In some embodiments, the dashboard 1900 may include various display panels or areas including, but not limited or restricted to, a menu display panel 1902, a filter panel 1904, a date range selector panel 1906, a gauges panel 1908 ("gauges"), a graph display area 1910, a geo-density map display area 1912 and an alerts display panel 1914. In some embodiments, one or more of these display panels or areas may not be present, and in some embodiments, additional display panels or area may be included (e.g., an additional graph display area).

The menu display panel 1902 provides various menu options that may be activated based on received user input, and result in the generation of a "pop-up" (e.g., an additional GUI, possibly overlaying at least a portion of the dashboard 1900). The pop-up may provide the user options for configuring policies corresponding to the selected option. For example, selection of "Vehicles" may enable the user to view various configuration options or settings corresponding to one or more registered vehicles (e.g., within a company fleet) and provide additional user input in order to initialize or re-configure one or more policies corresponding to the "Vehicles" option menu. User input indicating selection of other menu options provides similar configuration options for the selected menu option.

Additionally, the "Reports" menu option may provide data ("reports") to an administrator that has been detected by sensors (e.g., vibration sensor or accelerometers) or determined by one or more logic modules as discussed above. The data may enable the administrator to perform deeper analysis of the provided data. The reports may be customized by an administrator according to data provided therein and/or the configuration of the policies for each menu option discussed above. The policy enforcement system 1000 may include logic configured for and designed to collect the necessary data and generate the dashboard 1900 (e.g., a dashboard generation logic, not shown, may be included in the policy enforcement server system 1002 and be configured to obtain data from one or more wireless transceivers and one or more network devices in order to generate the content to be rendered as part of the dashboard 1900).

A filter panel 1904 is configured to receive user input that filters one or more of the display panels or areas of the dashboard 1900. For example, user input may be received from an administrator corresponding to a selection of a filter to display content on one or more of the display panels or areas for (i) one or more vehicles, (ii) one or more drivers, (iii) one or more groups (or vehicles, drivers, etc.), etc. The filter panel 1904 may expand to a drop-down menu display additional user input options.

The date range selector panel 1906 is configured to receive user input that filters one or more of the display panels or areas of the dashboard 1900 according to a selected date or date range (collectively "date range"). The selected date range may be applied to filter data displayed by one or more of the gauges 1908, the graph display area 1910, the geo-density map display area 1912 and the alerts display panel 1914.

The gauges 1908 may be configured to display data providing the administrator with a quick overview of each predetermined "topic" (e.g., Alerts, Miles, Trips, Groups, Vehicles, Drivers, etc.). Each gauge display of the gauges 1908 may provide a colored indicator (e.g., for quick reference to a specific topic). Further, each gauge display may include a ring that may also include an indication as to whether filtering has been applied to data corresponding to the gauge illustrated in a graph display area 1910, discussed below. Additionally, a value corresponding to the topic may be illustrated relative to a predetermined topic threshold. For example, the ring included within the "Vehicles" gauge may be displayed as a solid color ring when no filtering has been applied and vehicles is selected. Continuing the example, the "Vehicles" gauge may be displayed as a ring having a first half being a solid color and a second half being a different color or shading when filtering removes half of the vehicles from the data set (e.g., Group 1 is selected and Group 2 is de-selected, and each Group contains half of the total vehicles). An additional feature of the gauges may include an indication as to what content is illustrated in the graph display area 1910. For example, the "Alerts" gauge is shown to be selected based on a visual indicator applied to the "Alerts" gauge in contrast to the other gauges (i.e., the "Alerts" gauge has been selected via user input to be displayed in the graph display area 1910).

The graphic display area illustrates data specific to the gauge selected (as discussed above). In some embodiments, multiple gauges may be selected and corresponding data for each gauge may be displayed in an overlapping manner. In yet other embodiments, data corresponding to each gauge may be displayed in an overlapping manner (e.g., when no specific gauge is selected). The data illustrated in the graph display area may be filtered according to user input received via the filter panel 1904 and/or the date range selector panel 1906 as discussed above.

The geo-density map display area 1912 is configured to display a concentration of activity of one or more drivers, vehicles or groups. The term "concentration of activity," may refer to a concentration of the one or more drivers, vehicles or groups within a geographic location. The illustration displayed in the geo-density map display area 1912 may be a heat-map type display, which provides a visual overlay wherein the greater the concentration of activity at a specific geographic location, the brighter the color will be (e.g., a color indicates one or more drivers, vehicles, groups, etc.).

The alerts display panel 1914 is configured to display alerts received by the policy enforcement server system 1002 and transmitted by one or more of the application or the wireless transceiver logic. Configuration settings may be established or modified via user input corresponding to the "Alerts" option of the menu display panel 1902 and/or an icon located within the alerts display panel 1914 itself (e.g., a "gear" icon, not shown that is configured to generate a pop-up including configurations settings that may be altered via additional user input). The alerts may correspond to actions or operations performed by one or more drivers, vehicles or groups as well as policy violations, etc.

Logic Representation—Policy Enforcement System

Figure 20:
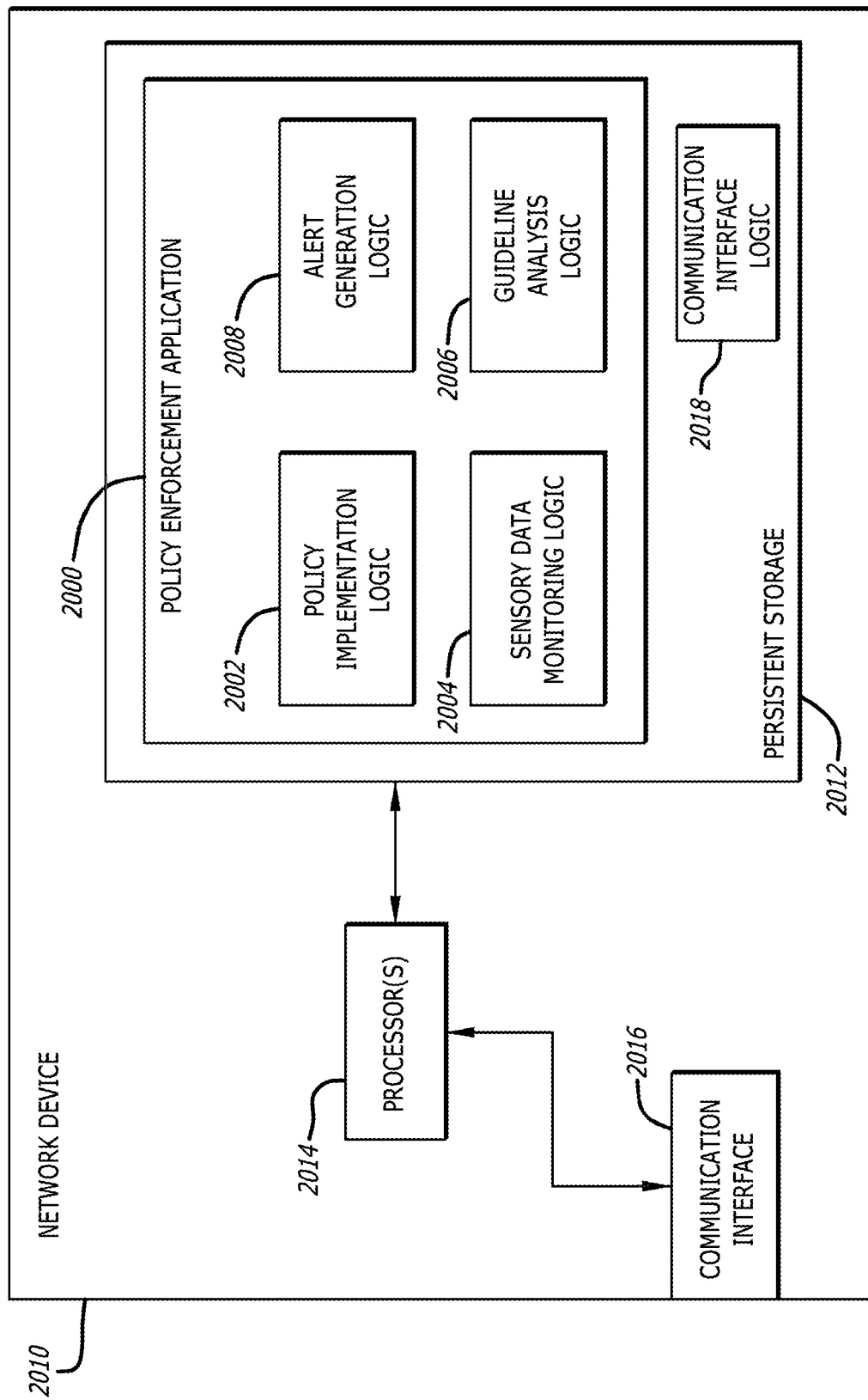
FIG. 20 is an exemplary embodiment of a logical representation of a policy enforcement system application of FIG. 10A.

Referring now to FIG. 20, an exemplary embodiment of a logical representation of the policy enforcement system application of FIG. 10A is shown. The policy enforcement system application 2000 (referred to throughout the disclosure as "the application"), in one embodiment, may be stored on a non-transitory computer-readable storage medium of a network device that includes a housing, which is made entirely or partially of a hardened material (e.g., hardened plastic, metal, glass, composite or any combination thereof) that protects the circuitry within the housing, namely one or more processor(s) 2014 that are coupled to a communication interface 2016 via a first transmission medium. The communication interface 2016, under control by a communication interface logic 2018, enables communications with external network devices, such as the wireless transceiver 1004 of FIGS. 10A-10C. According to one embodiment of the disclosure, the communication interface 2016 may be implemented as a physical interface including one or more ports for wired connectors. Additionally, or in the alternative, the communication interface 2016 may be implemented with one or more radio units for supporting wireless communications with other electronic devices. The communication interface logic 2018 may perform operations of receiving and transmitting electronic data via the communication interface 2016 to enable communications between the policy enforcement system application 2000 and network devices via a network (e.g., the internet) and/or cloud computing services.

The processor(s) 2014 are further coupled to a persistent storage 2012 via a second transmission medium. According to one embodiment of the disclosure, the policy enforcement application 2000 may be stored in the persistent storage 2012 and include some or all of the following components: a policy implementation logic 2002, a sensory data monitoring logic 2004, a guideline analysis logic 2006 and an alert generation logic 2008. The communication interface logic 2018 may also be stored in the persistent storage 2012. Of course, when implemented as hardware, one or more of these logic units could be implemented separately from each other. In addition, the following data stores, although not illustrated, may be stored locally with respect to the network device 2010 and accessible to the policy enforcement application 2000: a driver/vehicle guideline data store (DS), a policy configuration DS, a sensory data DS and an alert DS. In some embodiments, one or more of the data stores may be stored remotely and accessible to the policy enforcement application 2000. Of course, one or more of the data stores may be implemented together.

According to some embodiments, the policy implementation logic 2002 may, upon execution of the processors 2014, perform or cause performance of operations including receiving policy configurations from the enforcement policy server system and implementing a set of policies (e.g., provided in the policy configuration), which may include restricting or limiting certain functionality of the network device 2010. Various methods or manners of restricting or limiting functionality are discussed above. When a policy violation occurs, the policy implementation logic 2002 may provide a signal or other indication to the alert generation logic 2008, which is configured to generate alerts.

The sensory data monitoring logic 2004 may, upon execution of the processors 2014, perform or cause performance of operations including monitoring the handling of and operations performed to/by the network device 2010, which may be according to the implemented set of policies and/or driver/vehicle guidelines. The sensory data monitoring logic 2004 may provide detected or monitored data to the policy implementation logic 2002 for analysis against the implemented set of policies.

The guideline analysis logic 2006 may, upon execution of the processors 2014, perform or cause performance of operations including analyzing data that is detected or monitored by the sensory data monitoring logic 2004 against a set of predetermined driver/vehicle guidelines. The guideline analysis logic 2006 may provide a signal or other indication to the alert generation logic 2008 when a guideline violation has occurred.

Further, the alert generation logic 2008 may, upon execution of the processors 2014, perform or cause performance of operations including generating alerts and/or messages to be transmitted to the wireless transceiver and/or the policy enforcement server system, which may in turn generate an alert to be provided to an administrator as discussed above. Additionally, in some embodiments, the policy enforcement server system may merely forward the alert from the alert generation logic 2008 to the administrator (or others registered to receive alerts).

As not all operations performed by the policy enforcement application 2000 have been enumerated and discussed with respect to FIG. 20, it should be understood that the disclosure above regarding operations performed by the policy enforcement application 2000 may be performed by one or more of the logic modules illustrated in FIG. 20.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method performed by logic of a wireless transceiver coupled to an interior of an automobile, the computerized method comprising:
   responsive to an application processing on a first network device detecting a speed below a predetermined threshold, receiving, by the wireless transceiver, a first instruction initiating the logic of the wireless transceiver to obtain sensory data from an accelerometer of the wireless transceiver;
   obtaining, by the wireless transceiver, the sensory data indicating a first detected value from the accelerometer, wherein the sensory data includes one or more interrupts when the first detected value exceeds a predetermined threshold, wherein each of the one or more interrupts includes a series of binary bits, wherein each bit of the series of binary bits indicates a movement status for a given time interval; and
   transmitting, by the wireless transceiver, the sensory data to the first network device.

2. The computerized method of claim 1, wherein the first detected value is an acceleration value that indicates at least one of positive acceleration or negative acceleration.

3. The computerized method of claim 1, wherein the one or more interrupts are generated by the accelerometer.

4. The computerized method of claim 3, wherein the movement status for the given time interval indicates whether movement above the predetermined threshold was detected for the given time interval.

5. The computerized method of claim 4, wherein the application processing on the first network device utilizes the series of binary bits to decrement or reset the delay timer.

6. The computerized method of claim 5, wherein responsive to the series of binary bits indicating movement has not been detected for a time period corresponding to the delay timer, implementation of a set of policies configured to restrict functionality of the first network device is withdrawn.

7. The computerized method of claim 1, wherein the wireless transceiver repeatedly obtains and records current sensory data at first intervals and transmits the current sensory data to the first network device at second intervals until either (i) the sensory data indicates the wireless transceiver is in motion or (ii) the delay counter is decremented to a predetermined count.

8. The computerized method of claim 1, wherein the first detected value represents a vibration of the automobile.

9. A non-transitory computer readable storage medium having stored thereon instructions, the instructions being executable by one or more processors to perform operations comprising:
   responsive to an application processing on a first network device detecting a speed below a predetermined threshold, receiving, by the wireless transceiver, a first instruction initiating the logic of the wireless transceiver to obtain sensory data from an accelerometer of the wireless transceiver;
   obtaining, by the wireless transceiver, the sensory data indicating a first detected value from the accelerometer, wherein the sensory data includes one or more interrupts when the first detected value exceeds a predetermined threshold, wherein each of the one or more interrupts includes a series of binary bits, wherein each bit of the series of binary bits indicates a movement status for a given time interval; and
   transmitting, by the wireless transceiver, the sensory data to the first network device.

10. The non-transitory computer readable storage medium of claim 9, wherein the first detected value is an acceleration value that indicates at least one of positive acceleration or negative acceleration.

11. The non-transitory computer readable storage medium of claim 9, wherein the one or more interrupts are generated by the accelerometer.

12. The non-transitory computer readable storage medium of claim 11, wherein the movement status for the given time interval indicates whether movement above the predetermined threshold was detected for the given time interval.

13. The non-transitory computer readable storage medium of claim 12, wherein the application processing on the first network device utilizes the series of binary bits to decrement or reset the delay timer.

14. The non-transitory computer readable storage medium of claim 13, wherein responsive to the series of binary bits indicating movement has not been detected for a time period corresponding to the delay timer, implementation of a set of policies configured to restrict functionality of the first network device is withdrawn.

15. A system comprising:
   a memory to store executable instructions; and
   a processing device coupled with the memory, wherein the instructions, when executed by the processing device, cause operations including:
      responsive to an application processing on a first network device detecting a speed below a predetermined threshold, receiving, by the wireless transceiver, a first instruction initiating the logic of the wireless transceiver to obtain sensory data from an accelerometer of the wireless transceiver;
      obtaining, by the wireless transceiver, the sensory data indicating a first detected value from the accelerometer, wherein the sensory data includes one or more interrupts when the first detected value exceeds a predetermined threshold, wherein each of the one or more interrupts includes a series of binary bits, wherein each bit of the series of binary bits indicates a movement status for a given time interval; and
      transmitting, by the wireless transceiver, the sensory data to the first network device.

16. The non-transitory computer readable storage medium of claim 15, wherein the first detected value is an acceleration value that indicates at least one of positive acceleration or negative acceleration.

17. The non-transitory computer readable storage medium of claim 15, wherein the one or more interrupts are generated by the accelerometer.

18. The non-transitory computer readable storage medium of claim 17, wherein the movement status for the given time interval indicates whether movement above the predetermined threshold was detected for the given time interval.

19. The non-transitory computer readable storage medium of claim 18, wherein the application processing on the first network device utilizes the series of binary bits to decrement or reset the delay timer.

20. The non-transitory computer readable storage medium of claim 19, wherein responsive to the series of binary bits indicating movement has not been detected for a time period corresponding to the delay timer, implementation of a set of policies configured to restrict functionality of the first network device is withdrawn.

\* \* \* \* \*